(12) United States Patent
Aman et al.

(10) Patent No.: US 7,194,750 B2
(45) Date of Patent: Mar. 20, 2007

(54) RECORDING/REPRODUCING APPARATUS AND DISK CARTRIDGE

(75) Inventors: Yasutomo Aman, Kanagawa (JP); Shozo Murata, Kanagawa (JP); Nobuaki Onagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 407 days.

(21) Appl. No.: 10/761,462

(22) Filed: Jan. 22, 2004

(65) Prior Publication Data
US 2004/0154035 A1 Aug. 5, 2004

(30) Foreign Application Priority Data

| Jan. 28, 2003 | (JP) | 2003-019087 |
|---|---|---|
| Jun. 4, 2003 | (JP) | 2003-159517 |
| Jun. 16, 2003 | (JP) | 2003-170802 |
| Dec. 15, 2003 | (JP) | 2003-416580 |
| Dec. 15, 2003 | (JP) | 2003-416586 |
| Dec. 15, 2003 | (JP) | 2003-416594 |

(51) Int. Cl.
G11B 17/028 (2006.01)

(52) U.S. Cl. .................................... 720/695

(58) Field of Classification Search .............. 720/695, 720/604, 619, 624, 651, 703, 706, 723, 724
See application file for complete search history.

(56) References Cited

U.S. PATENT DOCUMENTS

| 5,051,975 | A | * | 9/1991 | Tadokoro et al. | ......... | 369/44.39 |
|---|---|---|---|---|---|---|
| 5,459,708 | A | * | 10/1995 | Sundaram et al. | .......... | 720/695 |
| 5,590,115 | A | * | 12/1996 | Kubo | ......................... | 720/723 |
| 6,215,758 | B1 | * | 4/2001 | Horimai et al. | .......... | 369/275.3 |
| 6,468,618 | B1 | | 10/2002 | Murata et al. | | |
| 6,479,121 | B1 | | 11/2002 | Miura et al. | | |
| 6,548,137 | B2 | | 4/2003 | Ito et al. | | |
| 6,765,751 | B2 | * | 7/2004 | Huang et al. | ............ | 360/97.01 |
| 2001/0041240 | A1 | | 11/2001 | Ito et al. | | |
| 2002/0098445 | A1 | | 7/2002 | Harigaya et al. | | |
| 2002/0110063 | A1 | | 8/2002 | Yamada et al. | | |
| 2002/0145963 | A1 | | 10/2002 | Narumi et al. | | |
| 2002/0155248 | A1 | | 10/2002 | Ito et al. | | |
| 2002/0160306 | A1 | | 10/2002 | Hanaoka et al. | | |
| 2002/0182402 | A1 | | 12/2002 | Murata et al. | | |
| 2002/0186636 | A1 | | 12/2002 | Onagi et al. | | |
| 2003/0003395 | A1 | | 1/2003 | Yuzurihara et al. | | |
| 2003/0124298 | A1 | | 7/2003 | Ito et al. | | |

(Continued)

FOREIGN PATENT DOCUMENTS

JP 7-105657 4/1995

(Continued)

OTHER PUBLICATIONS

O Plus E, vol. 20, No. 2, p. 183-186.

(Continued)

*Primary Examiner*—Allen Cao
(74) *Attorney, Agent, or Firm*—Dickstein Shapiro LLP

(57) ABSTRACT

A disk surface of an optical disk is divided into two regions by a straight line being close to a movement line for an optical pickup to scan and passing in the vicinity of a center of the optical disk. An auxiliary stabilizing member is arranged separately from a main stabilizing member at least one of the two regions.

47 Claims, 42 Drawing Sheets

U.S. PATENT DOCUMENTS

| | | |
|---|---|---|
| 2003/0143365 A1 | 7/2003 | Ito et al. |
| 2003/0174599 A1 | 9/2003 | Aman et al. |
| 2003/0180495 A1 | 9/2003 | Ito et al. |
| 2004/0114478 A1* | 6/2004 | Iwamura et al. .......... 369/44.27 |
| 2005/0068661 A1* | 3/2005 | Byun et al. ................... 360/75 |

FOREIGN PATENT DOCUMENTS

| | | |
|---|---|---|
| JP | 10-308059 | 11/1998 |
| JP | 2002-269855 | 9/2002 |
| JP | 2002-358759 | 12/2002 |

OTHER PUBLICATIONS

C. Bricot, Optical Readout of Videodisc, IEEE Transactions on Consumer Electronics, Nov. 1976, pp. 304-308.

* cited by examiner

DISK ROTATION DIRECTION

FIG.22

| | LINEAR SPEED [m/sec] | REQUIRED PUSHING AMOUNT OF MAIN STABILIZING MEMBER TO REDUCE SIDE-RUNOUT LOWER THAN 10 MICRON (AT LOCATION OF r55mm) | SIDE-RUNOUT BY PUSHING AMOUNT [$\mu$m] |
|---|---|---|---|
| EXAMPLE 1-1 | 5 | 0.20 | 10.0 |
| | 15 | 0.15 | 10.0 |
| | 30 | 0.10 | 10.0 |
| EXAMPLE 1-2 | 5 | 0.20 | 10.0 |
| | 15 | 0.15 | 10.0 |
| | 30 | 0.10 | 10.0 |
| EXAMPLE 1-3 | 5 | 0.0 | 7.0 |
| | 15 | 0.0 | 7.0 |
| | 30 | 0.0 | 8.0 |
| EXAMPLE 1-4 | 5 | 0.0 | 8.0 |
| | 15 | 0.0 | 8.0 |
| | 30 | 0.0 | 9.0 |
| EXAMPLE 1-5 | 5 | 0.0 | 6.0 |
| | 15 | 0.0 | 6.0 |
| | 30 | 0.0 | 7.0 |
| EXAMPLE 1-6 | 5 | 0.0 | 7.0 |
| | 15 | 0.0 | 7.0 |
| | 30 | 0.0 | 8.0 |
| EXAMPLE 1-7 | 5 | 0.0 | 7.0 |
| | 15 | 0.0 | 7.0 |
| | 30 | 0.0 | 8.0 |
| COMPARATIVE EXAMPLE 1-1 | 5 | 2.6 | 10.0 |
| | 15 | 2.3 | 10.0 |
| | 30 | 2.0 | 10.0 |

FIG.23

| | SIDE-RUNOUT WHEN ADJUSTMENTS OF PUSHING AMOUNT AND TILT ANGLE OF MAIN STABILIZING MEMBER ARE OPTIMIZED [$\mu$m] |
|---|---|
| EXAMPLE 1-1 | 4.0 |
| EXAMPLE 1-2 | 4.0 |
| EXAMPLE 1-3 | 3.0 |
| EXAMPLE 1-4 | 3.0 |
| EXAMPLE 1-5 | 3.0 |
| EXAMPLE 1-6 | 3.0 |
| EXAMPLE 1-7 | 3.0 |
| COMPARATIVE EXAMPLE 1-1 | 5.0 |

DISK ROTATION DIRECTION

FIG.42

| | LINEAR SPEED [m/sec] | REQUIRED PUSHING AMOUNT OF MAIN STABILIZING MEMBER TO REDUCE SIDE-RUNOUT LOWER THAN 10 MICRON (AT LOCATION OF r55mm) | SIDE-RUNOUT BY PUSHING AMOUNT [micron] |
|---|---|---|---|
| EXAMPLE 2-1 | 5 | 0.15 | 10.0 |
| | 15 | 0.10 | 10.0 |
| | 30 | 0.05 | 10.0 |
| EXAMPLE 2-2 | 5 | 0.15 | 10.0 |
| | 15 | 0.10 | 10.0 |
| | 30 | 0.05 | 10.0 |
| EXAMPLE 2-3 | 5 | 0.0 | 7.0 |
| | 15 | 0.0 | 7.0 |
| | 30 | 0.0 | 8.0 |
| EXAMPLE 2-4 | 5 | 0.0 | 8.0 |
| | 15 | 0.0 | 8.0 |
| | 30 | 0.0 | 9.0 |
| EXAMPLE 2-5 | 5 | 0.0 | 6.0 |
| | 15 | 0.0 | 6.0 |
| | 30 | 0.0 | 7.0 |
| EXAMPLE 2-6 | 5 | 0.0 | 7.0 |
| | 15 | 0.0 | 7.0 |
| | 30 | 0.0 | 8.0 |
| COMPARATIVE EXAMPLE 2-1 | 5 | 2.6 | 10.0 |
| | 15 | 2.3 | 10.0 |
| | 30 | 2.0 | 10.0 |

FIG.43

| | SIDE-RUNOUT WHEN ADJUSTMENTS OF PUSHING AMOUNT AND TILT ANGLE OF MAIN STABILIZING MEMBER ARE OPTIMIZED [micron] |
|---|---|
| EXAMPLE 2-1 | 4.0 |
| EXAMPLE 2-2 | 4.0 |
| EXAMPLE 2-3 | 3.0 |
| EXAMPLE 2-4 | 3.0 |
| EXAMPLE 2-5 | 3.0 |
| EXAMPLE 2-6 | 3.0 |
| COMPARATIVE EXAMPLE 2-1 | 5.0 |

FIG.68

| | SIDE-RUNOUT AMOUNT [μm] | | |
|---|---|---|---|
| | LOCATION OF RADIUS 25mm | LOCATION OF RADIUS 40mm | LOCATION OF RADIUS 58mm |
| EMBODIMENT 14 | 8 | 10 | 12 |
| EMBODIMENT 15 | 8 | 8 | 8 |
| EMBODIMENT 16 | 8 | 8 | 8 |
| EMBODIMENT 17 | 8 | 8 | 8 |
| EMBODIMENT 18 | 7 | 7 | 7 |
| EMBODIMENT 19 | 8 | 8 | 8 |
| CONPARATIVE EXAMPLE 1 | 30 | 40 | 50 |
| CONPARATIVE EXAMPLE 1 | 6 | 7 | 5 |

RECORDING/REPRODUCING APPARATUS AND DISK CARTRIDGE

BACKGROUND OF THE INVENTION

1. Field of the Invention

The present invention generally relates to a recording/reproducing apparatus for conducting a recording and/or reproducing process with respect to a recordable disk having flexibility, and a disk cartridge for accommodating a recordable disk.

2. Description of the Related Art

Recently, since a digitized television broadcast service has begun, it has been required for an information recording medium to record a large amount of digital data. For example, in the optical disk field, minimizing a light spot diameter condensed on an optical disk to record or reproduce digital data is one of basic methods of high density development. Hereinafter, an optical disk will be mainly described but the present invention is not limited to the optical disk, and the recordable disk according to the present invention used for a recording/reproducing apparatus can be any type of recording disk having a disk shape such as a phase change memory, a magnetic optical memory, or a hologram memory.

Accordingly, in optical disk development, it is required to shorten a light wavelength used for recording/reproducing digital data and to increase an aperture number NA of an objective lens. For the light wavelength, a wavelength being 789 nm of a near-infrared light is used for a CD (Compact Disk), and a wavelength being in the vicinity of 650 nm of a red light is used. Recently, a semiconductor laser having a blue-violet light has been developed. After this, a laser beam being in the vicinity of 400 nm will be used.

In the objective lens, the aperture number NA for the CD is less than 0.5 but the aperture number NA for the DVD (Digital Versatile Disk) is approximately 0.6. In the future, it is required for the aperture number NA to be greater than 0.7. However, when the aperture number NA of the objective lens becomes greater and the light wavelength becomes shorter, an aberration occurs more often at an aperture diaphragm. Thus, the margin for a tilt of the optical disk is reduced. In addition, the focus depth becomes smaller since the aperture number NA becomes greater. Accordingly, it is required to improve the accuracy of a focus servo.

Moreover, when the objective lens having a larger aperture number NA is used, a distance between the objective lens and a recording surface of the optical disk becomes shorter. Thus, surface vibration of the optical disk should be suppressed smaller or a pickup problem can be caused by a crash between the objective lens and the optical disk that may occur just before the focus servo is activated.

As a high-capacity optical disk having a short wavelength and a high aperture number NA, for example, a system is proposed in IDS 1, in that a recording film is formed on a substrate being the same thickness as a CD and having greater rigidity, and data are recorded and reproduced with respect to the recording film where a light for recording and reproducing data passes inside through a thin cover layer but does not pass through the substrate.

For example, IDS or Cross-References 1 through 5 disclose a recording/reproducing apparatus configured in that an optical disk having flexibility is based on a stabilizing member and rotated so as to suppress surface vibration and stabilize the optical disk by utilizing aerodynamic action force based on Bernoulli's principle.

[IDS or Cross-Reference 1]
Japanese Laid-Open Patent Application No. 7-105657
[IDS or Cross-Reference 2]
Japanese Laid-Open Patent Application No. 10-308059
[IDS or Cross-Reference 3]
United State Patent Application Publication No. 2002/0186636
[IDS or Cross-Reference 4]
Japanese Laid-Open Patent Application No. 2002-269855
[IDS or Cross-Reference 5]
Japanese Laid-Open Patent Application No. 2002-358759
[IDS 1]
O Plus E, vol. 20, no. 2, p. 183.
[IDS 2]
"Optical Readout of Videodisc", IEEE Transaction on Consumer Electronics, November, 1976, pp. 304–308

However, in conventional technologies above-described, in order for the surface vibration and the tilt of the optical disk being rotated to be smaller in a case in that the substrate of the optical disk is formed by a rigid body, it is required to make a perfect form and to form the recording film at lower temperature to prevent deformation caused by heat. As a result, tact time of an optical disk production becomes longer and production cost increases.

Moreover, in a configuration of rotating the optical disk having flexibility on a stabilizing board as disclosed in the IDS or Cross-References 1 through 3, the risk of the optical disk making contact with and sliding on the stabilizing board is increased and a disk surface or a stabilizing board surface are damaged. In addition, an error can occur due to dusts caused by this sliding.

In particular, as disclosed in the IDS or Cross-Reference 1, in a configuration in that the recording film is formed at a stabilizing board side, the recording film of the optical disk is damaged by the sliding and then this damage causes an error directly. Moreover, in a case in that a flat stabilizing board is simply used, a reduction effect on the surface vibration of the optical disk is limited. Thus, in a case of using the objective lens having the greater aperture number NA, the risk of a crash of the objective lens and the optical disk still remains.

One of methods using the stabilizing board is disclosed in the IDS 2. In a configuration disclosed in the IDS 2, a flexible disk is clamped and rotated in a narrow gap formed by members configured by two stabilizing members functioning as U-shaped stabilizers, so as to dramatically suppress the surface vibration of the optical disk to be less. As disclosed in IDS 2, a space between the flexible disk and each of the stabilizing members in the gap is 25 μm, which is narrow. Dust is drawn into the space between the flexible disk and each of the stabilizing members and the recording film is damaged. Then, there is a risk in that this damage directly causes an error. In particular, in this configuration, since the stabilizing members always contact with both front and rear surfaces of the flexible disk, even if an information recording part is provided to both the front and rear surfaces, the risk can not be eliminated.

According to the invention disclosed in IDS or Cross-Reference 3, the surface vibration of a flexible optical disk can be certainly suppressed, data can be recorded at higher density, and the objective lens can be prevented from sliding and contacting the flexible optical disk. However, in practice, complicated location adjustment control is required with respect to the stabilizing guide members and a recording/reproducing head. Accordingly, not only does the workload of a drive control system become greater, but also the apparatus cost increase.

SUMMARY OF THE INVENTION

It is a general object of the present invention to provide document processing apparatuses in which the above-mentioned problems are eliminated.

A more specific object of the present invention is to provide a recording/reproducing apparatus and a disk cartridge, in which surface vibration of a disk can be reduced by a simple configuration by a main stabilizing member and an auxiliary stabilizing member that have the aerodynamic effect.

The above objects of the present invention are achieved by a recording/reproducing apparatus for recording and reproducing information, the recording/reproducing apparatus including a main stabilizing member rotating a recordable disk having flexibility and suppressing surface vibration of the recordable disk at least in the vicinity of a recording/reproducing location by utilizing the aerodynamic effect; and a recording/reproducing part conducting a recording and/or reproducing process at a reverse side being opposite to an action surface of an aerodynamic effect, the action surface being a main surface of the recordable disk, wherein the recordable disk surface is divided into two regions by a first straight line being approached to a movement line for the recording/reproducing part to scan and passing in the vicinity of a center of the recordable disk, and an auxiliary stabilizing member is arranged in at least one of the two regions so that a counterforce of the recordable disk surface is increased, in which the counterforce occurs when the main stabilizing member is influenced by occurring an aerodynamic force acting on the recordable disk surface at a location where the main stabilizing member is located.

In the recording/reproducing apparatus according to the present invention, compared with a configuration of a single main stabilizing member, surface vibration reduction effect can be sufficiently obtained at a location of a lower pushing amount against the recordable disk of the main stabilizing member by the action force of one auxiliary stabilizing member. Therefore, the movement line in the disk radial direction for the main stabilizing member and the recording/reproducing part can be limited to be in a range closer to the disk reference surface. Moreover, by this configuration, at a recording/reproducing location, the surface vibration can be effectively suppressed by applying the main stabilizing member to one side of the recordable disk. In particular, a configuration clamping the recordable disk at both sides is not required. Accordingly by applying a configuration in that a record layer is formed on a reverse surface which is opposite to the action surface of the main stabilizing member, it is possible to prevent problems such as an increase of errors caused by losses of recorded information by a collision of the main stabilizing member and the recordable disk.

The above objects of the present invention are achieved by a disk cartridge for accommodating the recordable disk having flexibility and provided with a mechanism for applying a main stabilizing member for suppressing surface vibration of the recordable disk at least in the vicinity of a recording/reproducing location by utilizing the aerodynamic effect when the recordable disk is rotated, wherein a recordable disk surface is divided into two regions by a first straight line being approached to a movement line for a recording/reproducing part provided in a recording/reproducing apparatus side to scan and passing in the vicinity of a center of the recordable disk, and an auxiliary stabilizing member is arranged in at least one of the two regions so that a counterforce of the recordable disk surface is increased, in which the counterforce occurs when the main stabilizing member is influenced by occurring an aerodynamic action force on the recordable disk surface at a location where the main stabilizing member is located.

In the disk cartridge according to the present invention, the auxiliary stabilizing member is mounted selectively. Therefore, it is possible to simplify the configuration of the recording/reproducing apparatus and also to obtain the same effects as the recording/reproducing apparatus according to the present invention.

BRIEF DESCRIPTION OF THE DRAWINGS

In the following, embodiments of the present invention will be described with reference to the accompanying drawings.

FIG. 22 is a diagram showing a list of a feature evaluation for the first through the sixth embodiments of the present invention and the comparative example;

FIG. 23 is a diagram showing the feature evaluation in a case in that a tilt controlling mechanism is mounted in the first through the sixth embodiments and in the comparative example;

FIG. 42 is a diagram showing a list of a feature evaluation in the seventh through twelfth embodiments and the comparative example;

FIG. 43 is a diagram showing the feature evaluation in a case in that a tilt controlling mechanism is mounted in the seventh through twelfth embodiments and the comparative example;

FIG. 67 is a front view showing a front of the configuration in the comparative examples and FIG. 68 is a diagram showing a characteristic evaluation of the examples according to the present invention and the comparative examples.

DESCRIPTION OF THE PREFERRED EMBODIMENTS

In the following, embodiments according to the present invention will be described with reference to the accompanying drawings.

The inventors offer the present invention that uses stabilizing guide members being a cylindrical shape and having a surface being a circular shape and facing an optical disk, provides a region (space where the stabilizing guide members are not provided) in which an action of air pressure upstream and downstream of a disk rotational direction does not occur at a stable portion where surface vibration of the optical disk caused by the air pressure by the stabilizing guide member becomes stable, so as to provide portions on the optical disk before and after the stable potion stabilizing the surface vibration. Accordingly, the present invention can realize to increase an effect of a stabilizing force by the air pressure by reducing a repulsive force at the stable position stabilizing the surface vibration on the optical disk. Therefore, the present invention can overcome the problems of IDS or Cross-References 3 and other references.

First Embodiment

Figure 1:
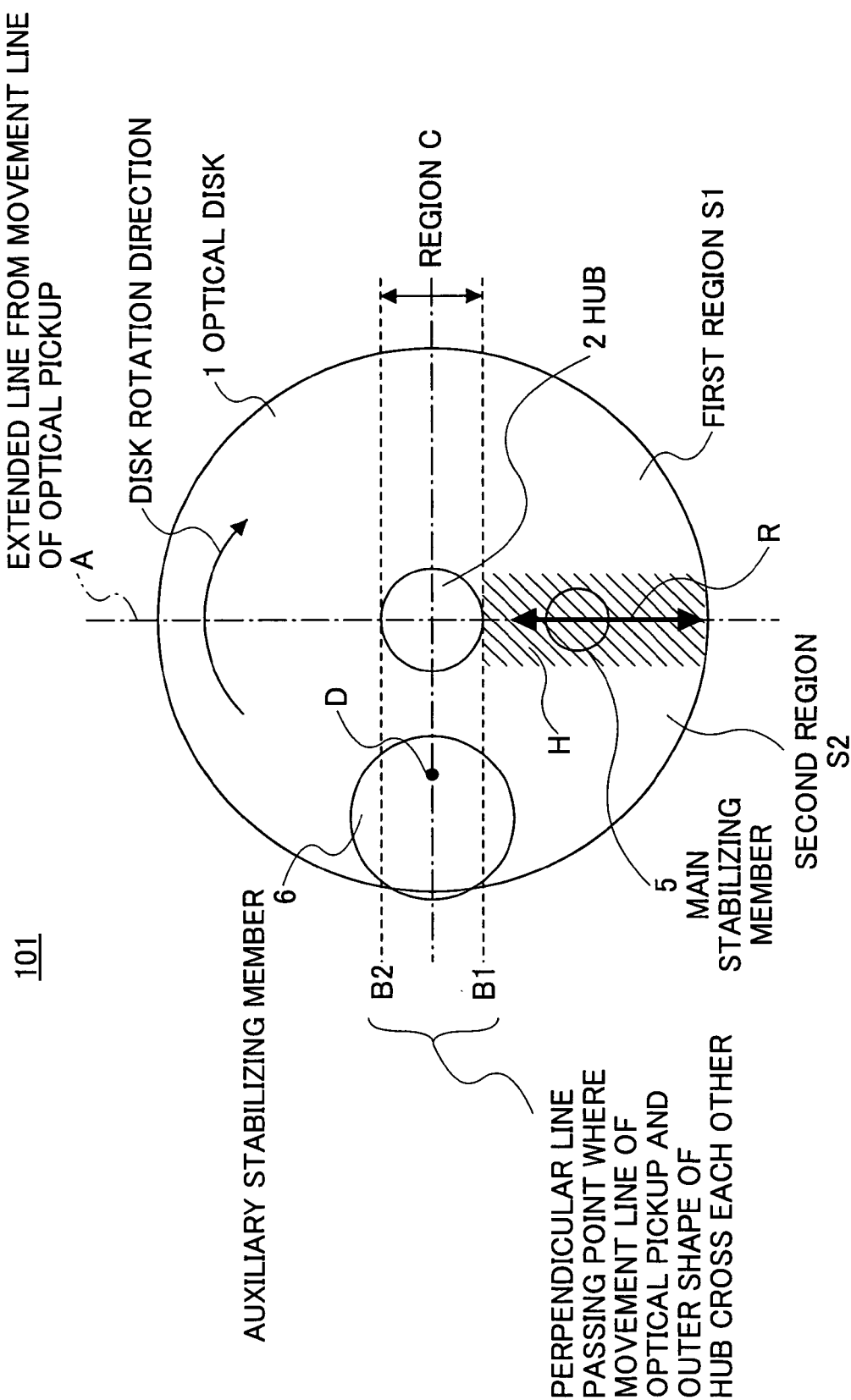
FIG. 1 is a plan view for explaining a main part of a recording/reproducing apparatus according to a first embodiment of the present invention.
Figure 2:
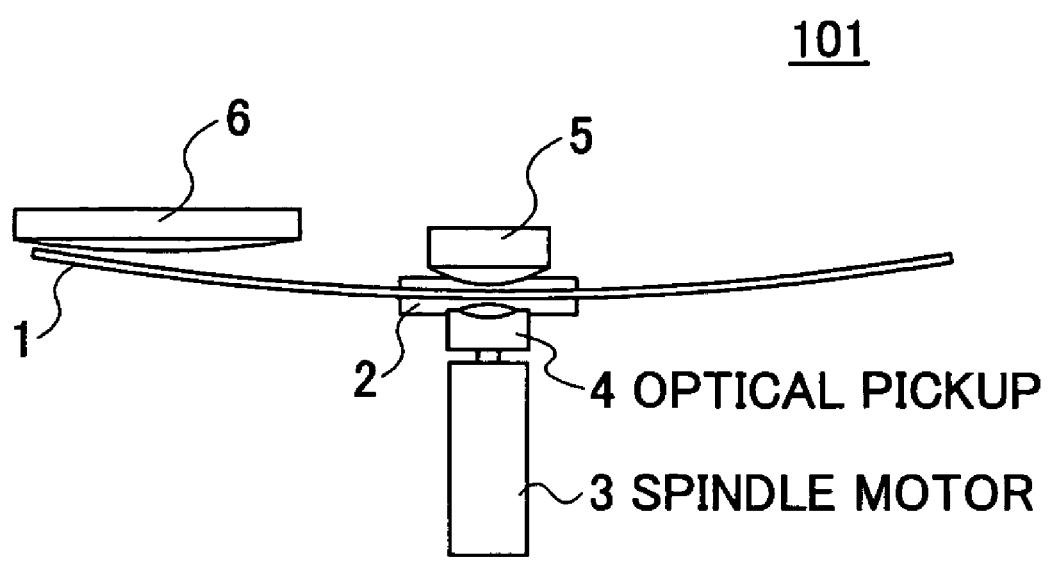
FIG. 2 is a front view showing a front of the recording/reproducing apparatus shown in FIG. 1 according to the first embodiment of the present invention.

FIG. 1 is a plan view for explaining a main part of a recording/reproducing apparatus according to a first embodiment of the present invention. FIG. 2 is a front view showing a front of the recording/reproducing apparatus shown in FIG. 1 according to the first embodiment of the present invention. In the recording/reproducing apparatus 101 according to the first embodiment, reference number 1 denotes an optical disk (hereinafter, called optical disk 1) as a recordable disk having flexibility, reference number 2 denotes a hub (hereinafter, called hub 2) being one holding member holding and rotating the optical disk 1 mounted at a rotation center part of the optical disk 1, reference number 3 denotes a spindle motor (hereinafter, called spindle motor 3) engaging a catching member as another holding member with the hub 2, and reference number 4 denotes an optical pickup (hereinafter, called optical pickup 4) as a recording/reproducing part for condensing a light beam with respect to the optical disk 1 by moving the optical disk 1 in a radial direction and for conducting an optical scan (toward a direction of an optical pickup movement line R) with respect to the optical disk 1 to conduct a recording/reproducing process for recording or reproducing information.

Moreover, reference number 5 denotes a main stabilizing member (hereinafter, called main stabilizing member 5) that moves in the radial direction of the optical disk 1 accompanying the optical pickup 4 and suppresses surface vibration of the optical disk 1 at least around a recording/reproducing location of the optical pickup 4 on the optical disk 1 by utilizing an aerodynamic action force, and reference number 6 denotes an auxiliary stabilizing member (hereinafter, called auxiliary stabilizing member 6) applying the aerodynamic action force to the optical disk 1 similar to the main stabilizing member 5. The main stabilizing member 5 and the auxiliary stabilizing member 6 are arranged at a disk substrate side being a reverse side of the recording surface of the optical disk 1.

In the first embodiment, in two regions S1 and S2 that are adjacent to the optical pickup movement line R on which the optical pickup 4 moves to scan a surface of the optical disk 1 and are separated by a straight line A passing near the center of the optical disk 1 (straight line A is drawn on the optical pickup movement line R in FIG. 1 and can be a line being in the vicinity of the optical pickup movement line R), at least one auxiliary stabilizing member 6 is arranged separately from the main stabilizing member 5 in the region S2 located on the downstream side of a rotational direction of the optical disk 1 of the optical pickup 4 (in FIG. 2). In the first embodiment, for the sake of convenience, one auxiliary stabilizing member 6 is arranged.

Second Embodiment

Figure 3:
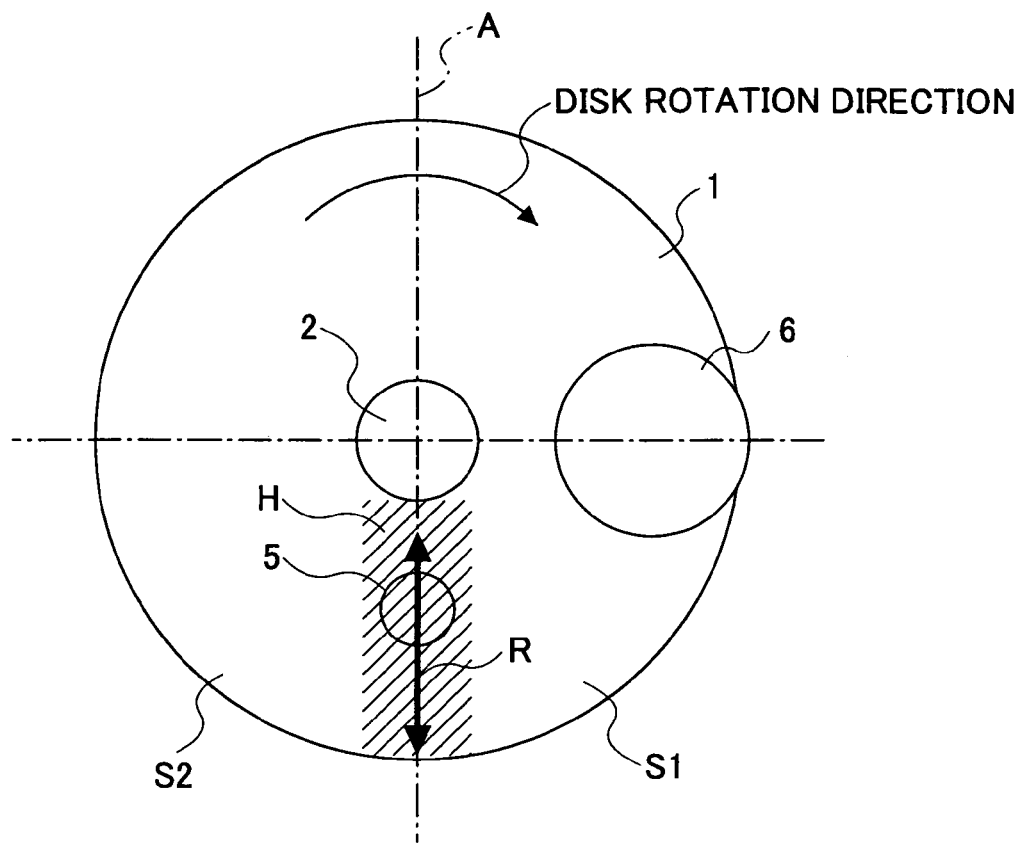
FIG. 3 is a plan view for explaining a main part of a recording/reproducing apparatus according to a second embodiment of the present invention.
Figure 4:
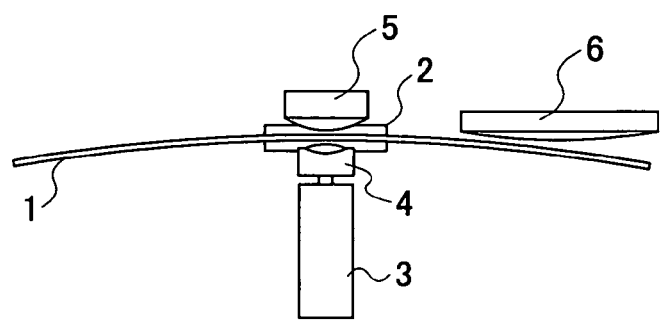
FIG. 4 is a front view showing a front of the recording/reproducing apparatus shown in FIG. 4 according to the second embodiment of the present invention.

FIG. 3 is a plan view for explaining a main part of the recording/reproducing apparatus according to a second embodiment of the present invention. FIG. 4 is a front view showing a front of the recording/reproducing apparatus shown in FIG. 3 according to the second embodiment of the present invention. In the recording/reproducing apparatus 101 in FIG. 3 and FIG. 4, parts that are the same as those shown in the previously described figures are given the same reference numbers, and description thereof is omitted.

Similar to the first embodiment, in the second embodiment, the two regions S1 and S2 are adjacent to the optical pickup movement line R on which the optical pickup 4 moves to scan a surface of the optical disk 1 and are separated by a straight line A passing near the center of the optical disk 1. Different from the first embodiment, in the second embodiment, at least one auxiliary stabilizing member 6 is arranged separately from the main stabilizing member 5 in the region S1 located on the upstream side of a rotational direction of the optical disk 1 of the optical pickup 4 (in. FIG. 4). In the second embodiment, for the sake of convenience, one auxiliary stabilizing member 6 is arranged in the region S1.

Third Embodiment

Figure 5:
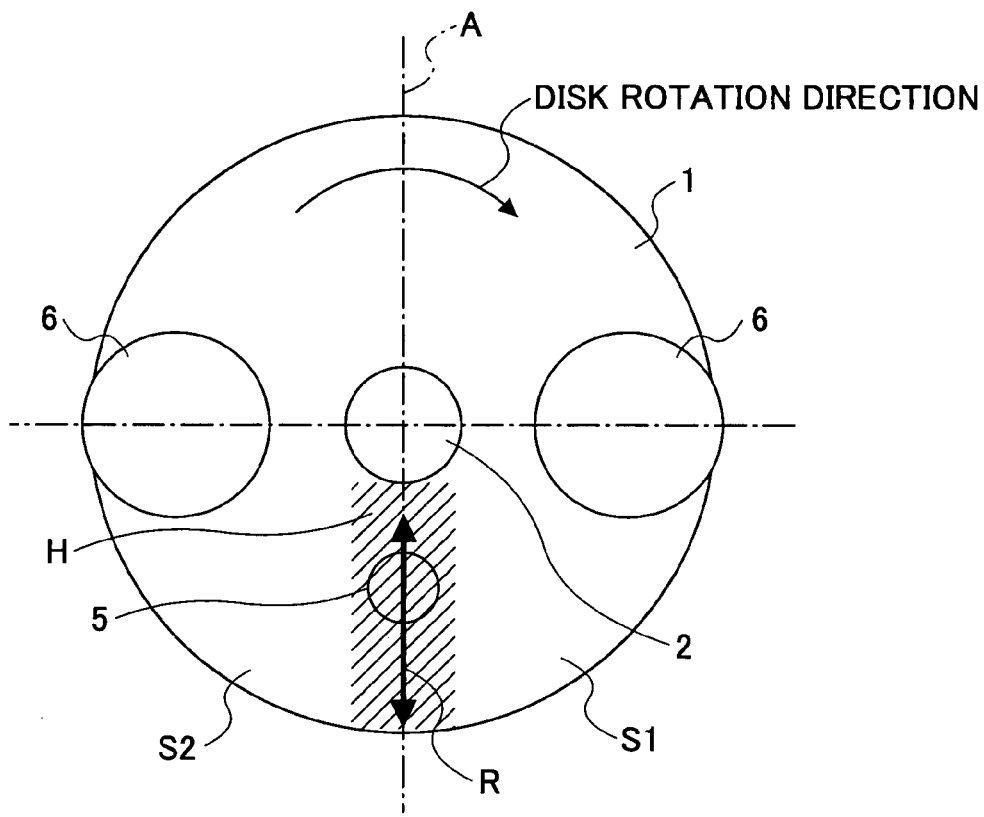
FIG. 5 is a plan view for explaining a main part of a recording/reproducing apparatus according to a third embodiment of the present invention.
Figure 6:
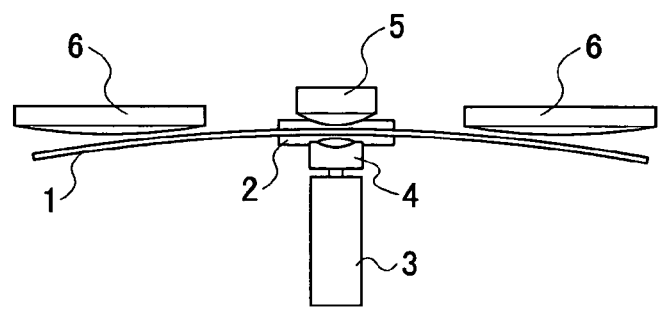
FIG. 6 is a front view showing a front of the recording/reproducing apparatus shown in FIG. 5 according to the third embodiment of the present invention.

FIG. 5 is a plan view for explaining a main part of the recording/reproducing apparatus according to a third embodiment of the present invention. FIG. 6 is a front view showing a front of the recording/reproducing apparatus shown in FIG. 5 according to the third embodiment of the present invention. Similar to the first and second embodiments, in the third embodiment, two regions S1 and S2 are formed. Different from the first and second embodiments, in the recording/reproducing apparatus 103 according to the third embodiment, at least one auxiliary stabilizing member 6 is arranged in each of two regions S1 and S2 separately from the main stabilizing member 5. In the third embodiment, for the sake of convenience, one auxiliary stabilizing member 6 is arranged in each of the regions S1 and S2.

Fourth Embodiment

Figure 7:
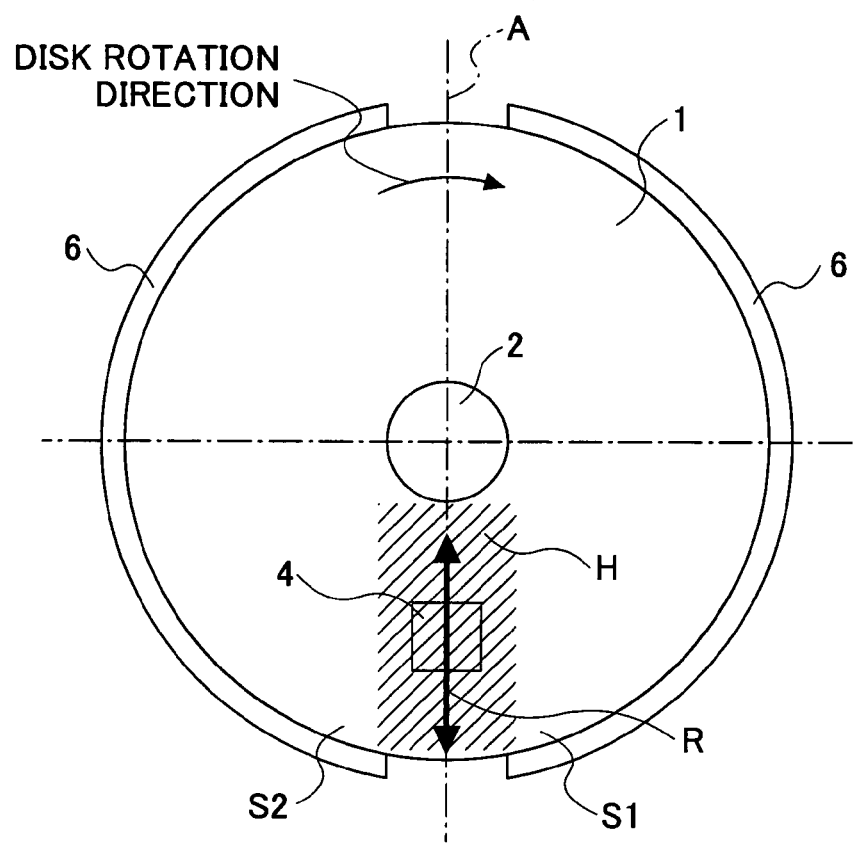
FIG. 7 is a plan view for explaining a main part of a recording/reproducing apparatus according to a fourth embodiment of the present invention.
Figure 8:
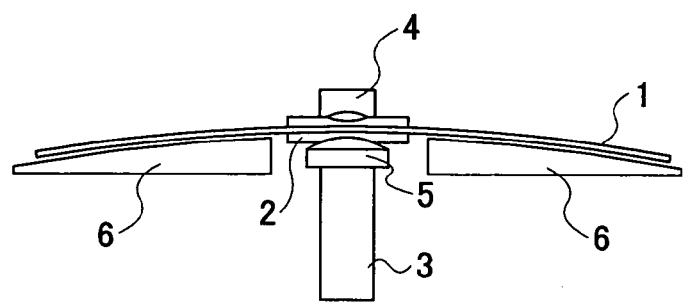
FIG. 8 is a front view showing a front of the recording/reproducing apparatus shown in FIG. 7 according to the fourth embodiment of the present invention.

FIG. 7 is a plan view for explaining a main part of the recording/reproducing apparatus according to a fourth embodiment of the present invention. FIG. 8 is a front view showing a front of the recording/reproducing apparatus according to the fourth embodiment of the present invention in FIG. 7. Different from the third embodiment, in the recording/reproducing apparatus 104 according to the fourth embodiment, the main stabilizing member 5 and the auxiliary stabilizing members 6 are arranged on a downside of the optical disk 1 and the optical pickup 4 is arranged on an upside of the optical disk 1. Similar to the first and second embodiments, in the fourth embodiment, two regions S1 and S2 are formed. At least one auxiliary stabilizing member 6 is arranged in each of the regions S1 and S2. In the fourth embodiment, for the sake of convenience, one auxiliary stabilizing member 6 is arranged in each of the regions S1 and S2. Different from the third embodiment in that the auxiliary stabilizing members 6 are arranged to push the optical disk 1, in the fourth embodiment, the auxiliary stabilizing members 6 are arranged so as to pull the optical disk 1. Accordingly, a configuration in the fourth embodiment is different from a configuration in the third embodiment from the viewpoint of giving an action force.

An operation of each embodiment will be described.

It is important to consider a balance condition between a stabilizing member 5 and the optical disk 1 in order to suppress the surface vibration of the optical disk 1 by occurring the aerodynamic force between the main stabilizing member 5 and the optical disk 1 having flexibility in a basic configuration according to each embodiment. In particular, a reaction force toward the main stabilizing member 5 of the optical disk 1 is an important parameter. This reaction force is determined based on rigidity of the optical disk 1 and a floating force occurred when the optical disk 1 is rotated and attempts to be planarized. In principle, the balance condition depends on parameters such as a radial position of the main stabilizing member 5, a disk rotational speed, and a disk specification. Accordingly, a complicated adjustment activating mechanism is required.

Considered and experimented this point, when the aerodynamic force was applied to a disk surface by using various arbitrary stabilizing members, the disk surface near approximate ±90° with respect to the disk rotational direction from the upstream side to the downstream side became closer to a disk reference surface in a case of the optical disk 1 having an ideally flat surface and showed improvement of the rigidity of the optical disk 1.

Accordingly, in each embodiment of the present invention, a phenomenon, in which the disk surface displaced at ±90° from the arbitrary stabilizing members becomes closer to the disk reference surface and the rigidity of the optical disk 1 is improved, is utilized as the reaction force, so that the balance condition between the main stabilizing member 5 and the optical disk 1 can be adjusted, and further influences from the radial location, the disk rotational speed, and the disk specification can be smaller in a case of occurring the reaction force above-described.

It can be easily seen that the surface vibration at the recording/reproducing position can be optimized by adjusting setting conditions of the main stabilizing member 5 based on the parameters such as the radial location, the disk rotational speed, and the disk specification. However, in the embodiments of the present invention, it is possible to obtain surface vibration reduction effect practically and sufficiently without adjusting those parameters.

In the first embodiment shown in FIG. 1 and FIG. 2, compared with a configuration of a single main stabilizing member 5, the surface vibration reduction effect could be sufficiently obtained at a location of a lower pushing amount against the optical disk 1 of the main stabilizing member 5 by the action force of one auxiliary stabilizing member 6. Accordingly, it is possible to position the movement line R in a disk radial direction (radial direction of the optical disk 1) for the main stabilizing member 5 and the optical pickup 4 within a range H (relatively large region shown by hatch lines in FIG. 1) near the disk reference surface where the surface vibration is suppressed. Therefore, it is possible for the adjustment mechanism to have a margin, so that the adjustment mechanism can be simplified.

Also, in the second embodiment shown in FIG. 3 and FIG. 4, similar to the first embodiment, compared with the configuration of the single main stabilizing member 5, the surface vibration reduction effect could be sufficiently obtained at the location of the lower pushing amount against the optical disk 1 of the main stabilizing member 5 by the action force of one auxiliary stabilizing member 6. Accordingly, it is possible to position the movement line R in the disk radial direction for the main stabilizing member 5 and the optical pickup 4 within the range H (relatively large region shown by oblique lines in FIG. 1). Therefore, it is possible for the adjustment mechanism to have a margin, so that the adjustment mechanism can be simplified.

In the third embodiment shown in FIG. 5 and FIG. 6, compared with the configurations of the first and second embodiments, the surface vibration reduction effect could be sufficiently obtained at the location of the lower pushing amount against the optical disk 1 of the main stabilizing member 5 by the action force of one auxiliary stabilizing member 6. In particular, in the configuration of the third embodiment, the surface vibration reduction effect can be obtained practically and sufficiently in the entire radial direction even in a case in that the pushing amount of the main stabilizing member 5 is set to be in the vicinity of zero, that is, a disk rotational direction position of the main stabilizing member is fixed in the vicinity of the disk reference surface, and the main stabilizing member 5 moves along the disk reference surface.

Accordingly, it is not required to adjust the surface vibration by a location control or a like in the rotational axis direction of the main stabilizing member 5. Therefore, it is possible to significantly simplify an activation controlling mechanism according to the main stabilizing member 5 and the optical pickup 4.

In the configurations from the first embodiment to the third embodiment, it can be seen easily that the surface vibration at the recording/reproducing location can be optimized by additionally providing a location controlling mechanism or a tilt control system in the disk rotational axis direction to the main stabilizing member 5 and conducting a fine adjustment having higher precision. Even in a case of providing a mechanism conducting the fine adjustment having higher precision, by applying the auxiliary stabilizing member 5 according to the present invention, an amount of the adjustment can be smaller in the mechanism above-described for conducting a suitable adjustment with respect to the surface vibration at the recording/reproducing location.

Moreover, by applying the auxiliary stabilizing member 6 according to the present invention, the surface vibration of the optical disk 1 could be certainly reduced at the recording/reproducing location, regardless of a static warped shape of the optical disk 1 in any specific recordable disk. Furthermore, a basic surface vibration reduction effect could be increased by applying the auxiliary stabilizing member 6 according to the present invention.

In the first embodiment through the third embodiment, as illustrated in FIG. 1, it is effective to arrange an action point D of the aerodynamic force to the optical disk 1 by the auxiliary stabilizing member 6 at a region C on a disk surface which ranges between a straight line B1 near the stabilizing member 5 and a straight line B2 far from the stabilizing member 5. Two straight lines B1 and B2 pass through two points where the straight line A crosses twice a region (circular region in FIG. 1) linking supporting point locations (periphery of the hub 2 in FIG. 1) where a warp begins on the optical disk 1 in a state in that the hub 2 of the optical disk 1 is fixed to the catching part of the spindle motor 3 and a side of the stabilizing members 5 and 6 is pushed and warped. In addition, the two straight lines are perpendicular to the straight line A.

In these configuration according to the first embodiment through the third embodiment, it is possible to effectively occur a force to a direction approaching the main stabilizing member 5 on the disk surface in the vicinity of the main stabilizing member 5 by the action force of the auxiliary stabilizing member 6 toward the optical disk 1. As a result, forces of the main stabilizing member 5 and the optical disk 1 are balanced. Accordingly, it is possible to shift a condition in that the disk surface becomes stable toward the side of the disk reference surface.

In addition, it is considered to arrange a plurality of auxiliary stabilizing members other than the auxiliary stabilizing members 6 specified in each of the first embodiment through the third embodiment. In this case, a counterforce which the auxiliary stabilizing members 6 receives from the optical disk 1 in each of the first embodiment through the third embodiment is set to be a maximum in the auxiliary stabilizing members other than the main stabilizing member 5 arranged on the disk surface. Accordingly, a desired effect can be assured.

Figure 9:
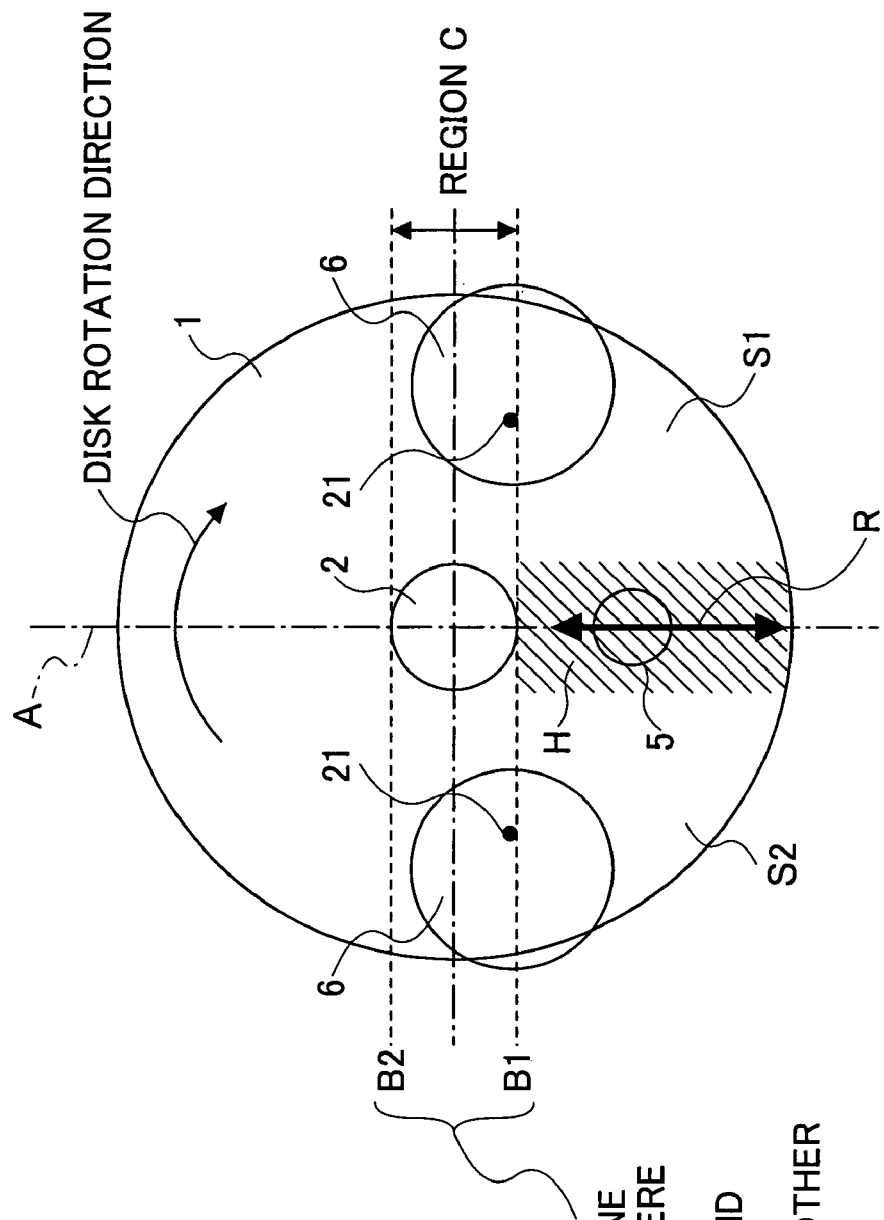
FIG. 9 is a plan view for explaining a main part of a variation of a recording/reproducing apparatus according to the third embodiment of the present invention.
Figure 10:
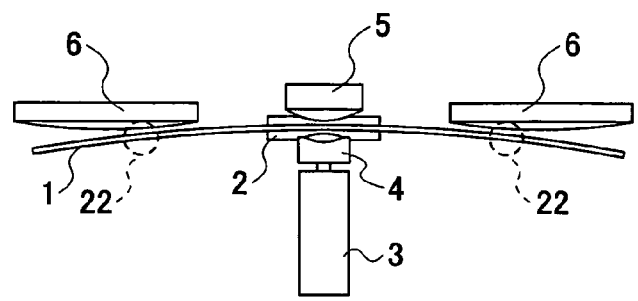
FIG. 10 is a front view showing a front of the variation of the recording/reproducing apparatus according to the third embodiment of the present invention.

Moreover, in a variation of the third embodiment as shown in FIG. 9 and FIG. 10, it is effective to arrange action points 21 of the auxiliary stabilizing members 6 in the vicinity of the straight line B1 at a side near the main stabilizing member at the region C on the disk surface which ranges between the straight line B1 near the stabilizing member 5 and the straight line B2 far from the stabilizing member 5. Two straight lines B1 and B2 pass through the two points where the straight line A crosses twice a region (circular region in FIG. 9) linking supporting point locations (periphery of the hub 2 in FIG. 9) where a warp begins on the optical disk 1 in the state in that the hub 2 of the optical disk 1 is fixed to the catching part of the spindle motor 3 and a side of the stabilizing members 5 and 6 is pushed and warped. In addition, the two straight lines are perpendicular to the straight line A.

In addition to the effects described above, it is possible to further reduce the surface vibration of the disk surface at a location of the main stabilizing member 5. In a case in that a plurality of the auxiliary stabilizing members other than the auxiliary stabilizing member 6 are arranged on the optical disk 1 in the configuration shown in FIG. 9, the counterforce which the auxiliary stabilizing members 6 receives from the optical disk 1 is set to be a maximum in the auxiliary stabilizing members other than the main stabilizing member 5 arranged on the disk surface. Accordingly, a desired effect can be assured.

In particular, in the configuration shown in FIG. 9, at least two auxiliary stabilizing members 6, which are arranged in the two regions S1 and S2, respectively, make a pair, and are located so that the action points 21 of the force of the auxiliary stabilizing members 6 toward the disk surface are arranged on a parallel straight line being parallel to the straight line B1 or B2. Therefore, it is possible to realize an approximate straight line at a location where a disk shape in a direction of the straight line A becomes approximately the disk reference surface. Moreover, it is possible to ideally realize the surface vibration reduction at the recording/reproducing location by the action of a stabilizing force of the disk surface by the main stabilizing member 5. Furthermore, the movement line of the main stabilizing member 5 in the radial direction of the optical disk 1 can be specified on a straight line in the vicinity of the disk reference surface. Therefore, it is possible to simplify the activation controlling mechanism of the main stabilizing member 5 and the optical pickup 4.

Figure 11:
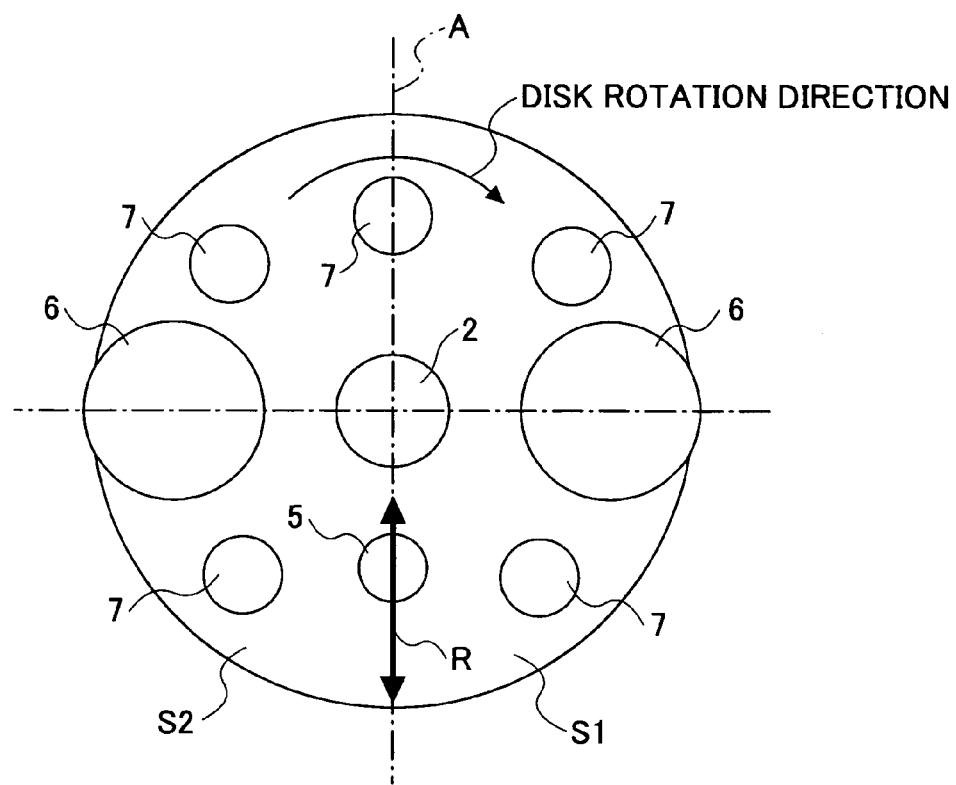
FIG. 11 is a plan view for explaining a configuration example in that the number of auxiliary stabilizing members is increased, according to the third embodiment of the present invention.

FIG. 11 is a plan view for explaining a configuration in a case in that a plurality of auxiliary stabilizing members 7 other than the auxiliary stabilizing members 6 are arranged on the disk surface. In this configuration, the auxiliary stabilizing members 6 are arranged at locations of 90° with respect to an upstream direction and a downstream direction of the main stabilizing member 5 in that the auxiliary stabilizing members 6 receive the greatest counterforce from the optical disk 1. Therefore, the desired effect can be assured.

Fifth Embodiment

In the first embodiment through the third embodiment, each configuration is described in a case in that the optical pickup 3 moves linearly in the disk radial direction. In a fifth embodiment according to the present invention, for example, if the movement line of the optical pickup 4 in the disk radial direction in an actual recording/reproducing region on the disk surface is an arc trajectory R' shown in FIG. 12, an approximate line is defined as a straight line A' (line adjacent to a curved line R' and passing through the center of the optical disk 1). Accordingly, even if a swing arm method, in which the optical pickup 4 is fixed to one end of an arm to rotate, applied, it is possible to apply any configuration from the first embodiment to the fifth embodiment.

Sixth Embodiment

Figure 14:
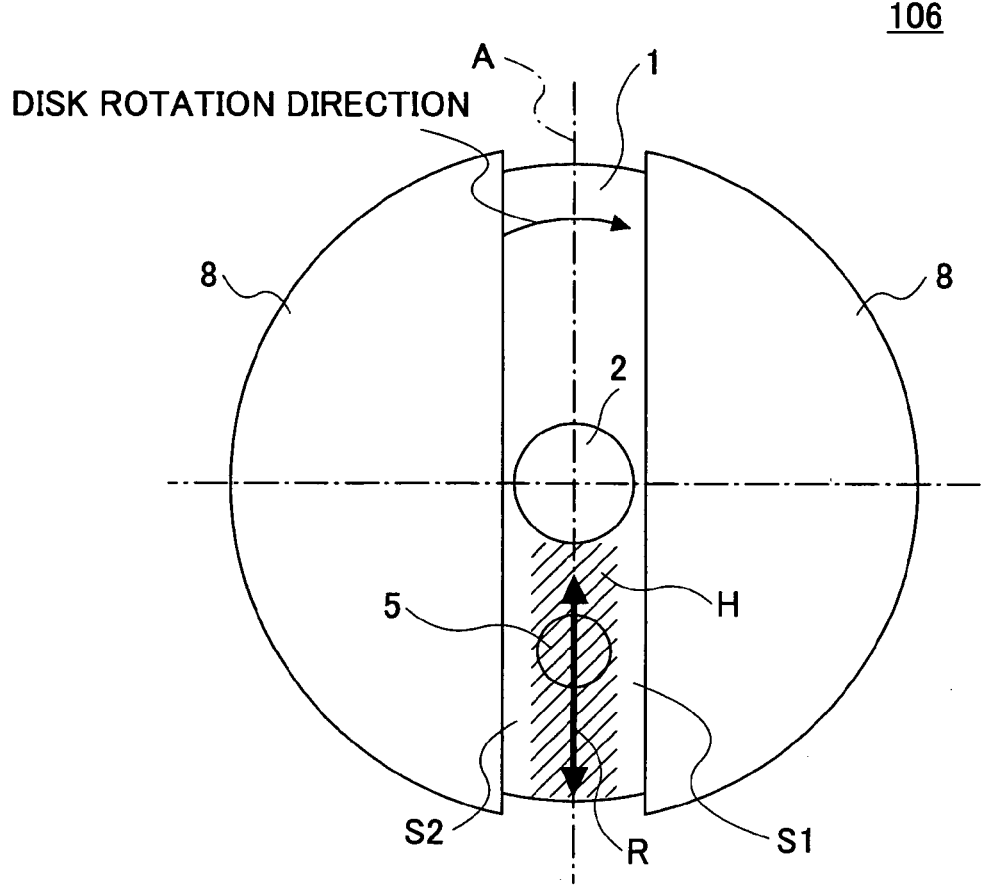
FIG. 14 is a plan view for explaining a main part of a recording/reproducing apparatus according to a sixth embodiment of the present invention.
Figure 15:
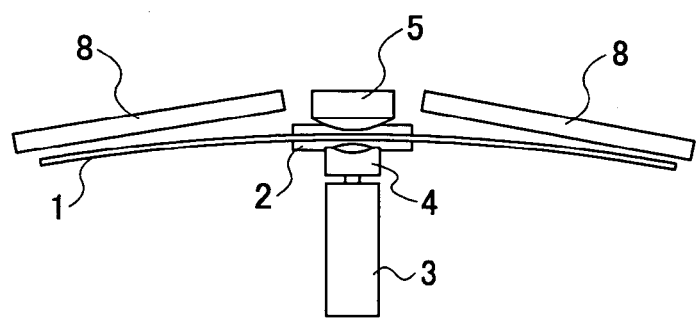
FIG. 15 is a front view showing a front of the recording/reproducing apparatus shown in FIG. 14 according to the sixth embodiment of the present invention.

Moreover, shapes of the auxiliary stabilizing members 6 are not limited to a cylinder shape in that a surface facing the optical disk 1 is formed to be a circular shape. For example, in a sixth embodiment of the present invention as shown in FIG. 14 and FIG. 15, auxiliary stabilizing members 8 being a semicircular flat board are used. The auxiliary stabilizing members 8 are arranged so as to cover two regions S1 and S2 divided by the straight line A passing around the center of the optical disk 1 as described above, avoiding the vicinity of the movement line R along which the optical pickup 4 moves to scan in a surface of the optical disk 1 (that is, avoiding the region H where the disk surface becomes stable as the disk reference surface). It should be noted that one stabilizing member 8 may be arranged in either one of the regions S1 and S2.

Figure 16:
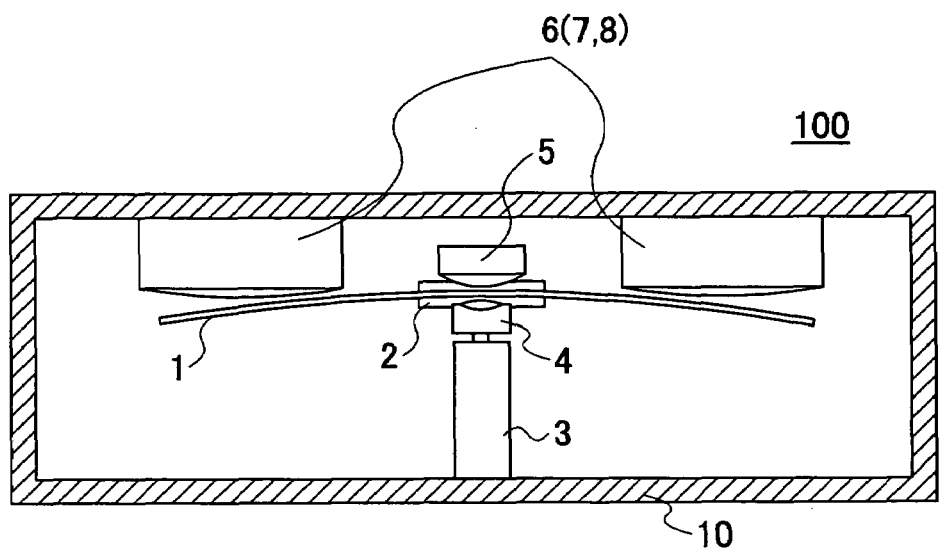
FIG. 16 is a cross-sectional view of an arrangement example of the auxiliary stabilizing member in the recording/reproducing apparatus according the present invention.

As illustrated in FIG. 16, the auxiliary stabilizing members 6 (7, 8) according to the first embodiment through the sixth embodiments are provided in a chassis 10 of the recording/reproducing apparatus 101, 102, 103, 104, 105, or 106 (hereinafter, generally called the recording/reproducing apparatus 100). This configuration can be implemented in the recording/reproducing apparatus 100 in that a disk cartridge accommodating the optical disk 1 is not used or that ejects the optical disk 1 from the disk cartridge and actuates the optical disk 1.

In this configuration, regardless of the scan of the optical pickup 4, it is possible to define locations of the action points of the auxiliary stabilizing members 6 with respect to the optical disk 1 by fixing a relative position between the auxiliary stabilizing members 6 (7, 8) and the spindle motor 3.

Figure 17:
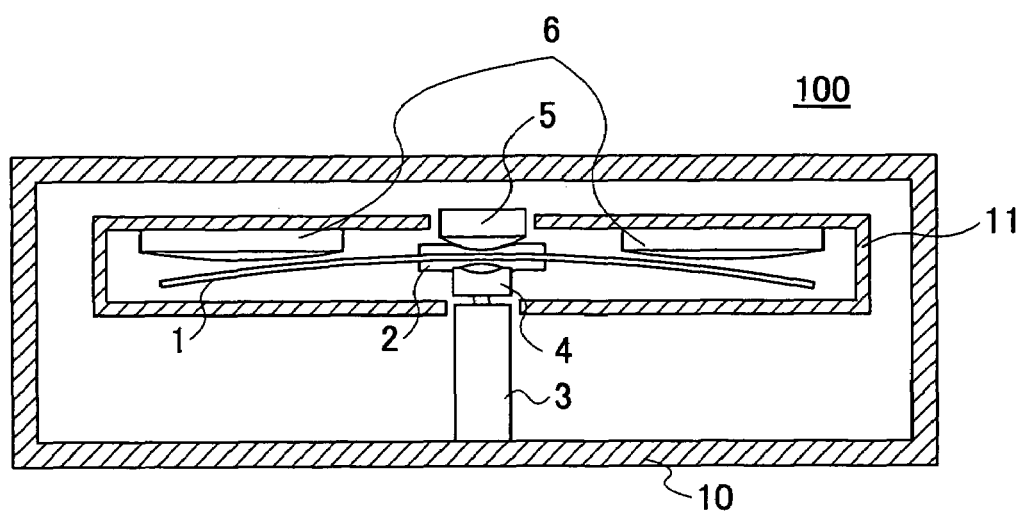
FIG. 17 is a cross-sectional view for explaining a disk cartridge according to the present invention.

As shown in FIG. 17, the auxiliary stabilizing members 6 (7, 8) in the first embodiment through the sixth embodiment can be arranged on an inside wall of the disk cartridge 11. Therefore, it is possible to simplify the configuration of the recording/reproducing apparatus 100. Moreover, in this configuration in FIG. 17, the auxiliary stabilizing members 6 can be arranged differently for each disk cartridge 11. Thus, it is possible to separately design the auxiliary stabilizing members 6 for each of various disk specifications. Accordingly, it is possible to compensate for differences of the stabilizing condition because of a variety of the disk specifications.

Figure 18:
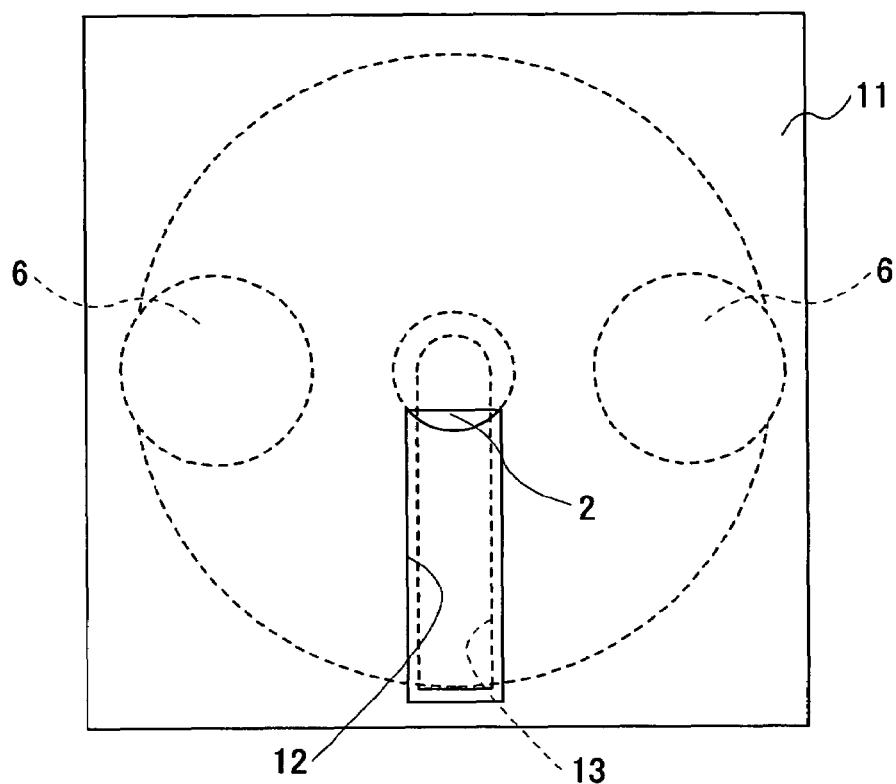
FIG. 18 is a plan view for explaining the disk cartridge according to the present invention.
Figure 19:
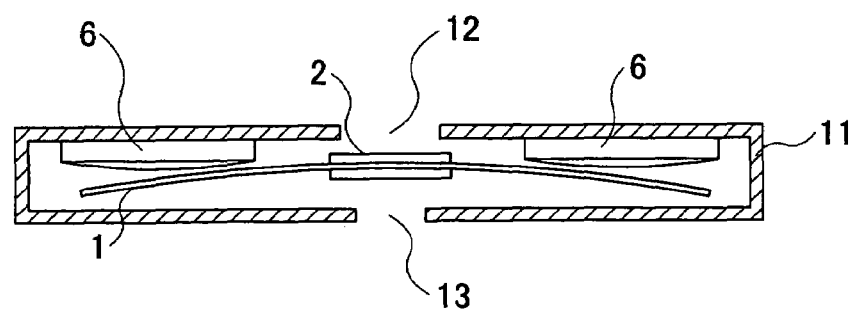
FIG. 19 is a transverse cross-sectional view of the disk cartridge shown in FIG. 18.

As the disk cartridge 11, for example, a configuration is illustrated in FIG. 18 and FIG. 19. In FIG. 18 and FIG. 19, reference number 12 denotes a first opening (hereinafter, called first opening 12) to insert the main stabilizing member 5 and move the main stabilizing member 5 in the disk radial direction, and reference number 13 denotes a second opening (hereinafter, called second opening 13) to insert the optical pickup 4 and a part of the spindle motor 3 and to mover the optical pickup 4 in disk radial direction. It should be noted that a shutter to open and close the openings 12 and 13, a mechanism to fix the optical disk 1 in the cartridge 11, and other mechanisms necessary to mount the cartridge 11 to the spindle motor 3 are not shown.

In the previous embodiments, the auxiliary stabilizing members 6 are arranged at the same side as the main stabilizing members 5. However, even if the auxiliary stabilizing members 6 are arranged at a reverse side so as to clamp the optical disk 1 with the main stabilizing member 5, the same surface vibration reduction effect can be obtained.

Methods for affecting the auxiliary stabilizing members 6 to the optical disk 1 are broadly classified into two methods: a method for affecting the auxiliary stabilizing members 6 in a direction pushing the optical disk surface as shown in the first embodiment through the third embodiment and a method for affecting the auxiliary stabilizing members 6 to pull the optical disk surface as shown in the fourth embodiment. In either one of the two methods, it is possible to obtain the same effect.

Next, the present invention will be described in detail based on examples.

EXAMPLE 1-1

In example 1-1, the configuration shown in FIG. 1 and FIG. 2 is applied. The auxiliary stabilizing member 6 is a cylinder shape having a diameter 40 mm and a curvature radius 200 mm. And a surface of the auxiliary stabilizing member 6 faces the optical disk 1 (diameter 120 mm). The main stabilizing member 5 is a cylinder shape having a diameter 10 mm and a curvature radius 100 mm. And a surface of the main stabilizing member 5 faces the optical disk 1. The auxiliary stabilizing member 6 is arranged at a location so that the auxiliary stabilizing member 6 is positioned at a location of 90° from the main stabilizing member 5 with respect to the downstream in the disk rotational direction and the center of the surface facing the optical disk 1 is positioned at a radius 45 mm of the optical disk 1. It should be noted that the main stabilizing member 5 is provided with a moving mechanism in the disk radial direction and the location controlling mechanism in the disk rotational axis direction, which are not shown in FIG. 1 and FIG. 2.

Moreover, in the example 1-1, a case of using a polycarbonate sheet having a diameter 120 mm and a thickness 75 μm as a disk substrate will be described. To prepare a disk, first, a group of stampers at a pitch 0.6 μm and a width 0.3 μm is transcribed by a thermal-transfer. After that, a sheet/Ag reflection layer is formed by a sputtering process in order of 120 nm/(ZrO2-Y2O3)-SiO2 7 nm/AgInSbTeGe 10 nm/ZnS—SiO2 25 nm/Si3N4 10 nm. An information recording region is provided in a range (radius 20 mm to 58 mm) from a diameter 40 mm of an inside perimeter to a diameter 118 mm of an outside perimeter. After that, an UV resin is spin-coated and hardened by illuminating a ultra-violet light. Then, a transparent protective film having a thickness 5 μm is formed. Moreover, a hard coat having a thickness 10 μm is conducted at a reverse side. The hub 2 having an external diameter 30 mm, an internal diameter 15 mm, and a thickness 0.3 mm is provided in the center of the optical disk 1. This optical disk 1 is warped slightly toward a side where the hard coat is conducted in a finished state.

The optical disk 1 is rotated at three levels of speed: 5 m/sec, 15 m/sec, and 30 m/sec, and the surface vibration of the optical disk 1 is evaluated by arranging a laser displacement measuring device at a location of the optical pickup 4. Since basically, a degree of the surface vibration is likely to become greater from the inside perimeter to the outside perimeter, an evaluation location of the surface vibration is defined to be at a radius 55 mm of the outside perimeter where the surface vibration reduction is difficult. In this case a pushing amount of the auxiliary stabilizing member 6 toward the disk surface is set to be 4 mm in that the disk reference surface is defined as a reference. In this case, the disk reference surface is the disk surface at a side of the main stabilizing member when it is assumed that the optical disk 1 is ideally flat.

Based on an evaluation result of the surface vibration, the pushing amount (location adjustment amount in the disk rotational axis direction) toward the disk surface by the main stabilizing member 5 is obtained so that the surface vibration at the radius 55 mm becomes less than 10 μm. Since the pushing amount necessary to reduce the surface vibration is likely to become greater from the inside perimeter to the outside perimeter, the pushing amount needed at the outside perimeter is defined as a maximum adjustment amount in a case of actuating the main stabilizing member 5 to move in the disk radial direction. That is, the smaller is the maximum adjustment amount, the more the surface vibration can be reduced in a state in that the movement line to actuate the main stabilizing member 5 to move in the disk radial direction is closer to the disk reference surface. Based on this relationship, in the example 1-1, the pushing amount of the main stabilizing member 5 needed at the outside perimeter of the optical disk 1 is evaluated from the viewpoint of how much closer the movement line of the main stabilizing member 5 in the disk radial direction can be to the disk reference surface.

EXAMPLE 1-2

Example 1-2 will be described with reference to the configuration shown in FIG. 3 and FIG. 4. In the configuration of the example 1-1 as a basic configuration, the auxiliary stabilizing member 6 is arranged at locations so that the auxiliary stabilizing member 6 is positioned at the location of 90° from the main stabilizing member 5 with respect to the downstream in the disk rotational direction and the center of the surface facing the optical disk 1 is positioned at a radius 45 mm of the optical disk 1.

Moreover, the hard coat for the optical disk 1 is omitted from the specification of the example 1-1. In this configuration, the optical disk 1 is warped slightly toward a side of the transparent protective film in the finished state.

The evaluation condition and evaluation items are the same as those in the example 1-1.

EXAMPLE 1-3

In the example 1-3, the configuration shown in FIG. 5 and FIG. 6 is applied. Both the auxiliary stabilizing members 6 are a cylinder shape having a diameter 40 mm and a curvature radius 200 mm. And each surface of both the auxiliary stabilizing members 6 faces the optical disk 1 (diameter 120 mm). The main stabilizing member 5 is a cylinder shape having a diameter 10 mm and a curvature radius 100 mm. And a surface of the main stabilizing member 5 faces the optical disk 1. Both the auxiliary stabilizing members 6 are arranged at locations so that the auxiliary stabilizing members 6 are positioned at both locations of 90° from the main stabilizing member 5 with respect to the downstream in the disk rotational direction and the center of the surface facing the optical disk 1 is positioned at the radius 45 mm of the optical disk 1.

The main stabilizing member 5 is provided with the moving mechanism in the disk radial direction and the location controlling mechanism in the disk rotational axis direction. It should be noted that the pushing amount of both the auxiliary stabilizing members 6 toward the disk surface is determined to be 3 mm when the disk reference surface is defined as a reference.

The optical disk 1 used in the example 1-1 is used in the example 1-3, and also, the evaluation condition and the evaluation items used in the example 1-1 are used in the example 1-3.

EXAMPLE 1-4

Figure 12:
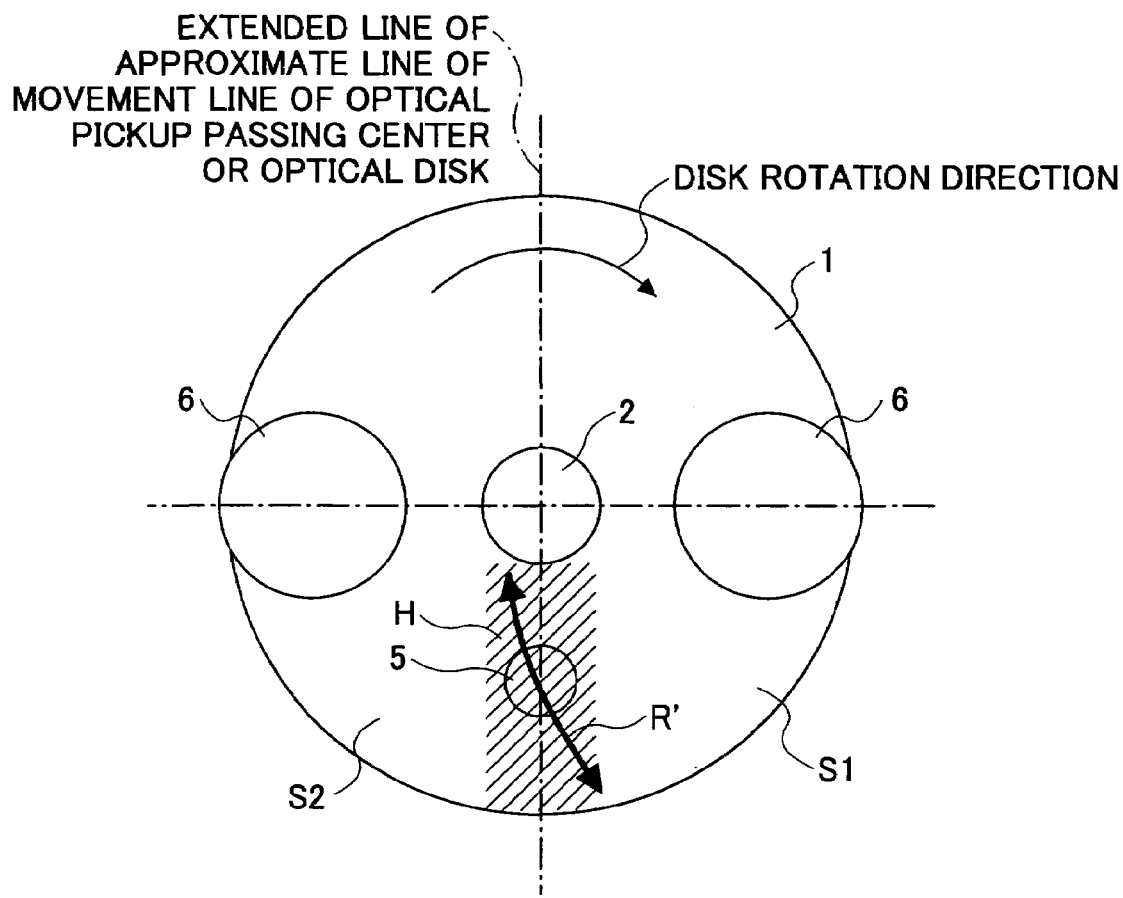
FIG. 12 is a plan view for explaining a main part of a recording/reproducing apparatus according to a fifth embodiment of the present invention.
Figure 13:
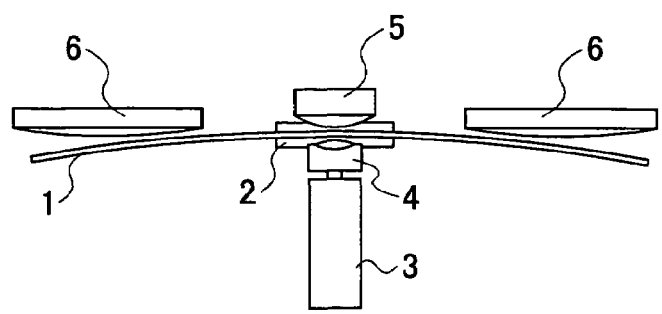
FIG. 13 is a front view showing a front of the recording/reproducing apparatus according to the fifth embodiment of the present invention.

In example 1-4, the configuration shown in FIG. 12 and FIG. 13 is applied. The auxiliary stabilizing members 6 have the same shape and are arranged at the same location as the example 1-3. In the example 1-4, the optical pickup 4 is provided with a movable mechanism in a swing arm method. Similarly, the main stabilizing member 5 is provided with the moving mechanism in the disk radial direction and the location controlling mechanism in the disk rotational axis direction. The movement line in the radial direction of the main stabilizing member 5 is set on the approximate straight line A of a movement line of the optical pickup 4 passing the disk center based on a calculation using a least squares method.

The optical disk 1 used in the example 1-1 is used in the example 1-4, and also, the evaluation condition and the evaluation items used in the example 1-1 are used in the example 1-4.

EXAMPLE 1-5

In example 1-5, the configuration shown in FIG. 9 and FIG. 10 is applied. In FIG. 9 and FIG. 10, reference number 21 denotes an adjacent point (hereinafter, called adjacent point 21) of the auxiliary stabilizing member 6 and the optical disk 1 and reference number 22 denotes an adjacent region (hereinafter, adjacent region 22) of the auxiliary stabilizing member 6 and the optical disk 1. Both the auxiliary stabilizing members 6 are a cylinder shape having a diameter 40 mm and a curvature radius 200 mm. Each surface of both the auxiliary stabilizing members 6 faces the optical disk 1 (diameter 120 mm). The main stabilizing member 5 is a cylinder shape having a diameter 10 mm and a curvature radius 100 mm. And a surface of the main stabilizing member 5 faces the optical disk 1. The auxiliary stabilizing members 6 are arranged at the upstream side and the downstream side of the main stabilizing member 5 in the disk rotational direction, respectively. In detail, the auxiliary stabilizing members 6 are arranged at locations within 2 mm from a boundary of a side of the main stabilizing member 5 in a range toward the main stabilizing member 5 in the region C defined based on a diameter of the hub 2 (the center of a curved surface of each auxiliary stabilizing member 6 is positioned to this location). The pushing amount of both the auxiliary stabilizing members 6 toward the disk surface is determined to be 3 mm when the disk reference surface is defined as a reference.

Furthermore, both the auxiliary stabilizing members 6 are arranged to clamp the movement line R of the optical pickup 4 and be symmetrical, and a distance from the movement line of the optical pickup 4 is determined to be 45 mm. In this configuration, the adjacent points 21 of the auxiliary stabilizing members 6 and the optical disk 1 are set to be around a boundary line B1 toward the main stabilizing member 5 within the region C.

The optical disk 1 used in the example 1-1 is used in the example 1-5, and also, the evaluation condition and the evaluation items used in the example 1-1 are used in the example 1-5.

EXAMPLE 1-6

In example 1-6, the configuration shown in FIG. 14 and FIG. 15 is applied. In FIG. 14 and FIG. 15, the auxiliary stabilizing members 8 are semicircular flat boards covering the optical disk 1, and the main stabilizing member 5 is a cylinder shape having a curvature radius 100 mm and a diameter 10 mm and has a surface facing the optical disk 1. As above-described, the main stabilizing member 5 is provided with the movement mechanism in the disk radial direction and the location controlling mechanism in the disk rotational axis direction, which are not shown in FIG. 14 and FIG. 15.

In addition, both the auxiliary stabilizing members 8 are inclined at 8° with respect to the disk rotational axis line, and both the auxiliary stabilizing members 8 and the optical disk 1 are pushed toward the disk surface at a location of a radius 45 mm of the optical disk 1 so as to be adjacent to each other.

The optical disk 1 used in the example 1-1 is used in the example 1-6, and also, the evaluation condition and the evaluation items used in the example 1-1 are used in the example 1-6.

EXAMPLE 1-7

In example 1-7, the configuration shown in FIG. 7 and FIG. 8 is applied. In FIG. 7 and FIG. 8, the auxiliary stabilizing members 6 have a surface facing the optical disk 1, having a curvature radius 500 mm and being a semicircle larger than the outside perimeter of the optical disk 1 as shown in FIG. 7 and FIG. 8. In addition, In addition, locations in the disk rotational axis direction for both the auxiliary stabilizing members 6 are set so that vertex locations adjacent to the optical disk 1 of the auxiliary stabilizing members 6 are located at 0.2 mm distanced from the disk reference surface. The main stabilizing member 5 is a cylinder shape having a curvature radius 100 mm and a diameter 10 mm and has a surface facing the optical disk 1.

The main stabilizing member 5 is provided with the movement mechanism in the disk radial direction and the location controlling mechanism in the disk rotational axis direction, which are not shown in FIG. 7 and FIG. 8.

The optical disk 1 used in the example 1-1 is used in the example 1-7, and also, the evaluation condition and the evaluation items used in the example 1-1 are used in the example 1-7.

COMPARATIVE EXAMPLE 1-1

Figure 20:
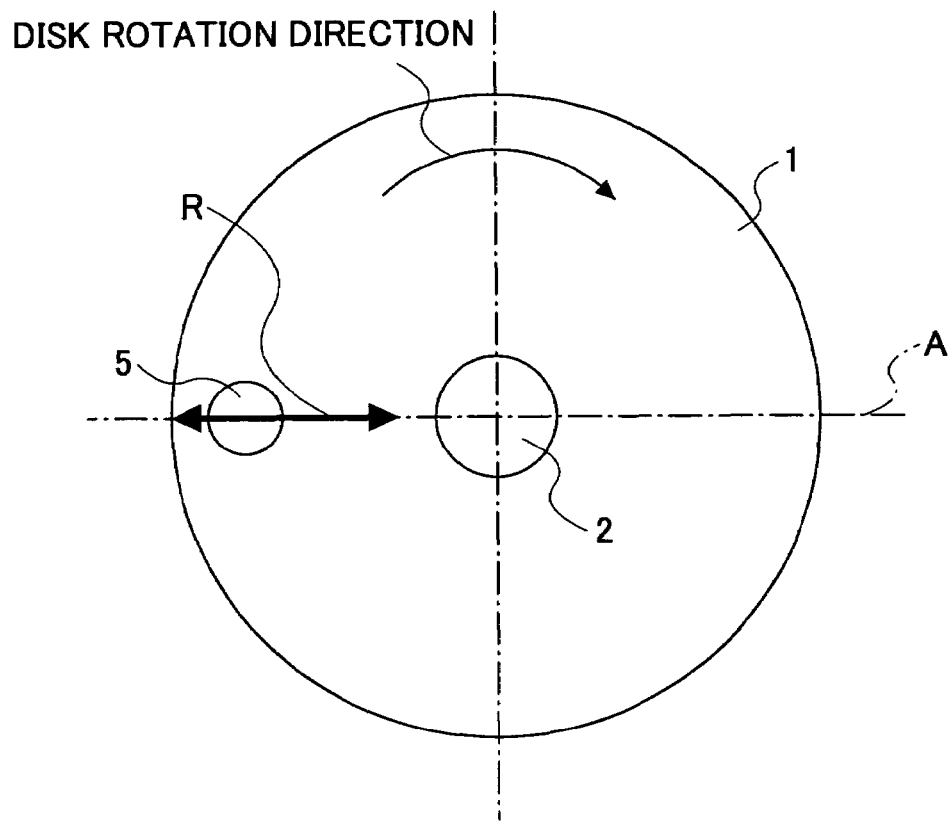
FIG. 20 is a plan view for explaining configurations according to a comparative example and the first through the sixth embodiments of the present invention.
Figure 21:
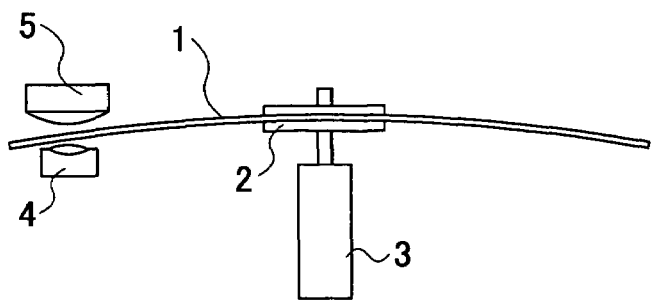
FIG. 21 is a front view showing the comparative example shown in FIG. 20.

FIG. 20 is a plan view for explaining a main part of a recording/reproducing apparatus as a comparative example 1-1. FIG. 21 is a front view showing the recording/reproducing apparatus as the comparative example 1-1 in FIG. 20. In the recording/reproducing apparatus 99 shown in FIG. 20 and FIG. 21, only the main stabilizing member 5 is arranged. The main stabilizing member 5 is a cylinder shape having a curvature radius 100 mm and a diameter 10 mm and has a surface facing the optical disk 1. In FIG. 20 and FIG. 21, parts that are the same as those shown in the previously described figures are given the same reference numbers, and description thereof is omitted. The main stabilizing member 5 is provided with the movement mechanism in the disk radial direction and the location controlling mechanism in the disk rotational axis direction.

The optical disk 1 used in the example 1-1 is used in the recording/reproducing apparatus 99, and also, the evaluation condition and the evaluation items used in the example 1-1 are used in the recording/reproducing apparatus 99.

FIG. 22 is a diagram showing the pushing amount of the main stabilizing member as a result of comparing each example and the comparative example 1-1. In FIG. 22, by comparing each example and the comparative example 1-1, the result shows the pushing amount of the main stabilizing member 5 needed so that the surface vibration of the optical disk 1 having a radius 55 mm is set to be 10 μm. As seen in the result shown in FIG. 22, in each example, it is possible to significantly improve the pushing amount of the main stabilizing member 5 in order to reduce the surface vibration. The pushing amount 2.0 through 2.6 mm is required in the comparative example 1-1. On the other hand, the pushing amount 0.2 mm is required at most in each example. Accordingly, the present invention has a profound effect. In particular, in the examples 1-3 through 1-7, a preferable surface vibration being less than 10 μm can be obtained without pushing the main stabilizing member 5. Therefore, a more ideal state can be realized.

Moreover, in a case in which a linear velocity is changed, the pushing amount is increased in the comparative example 1-1. On the other hand, the pushing amount is just slightly changed in the examples 1-1 and 1-2, and especially, the pushing amount is not changed at all in the example 1-3 through 1-7. In the examples 1-3 through 1-7, although this slight change influences the surface vibration, a change amount of the surface vibration is a slight amount.

FIG. 23 is a diagram showing an evaluation result of the surface vibration. In each example and the comparative example 1-1, the main stabilizing member 5 is provided with a tilt controlling mechanism and the pushing amount and an optimum adjustment is conducted to a tilt angle of the main stabilizing member 5. In this state, the surface vibration is evaluated at a linear velocity 15 m/sec at a location of the radius 55 mm. The evaluation result shown in FIG. 23 shows that in each example, it is possible to reduce the surface vibration in a state in that the movement line for the main stabilizing member 5 to move the optical disk in the disk radial direction is approached toward the disk reference surface and it is further possible to increase the surface vibration reduction effect by the auxiliary stabilizing member 6.

In the optimum adjustment in the comparative example 1-1, the surface vibration reduction is limited to be 5 μm. However, in the optimum adjustment in the examples 1-1 through 1-7, it is possible to reduce the surface vibration less than 4 μm at least.

In the configuration according to the example 1-3 as a representative, a first sample changed from the disk specification described in the example 1-1 is prepared in that by changing a thickness of the hard coat film in a range from 0 μm to 20 μm, a warp state of the optical disk 1 is changed from a convex shape to a concave shape with respect to a side of the main stabilizing member 5. As defined the disk specification described in the example 1-1 as a reference, a second sample is prepared in that a thickness of a polycarbonate film to be a disk material is changed in a range from 50 μm to 120 μm. Regardless of these various change of the disk specifications such as the first and second samples, by providing the auxiliary stabilizing members 6 and the main stabilizing member 5 according to the example 1-3, a similar evaluation result can be obtained in any disk specification. It should be noted that the range of the linear velocity for the evaluation and the radial location for the evaluation are the same as previously described.

Moreover, the location of the auxiliary stabilizing member 6 in the disk rotational axis is selectively adjusted corresponding to the warp state of each optical disk 1. A pertinent condition adjustment for the auxiliary stabilizing member 5 is different for each disk specification. As shown in FIG. 17 through FIG. 19, the auxiliary stabilizing member 6 is mounted on the inside wall of the disk cartridge 11, and an arrangement condition of the auxiliary stabilizing member 6 mounted on the inside wall of the disk cartridge 11 for accommodating the optical disk 1 is adjusted for each disk specification. Therefore, it is possible to reduce the surface vibration in a desired condition without awareness of the disk specification at a side of the recording/reproducing apparatus 100.

For example, regarding an adjustment of the arrangement condition, it is possible to easily adjust the arrangement condition by having a configuration capable of adjusting and arranging a location of the auxiliary stabilizing member 6 in the disk cartridge 11. Alternatively, by configuring a cartridge forming die to be capable of moving a portion for forming the auxiliary stabilizing member based on the disk specification, it is possible to fabricate the disk cartridge 11 corresponding to various disk specifications without increasing die cost, when the disk cartridge 11 is fabricated.

According to the present invention, by a simple control of stabilizing members 5, 6, 7, and 8 operating the aerodynamic effect toward the optical disk 1 having flexibility, it is possible to provide the recording/reproducing apparatus 100 that can reduce the surface vibration at the recording/reproducing location on the optical disk 1, and that can easily conduct the location adjustment of the optical pickup 4 as a recording/reproducing head toward the recording/reproducing location.

The present invention can be applied to a recording/reproducing apparatus for conducting a recording or reproducing process with respect to a recordable disk having flexibility and to a disk cartridge for accommodating the recordable disk. The recordable disk, to which the present invention can be applied, can be a recordable disk having a disk shape such as a phase change memory, a magnetic optical memory, or a hologram memory.

Seventh Embodiment

Figure 24:
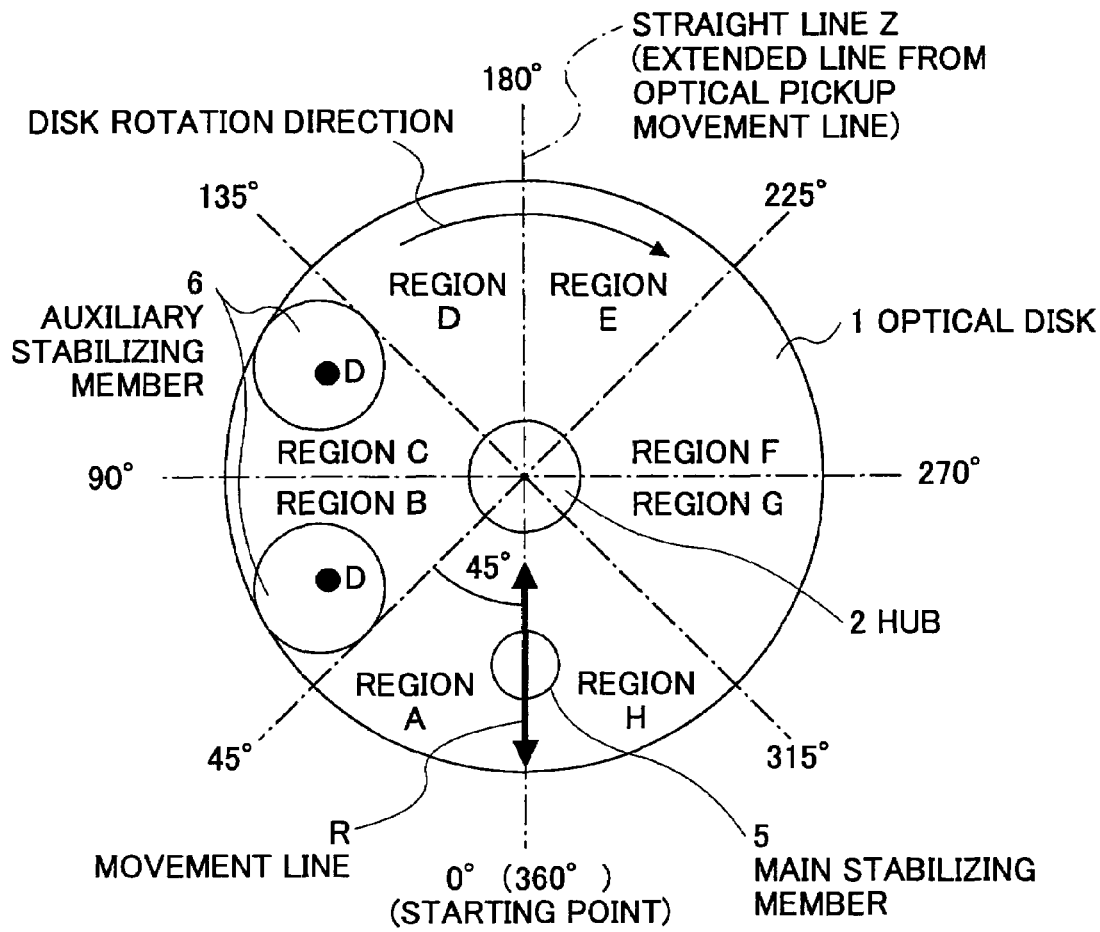
FIG. 24 is a plan view for explaining a main part of a recording/reproducing apparatus according to an seventh embodiment of the present invention.
Figure 25:
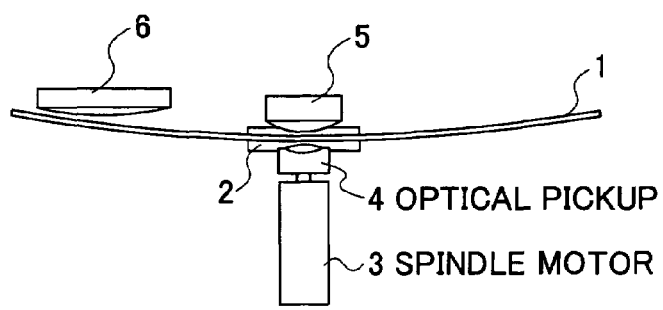
FIG. 25 is a front view showing a front of the recording/reproducing apparatus shown in FIG. 24 according to the seventh embodiment of the present invention.

FIG. 24 is a plan view for explaining a main part of a recording/reproducing apparatus according to a seventh embodiment of the present invention. FIG. 25 is a front view of the recording/reproducing apparatus shown in FIG. 24 according to the seventh embodiment of the present invention. In the recording/reproducing apparatus 108 according to the seventh embodiment of the present invention, reference number 1 denotes an optical disk (hereinafter, called optical disk 1) as a recordable disk being flexible, reference number 2 denotes a hub (hereinafter, called hub 2) being one holding member holding and rotating the optical disk 1 mounted at a rotation center part of the optical disk 1, reference number 3 denotes a spindle motor (hereinafter, called spindle motor 3) engaging a catching member as another holding member with the hub 2, and reference number 4 denotes an optical pickup (hereinafter, called optical pickup 4) as a recording/reproducing part for condensing a light beam with respect to the optical disk 1 by moving the optical disk 1 in a radial direction and for conducting an optical scan (toward a direction of an optical pickup movement line R) with respect to the optical disk 1 to conduct a recording/reproducing process for recording or reproducing information.

Moreover, reference number 5 denotes a main stabilizing member (hereinafter, called main stabilizing member 6) that moves in the radial direction of the optical disk 1 accompanying the optical pickup 4 and suppresses surface vibration of the optical disk 1 at least around a recording/reproducing location of the optical pickup 4 on the optical disk 1 by utilizing an aerodynamic action force of Bernoulli's principle, and reference number 6 denotes an auxiliary stabilizing member (hereinafter, called auxiliary stabilizing member 6) applying the aerodynamic action force to the optical disk 1 similar to the main stabilizing member 5. The main stabilizing member 5 and the auxiliary stabilizing member 6 are arranged at a disk substrate side being a reverse side of the recording surface of the optical disk 1.

In the optical disk 1 in the seventh embodiment, the main stabilizing member 5 is mounted to be movable corresponding to a straight line Z adjacent to a movement line R along which the optical pickup 4 scans on a surface of the optical disk 1 and which line Z passes the vicinity of the center of the optical disk 1 (straight line Z is drawn on the optical pickup movement line R in FIG. 24 and can be a line being in the vicinity of the optical pickup movement line R). In addition, as defined the straight line Z as a starting point, the optical disk 1 is divided into eight regions A, B, C, D, E, F, G, and H at approximately 45° intervals. The auxiliary stabilizing member 6 separately from the main stabilizing member 5 is arranged at each portion where flexibility of the optical disk 1 exists in the region B of approximately 45° through 90° from the starting point and the region C of approximately 90° through 135° from the starting point. In each of the region B and the region C, the auxiliary stabilizing member 6 is arranged so that at least one action point D of an aerodynamic force exists. In the seventh embodiment, one action point D exists in each of the region B and the region C by arranging each auxiliary stabilizing member 6.

Eighth Embodiment

Figure 26:
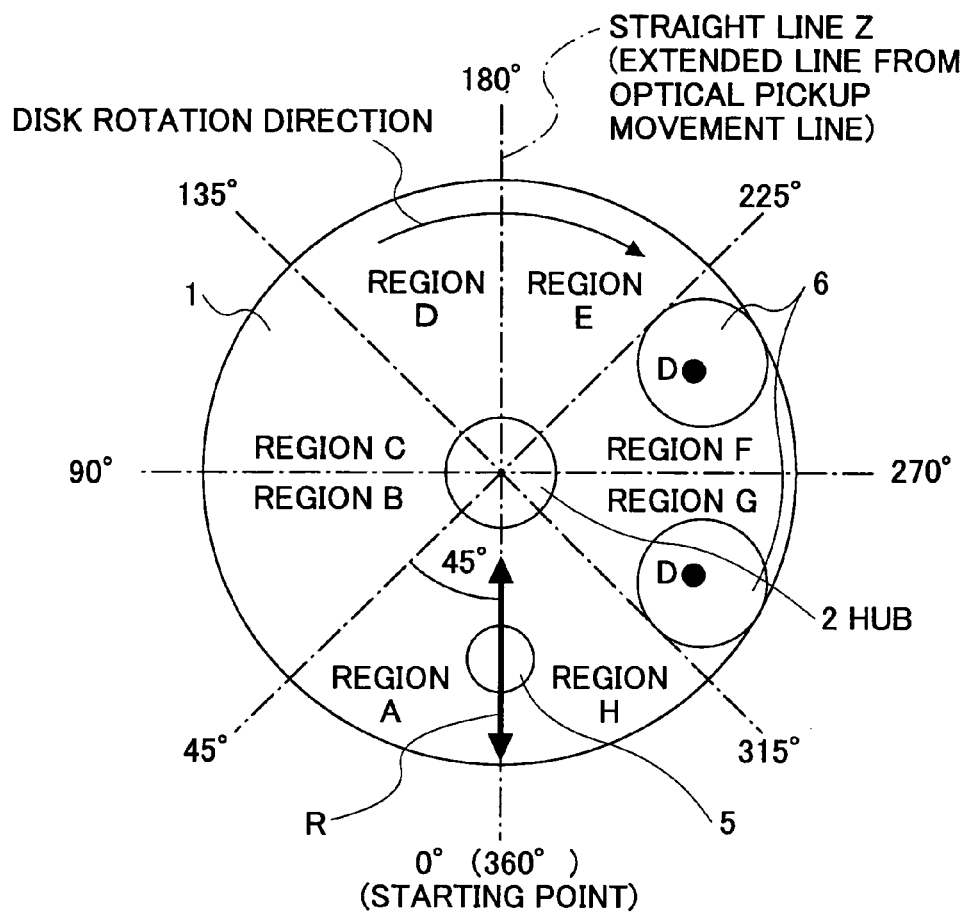
FIG. 26 is a plan view for explaining a main par of a recording/reproducing apparatus according to an eighth embodiment of the present invention.
Figure 27:
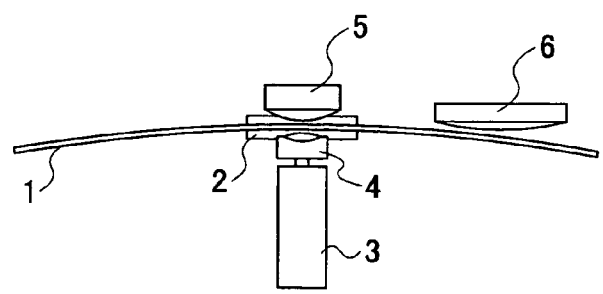
FIG. 27 is a front view showing a front of the recording/reproducing apparatus shown in FIG. 26 according to the eighth embodiment of the present invention.

FIG. 26 is a plan view for explaining a main part of a recording/reproducing apparatus according to an eighth embodiment of the present invention. FIG. 27 is a front view showing the recording/reproducing apparatus shown in FIG. 26 according to the eighth embodiment of the present invention. In the following, parts that are the same as those shown in the previously described figures are given the same reference numbers, and description thereof is omitted.

Different from the seventh embodiment in the eighth embodiment, in the recording/reproducing apparatus 209 according to the eighth embodiment of the present invention, the auxiliary stabilizing member 6 separately from the main stabilizing member 5 is arranged at a portion where the flexibility of the optical disk 1 exists at approximately 225° through approximately 270° from the starting point in the region F and at approximately 270° through approximately 315° in the region G of the regions A, B, C, D, E, F, G, and H divided in the same manner described in the seventh embodiment. In addition, the auxiliary stabilizing member 6 is arranged so that at least one action point D of an aerodynamic force exists. In the eighth embodiment, one action point D exists in each of the region F and the region G by arranging each auxiliary stabilizing member 6.

Ninth Embodiment

Figure 28:
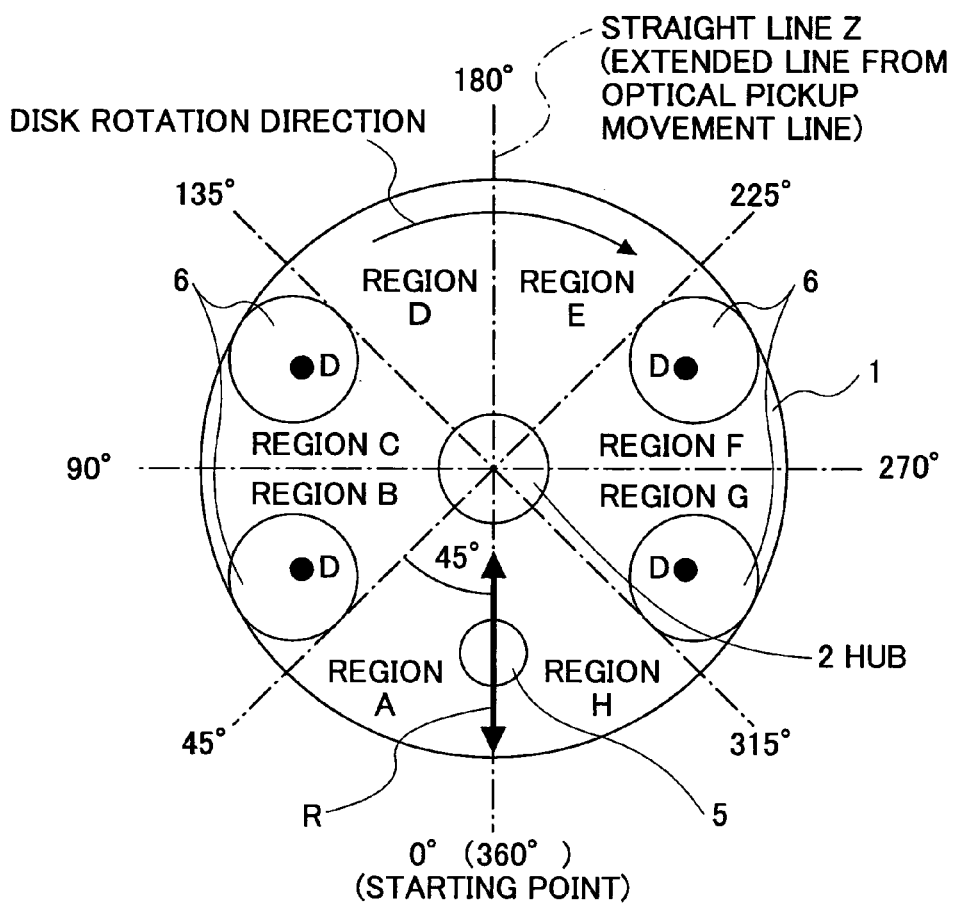
FIG. 28 is a plan view for explaining a main part of a recording/reproducing apparatus according to a ninth embodiment of the present invention.
Figure 29:
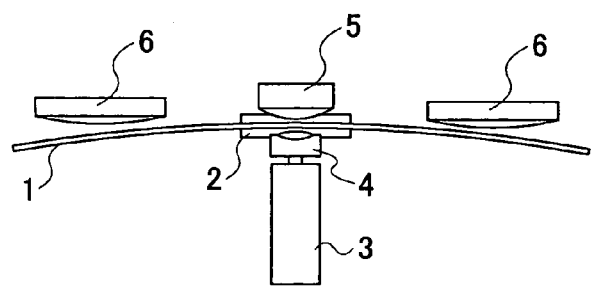
FIG. 29 is a front view showing a front of the recording/reproducing apparatus shown in FIG. 28 according to the ninth embodiment of the present invention.

FIG. 28 is a plan view for explaining a main part of a recording/reproducing apparatus according to a ninth embodiment of the present invention. FIG. 29 is a front view showing the recording/reproducing apparatus shown in FIG. 28 according to the ninth embodiment of the present invention. Different from the seventh and eighth embodiments, in the recording/reproducing apparatus 110, at least one auxiliary stabilizing member 6 separately from the main stabilizing member 5 is arranged at a portion where the flexibility of the optical disk 1 in each of the regions B, C, F, and G of the regions A, B, C, D, E, F, G, and H divided in the same manner described in the seventh embodiment. At least four auxiliary stabilizing members 6 are arranged in the regions B, C, F, and G so as to locate sandwich the straight line Z. In the ninth embodiment, one auxiliary stabilizing member 6 is located in each of the regions B, C, F, and G.

Tenth Embodiment

Figure 30:
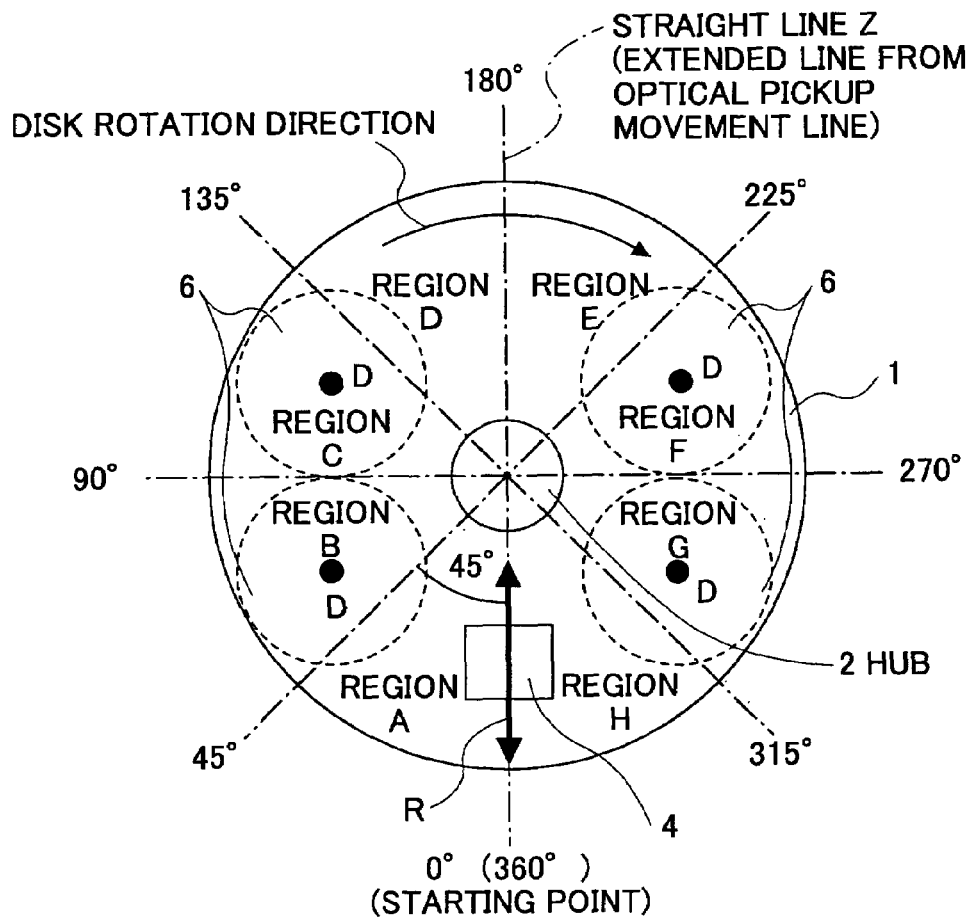
FIG. 30 is a plan view for explaining a main part of a recording/reproducing apparatus according to a tenth embodiment of the present invention.
Figure 31:
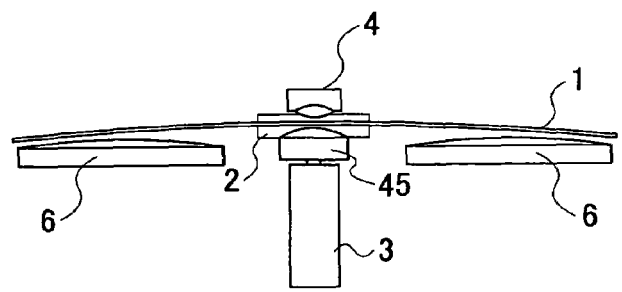
FIG. 31 is a front view showing a front of the recording/reproducing apparatus shown in FIG. 30 according to the tenth embodiment of the present invention.

FIG. 30 is a plan view for explaining a main part of a recording/reproducing apparatus according to an tenth embodiment of the present invention. FIG. 31 is a front view showing the recording/reproducing apparatus shown in FIG. 30 according to the tenth embodiment of the present invention. Different from the ninth embodiment, in the recording/reproducing apparatus 111, the main stabilizing member 5 and the auxiliary stabilizing members 6 are arranged under the optical disk 1 and the optical pickup 4 is arranged above the optical disk 1. Similar to the seventh embodiment, the optical disk 1 is divided into the regions A, B, C, E, F, G, and H and at least one auxiliary stabilizing member 6 separately from the main stabilizing member 5 is arranged at a portion in each of the regions B, C, F, and G where the flexibility of the optical disk 1 exists. At least four auxiliary stabilizing members 6 are arranged in the regions B, C, F, and G so as to locate sandwich the straight line Z. In the tenth embodiment, the optical disk 1 is pulled toward the auxiliary stabilizing members 6. Accordingly, a method for applying the action force in the tenth embodiment is different from a method for pressing the auxiliary stabilizing members 6 toward the optical disk 1 in the ninth embodiment.

It is important to consider a balance condition between stabilizing members 5 and 6 and the optical disk 1 in order to suppress the surface vibration of the optical disk 1 by occurring the aerodynamic force between the main stabilizing member 5 and the optical disk 1 being flexible in a basic configuration according to each embodiment. In particular, a reaction force toward the main stabilizing member 5 of the optical disk 1 is an important parameter. This reaction force is determined based on rigidity of the optical disk 1 and a floating force occurring when the optical disk 1 is rotated and attempts to be planarized. In principle, the balance condition depends on parameters such as a radial position of the main stabilizing member 5, a disk rotational speed, and a disk specification. Accordingly, a complicated adjustment activating mechanism is required.

The above-mentioned point was considered and experimented, and then the aerodynamic force was applied to a disk surface by using various arbitrary stabilizing members. The disk surface near approximately ±90° degrees with respect to the disk rotational direction from the upstream side to the downstream side became closer to a disk reference surface in a case of the optical disk 1 having an ideal flat surface and showed a straight through surface of the optical disk 1.

In this phenomenon, regarding a necessary condition to form a region having the straight through surface on the optical disk 1, it was found that there is a constant relationship between a point applying a force and a region becoming the straight through surface.

As a result, according to the seventh through tenth embodiments, as previously described, the optical disk 1 is divided into eight regions A through H, and an arbitrary combination of regions where action forces of the auxiliary stabilizing members 6 are applied is indicated. Therefore, it is possible to realize a location of the main stabilizing member 5, that is, a shape of the optical disk 1 on the movement line R (movement line to scan) of the optical pickup 4, to be the straight through.

Mechanically, deformation of a disk shape in a case of applying the force defining the center of the optical disk 1 as a fulcrum is considered to be a problem. As a result, action points of the force to liberalize the disk shape on the straight line Z are limited to be in the regions B and C, the regions F and G, or the regions B, C, F, and G. A conclusion is obtained in that a mechanical deformation phenomenon occurs not only in a static state but also in a case of affecting the stabilizing members 5 and 6 by rotating the optical disk 1.

Details of the seventh, eighth, ninth, and tenth embodiments are described.

In the seventh embodiment shown in FIG. 24 and FIG. 25, compared with a configuration of a single main stabilizing member 5, the surface vibration reduction effect could be sufficiently obtained at a location of a lower pushing amount against the optical disk 1 of the main stabilizing member 5 by the action force of one auxiliary stabilizing member 6. Accordingly, it is possible to position the movement line R in a disk radial direction for the main stabilizing member 5 and the optical pickup 4 limitedly within a range near the disk reference surface where the surface vibration is suppressed. Therefore, it is possible for the adjustment mechanism to have a margin, so that the adjustment mechanism can be simplified.

Similar to the seventh embodiment, in a configuration according to the eighth embodiment shown in FIG. 26 and FIG. 27, compared with a configuration of a single main stabilizing member 5, the surface vibration reduction effect could be sufficiently obtained at a location of a lower pushing amount against the optical disk 1 of the main stabilizing member 5 by the action force of one auxiliary stabilizing member 6. Accordingly, it is possible to position the movement line R in a disk radial direction for the main stabilizing member 5 and the optical pickup 4 limitedly within a range near the disk reference surface where the surface vibration is suppressed. Therefore, it is possible to simplify the adjustment mechanism.

In the ninth embodiment shown in FIG. 28 and FIG. 29, compared with the configurations of the seventh and eighth embodiments, the surface vibration reduction effect could be sufficiently obtained at the location of the lower pushing amount against the optical disk 1 of the main stabilizing member 5 by the action force of one auxiliary stabilizing member 6. In particular, in the configuration of the ninth embodiment, the surface vibration reduction effect can be obtained practically and sufficiently in the entire radial direction even in a case in that the pushing amount of the main stabilizing member 5 is set to be in the vicinity of zero, that is, a disk rotational direction position of the main stabilizing member 5 is fixed in the vicinity of the disk reference surface, and the main stabilizing member 5 moves along the disk reference surface.

Accordingly, it is not required to adjust the surface vibration by a location control or a like in the rotational axis direction of the main stabilizing member 5. Therefore, it is possible to significantly simplify an activation controlling mechanism according to the main stabilizing member 5 and the optical pickup 4.

In the configurations from the seventh embodiment to the tenth embodiment, it can be seen easily that the surface vibration at the recording/reproducing location can be optimized by additionally providing a location controlling mechanism or a tilt control system in the disk rotational axis direction to the main stabilizing member 5 and conducting a fine adjustment having higher precision. Even in a case of providing a mechanism conducting the fine adjustment having higher precision, by applying the auxiliary stabilizing member 5 according to the present invention, an amount of the adjustment can be smaller in the mechanism above-described for conducting a suitable adjustment with respect to the surface vibration at the recording/reproducing location.

Moreover, by applying the auxiliary stabilizing member 6 according to the present invention, the surface vibration of the optical disk 1 could be certainly reduced at the recording/reproducing location, regardless of a static warped shape of the optical disk 1 in any specific recordable disk. Furthermore, a basic surface vibration reduction effect could be increased by applying the auxiliary stabilizing member 6 according to the present invention.

Figure 32:
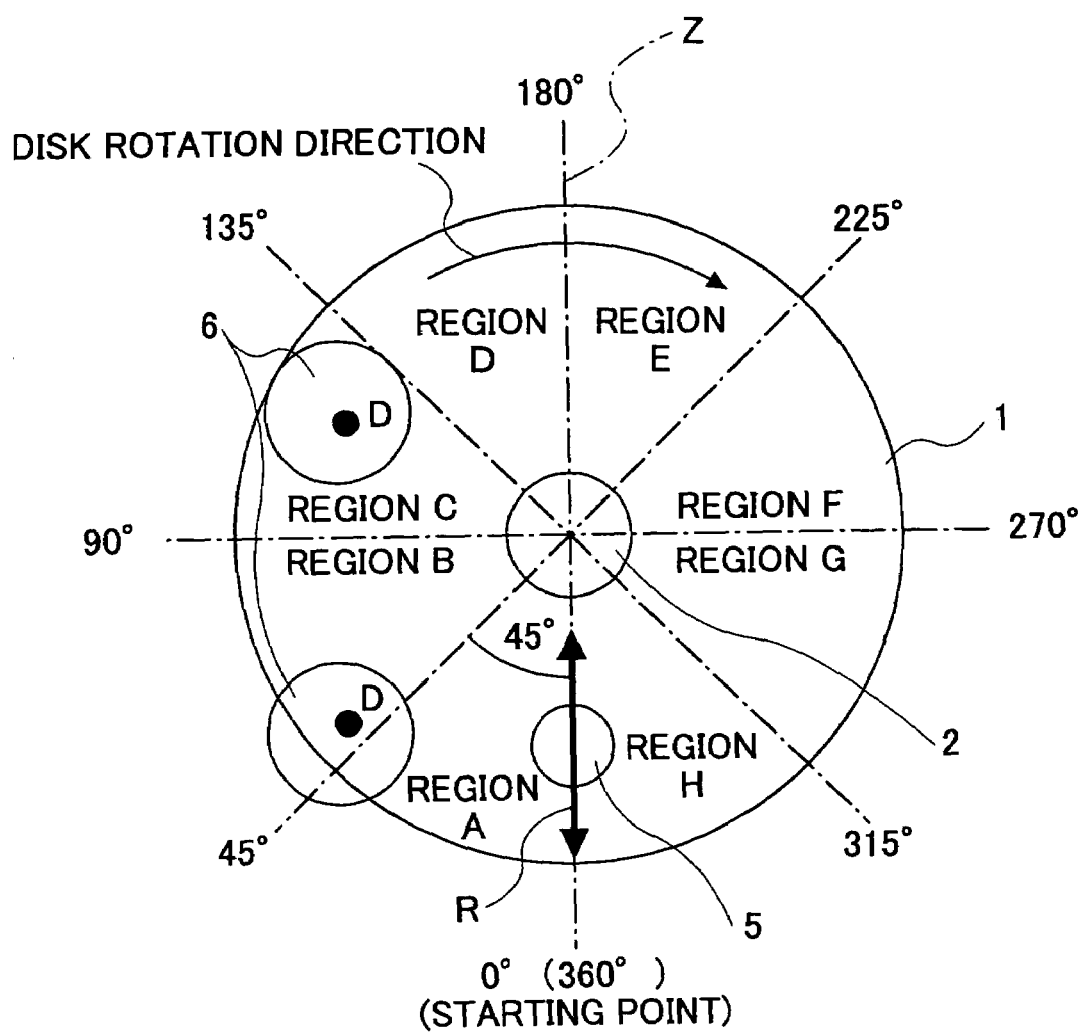
FIG. 32 is a plan view for explaining a variation of the recording/reproducing apparatus according to the seventh and ninth embodiments of the present invention.

In the seventh embodiment, as shown in FIG. 32, by arranging the action point D of the aerodynamic force by the auxiliary stabilizing member 6 located in the region B in the vicinity of a border line of the regions A and B, the surface vibration can be effectively prevented.

Figure 33:
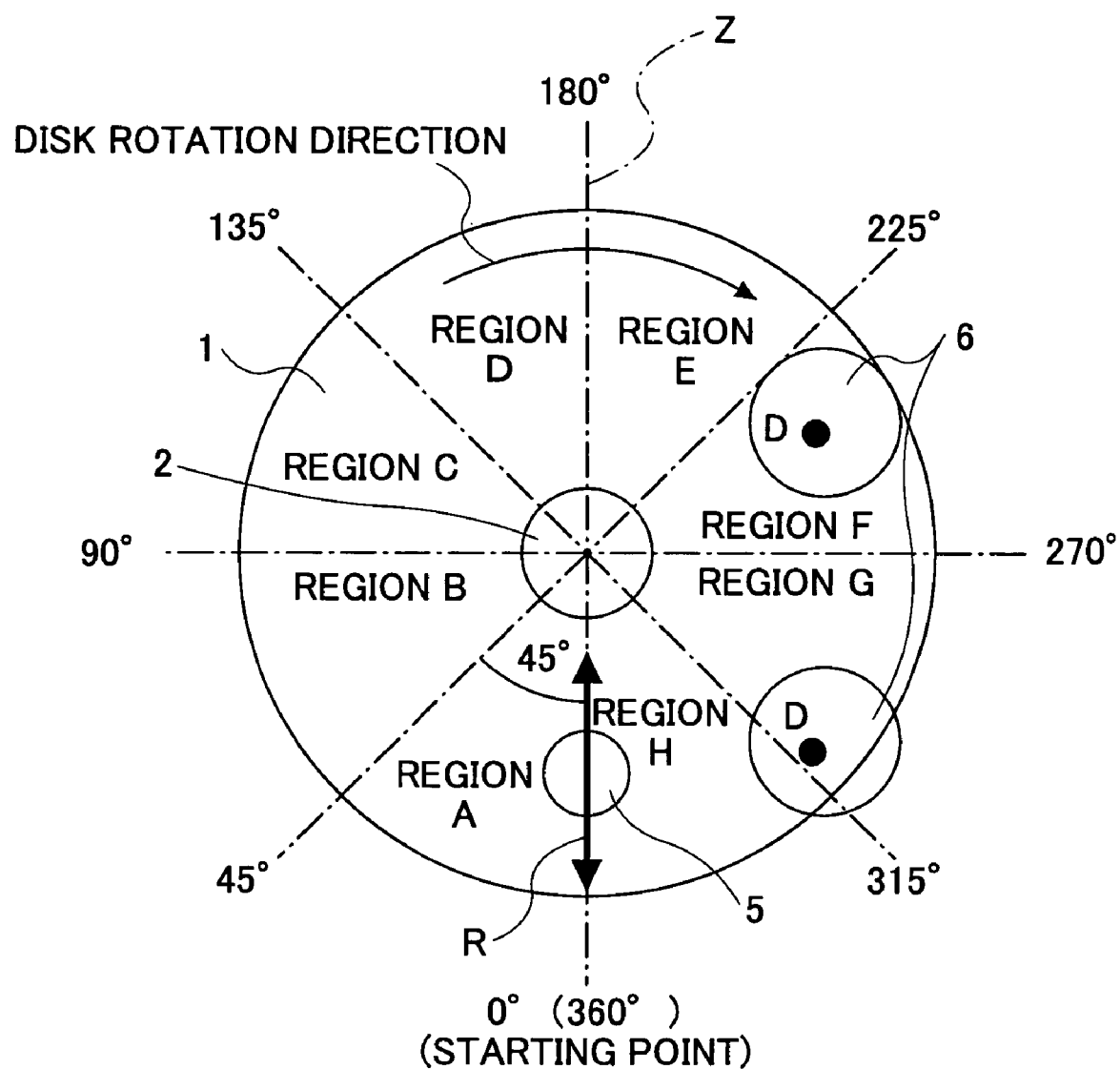
FIG. 33 is a plan view for explaining a variation of the recording/reproducing apparatus according to the eighth and ninth embodiments of the present invention.

Similarly, in the eighth embodiment, as shown in FIG. 33, it is effective to arrange the action point D of the aerodynamic force by the auxiliary stabilizing member 6 located in the region G in the vicinity of a border line of the regions G and H.

Moreover, in the ninth embodiment, it is effective to apply both configurations shown in FIG. 32 and FIG. 33 in that the action point D of the aerodynamic force by the auxiliary stabilizing member 6 located in the region B in the vicinity of the border line of the regions A and B, and also arrange the action point D of the aerodynamic force by the auxiliary stabilizing member 6 located in the region G in the vicinity of the border line of the regions G and H.

As shown in FIG. 32 and FIG. 33, the action points D are arranged in the vicinities of the border lines. Thus, it is possible to linearize the disk shape in a direction of the straight line Z of the optical disk 1 in the vicinity of the disk reference surface by the auxiliary stabilizing members 6. In addition to this effect, it is possible to significantly reduce the surface vibration by setting the auxiliary stabilizing members 6 closer to the main stabilizing member 5.

Moreover, in the ninth embodiment, it is further effective to arrange the action point D in the region B and the action point D in the region G by the auxiliary stabilizing members 6 at symmetrical locations so as to sandwich the straight line Z, and also arrange the action point D in the region C and the action point D in the region F by the auxiliary stabilizing members 6 at symmetrical locations so as to sandwich the straight line Z.

By arranging the action points D at the symmetrical locations so as to sandwich the straight line Z as previously described, it is possible to improve straightness of the disk shape in the direction of the straight line Z in a case of affecting the aerodynamic action force toward the disk surface by the auxiliary stabilizing members 6, and also, it is possible to effectively occurs a counterforce of the optical disk 1 against the main stabilizing member 5. Therefore, it is possible to easily and effectively reduce the surface vibration in the vicinity of the straight line Z by the main stabilizing member 5.

In the seventh and the ninth embodiments, it is effective to arrange the action points D in the regions B and C so that a straight line passing through the action points D by the auxiliary stabilizing members 6 in the regions B and C is parallel to the straight line Z. Furthermore, in the eighth and the ninth embodiments, it is effective to arrange the action points D in the regions F and G so that a straight line passing through the action points D by the auxiliary stabilizing members 6 in the regions F and G is parallel to the straight line Z.

In particular, in the ninth embodiment, it is effective to arrange the action points D in the regions B, C, F, and G so that the straight line passing through the action points D in the regions B and D is parallel to the straight line Z and the straight line passing through the action points D in the regions F and G is parallel to the straight line Z.

By arranging the straight line passing through the action points D as above-described, it is possible to improve the straightness of the disk shape in the straight line Z in a case of affecting the aerodynamic action force by the auxiliary stabilizing members 6 against the disk surface.

Eleventh Embodiment

In each of the seventh through tenth embodiments, configurations in that the optical pickup 4 linearly moves in the disk radial direction. However, in an eleventh embodiment according to the present invention in FIG. 34, for example, if the movement line of the optical pickup 4 in the disk radial direction in an actual recording/reproducing region on the disk surface is an arc trajectory R' shown in FIG. 34, an approximate line is defined as a straight line (line adjacent to a curved line R' and passing through the center of the optical disk 1). Accordingly, even if a swing arm method, in which the optical pickup 4 is fixed to one end of an arm to rotate, is applied, it is possible to apply any configuration from the seventh embodiment to the tenth embodiment.

Figure 35:
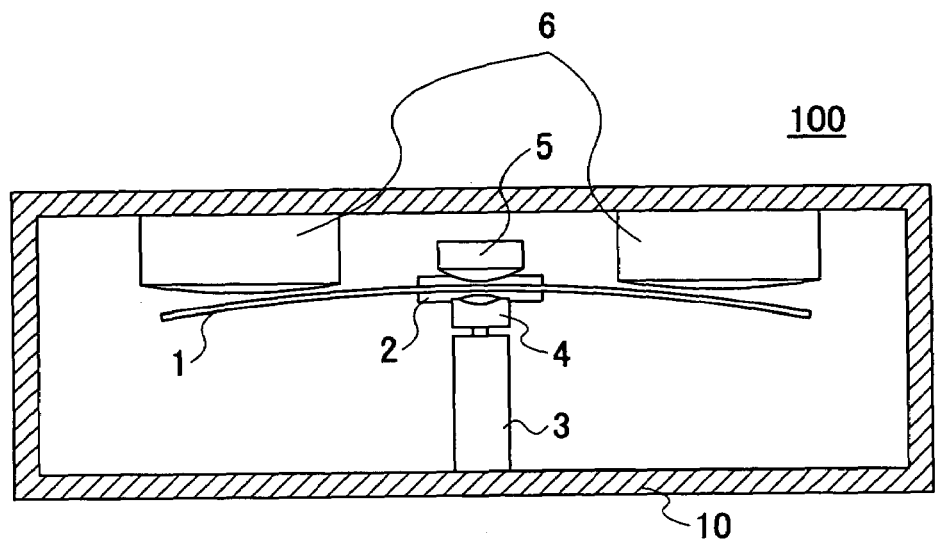
FIG. 35 is a cross-sectional view showing an arrangement example of an auxiliary stabilizing member in the recording/reproducing apparatus according to the seventh through eleventh embodiments of the present invention.

As illustrated in FIG. 35, the auxiliary stabilizing members 6 according to the seventh embodiment through the eleventh embodiment are provided in a chassis 10 of the recording/reproducing apparatus 108, 109, 110, or 111 (hereinafter, generally called the recording/reproducing apparatus 100). This configuration can be implemented in the recording/reproducing apparatus 100 in that a disk cartridge accommodating the optical disk 1 is not used or that ejects the optical disk 1 from the disk cartridge and actuates the optical disk 1.

In this configuration, regardless of the scan of the optical pickup 4, it is possible to define locations of the action points of the auxiliary stabilizing members 6 with respect to the optical disk 1 by fixing a relative position between the auxiliary stabilizing members 6 and the spindle motor 3.

Figure 36:
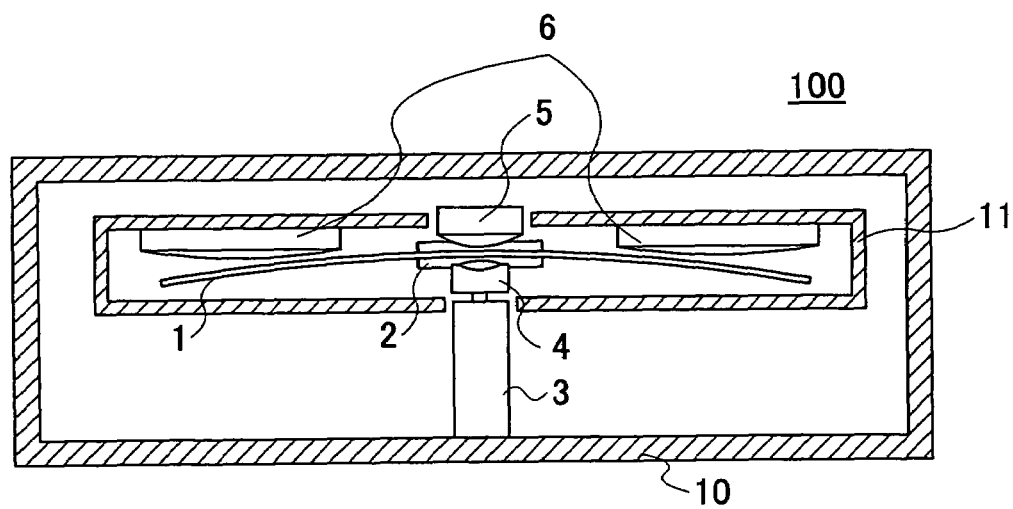
FIG. 36 is a cross-sectional view for explaining a disk cartridge according to the seventh through eleventh embodiments of the present invention.

As shown in FIG. 36, the auxiliary stabilizing members 6 in the seventh embodiment through the eleventh embodiment can be arranged on an inside wall of the disk cartridge 11. Therefore, it is possible to simplify the configuration of the recording/reproducing apparatus 100. Moreover, in this configuration in FIG. 36, the auxiliary stabilizing members 6 can be arranged differently for each disk cartridge 11. Thus, it is possible to separately design the auxiliary stabilizing members 6 for each of various disk specifications. Accordingly, it is possible to compensate for differences of the stabilizing condition because of a variety of the disk specifications.

Figure 37:
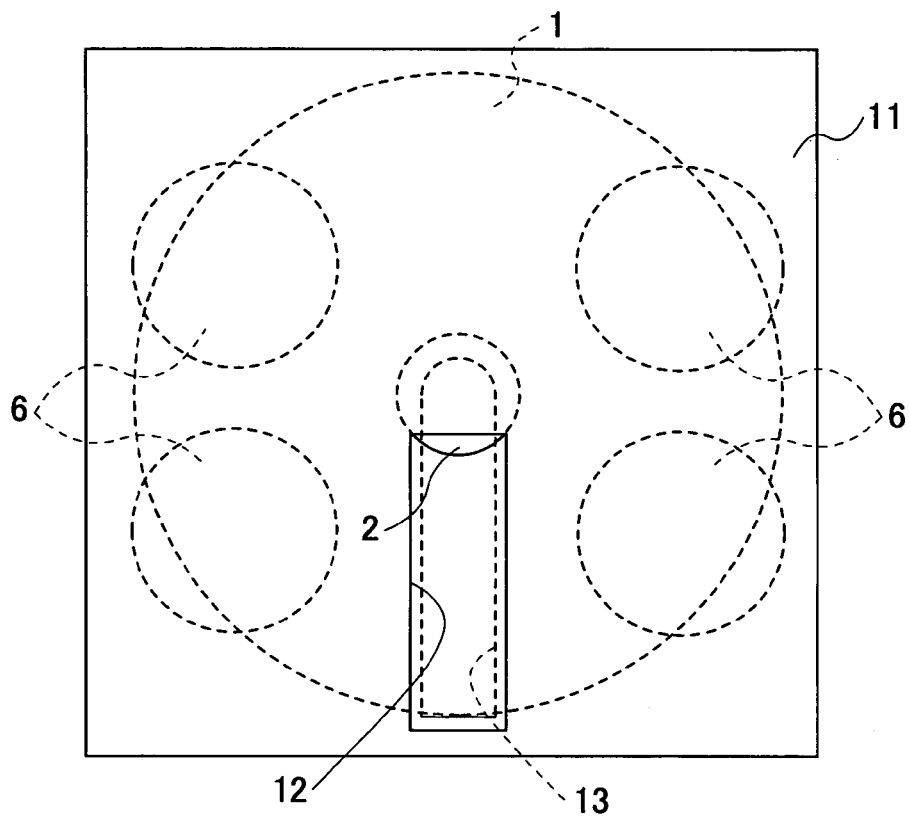
FIG. 37 is a plan view showing the disk cartridge according to the seventh through eleventh embodiments of the present invention.
Figure 38:
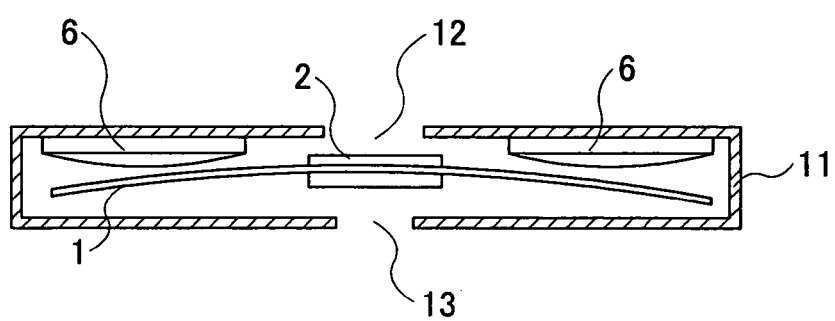
FIG. 38 is a transverse cross-sectional view of the disk cartridge shown in FIG. 37.

As the disk cartridge 11, for example, a configuration shown FIG. 37 and FIG. 38 is illustrated. In FIG. 37 and FIG. 38, reference number 12 denotes a first opening (hereinafter, called first opening 12) to insert the main stabilizing member 5 and move the main stabilizing member 5 in the disk radial direction, and reference number 13 denotes a second opening (hereinafter, called second opening 13) to insert the optical pickup 4 and a part of the spindle motor 3 and to mover the optical pickup 4 in disk radial direction. It should be noted that a shutter to open and close the openings 12 and 13, a mechanism to fix the optical disk 1 in the cartridge 11, and other mechanisms necessary to mount the cartridge 11 to the spindle motor 3 are not shown.

Twelfth Embodiment

Figure 39:
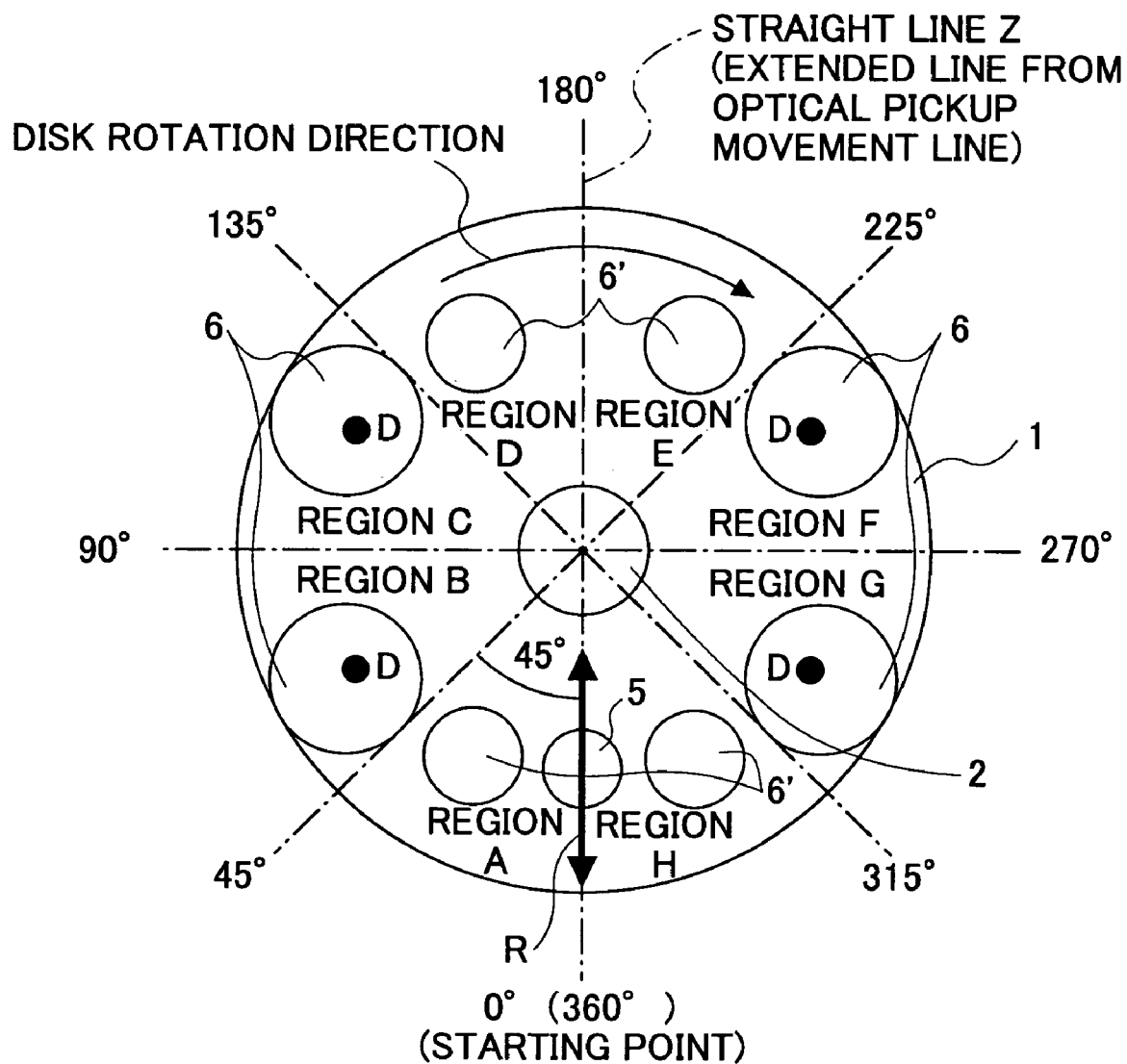
FIG. 39 is a plan view showing a configuration example in that a number of the auxiliary stabilizing members is increased in the ninth embodiment, according to a twelfth embodiment of the present invention.

In a case in that a plurality of auxiliary stabilizing members 6 are arranged against the disk surface according to a thirteen embodiment of the present invention shown in FIG. 39, the counterforce received from the optical disk 1 in an arrangement of the auxiliary stabilizing members 6 described in the eight through the ninth embodiments is set to be a maximum in the auxiliary stabilizing members 6 (auxiliary stabilizing members 6' are additional auxiliary stabilizing members other than the auxiliary stabilizing members 6) other than the main stabilizing member 5 arranged against the disk surface. Accordingly, it is possible to assure an effect of linearizing the disk shape in the direction of the straight line Z and the surface vibration reduction effect by the main stabilizing member 5.

In the seventh through the twelfth embodiments, the auxiliary stabilizing members 6 are arranged in the same side as the main stabilizing member 5. However, even if the auxiliary stabilizing members 6 are arranged at the reverse side to sandwich the main stabilizing member 5 and the optical disk 1, it is possible to obtain the same surface vibration reduction effect.

Moreover, as a method for applying the aerodynamic action force toward the optical disk by the auxiliary stabilizing members 6, there are broadly two methods. One method is to affect the surface of the optical disk 1 in a pushing direction of pushing the surface as shown in the seventh through the ninth embodiments, and another method is to affect the surface of the optical disk 1 in a pulling direction of pulling the surface as shown in the tenth embodiment. It is possible to obtain the same effect in any embodiment.

In the following, details of the present invention will be described based on examples and a comparative example.

EXAMPLE 2-1

In example 2-1, the configuration shown in FIG. 24 and FIG. 25 is applied. The auxiliary stabilizing member 6 is a cylinder shape having a diameter 40 mm and a curvature radius 200 mm. And a surface of the auxiliary stabilizing member 6 faces the optical disk 1 (diameter 120 mm). The main stabilizing member 5 is a cylinder shape having a diameter 10 mm and a curvature radius 100 mm. And a surface of the main stabilizing member 5 faces the optical disk 1. The auxiliary stabilizing member 6 is arranged at a location so that the auxiliary stabilizing member 6 is positioned at a location of approximately 60° through approximately 120° from the main stabilizing member 5 with respect to the downstream in the disk rotational direction and the center of the surface facing the optical disk 1 is positioned at a radius 45 mm of the optical disk 1. By arranging the auxiliary stabilizing members 6, the action points D of the aerodynamic force of the auxiliary stabilizing members 6 are arranged in the regions B and C.

It is assumed that locations of these action points D are 4 mm in a case in that a pushing amount of all auxiliary stabilizing members 6 toward the disk surface is considered from the disk reference surface. The main stabilizing member 5 is provided with a movement mechanism in the disk radial direction and a location controlling mechanism in the disk rotational axis direction, which are not shown in FIG. 24 and FIG. 25.

Moreover, in the Example 2-1, a case of using a polycarbonate sheet having a diameter 120 mm and a thickness 75 μm as a disk substrate will be described. To prepare a disk, first, a group of stampers at a pitch 0.6 μm and a width 0.3 μm is transcribed by a thermal-transfer. After that, a sheet/Ag reflection layer is formed by a sputtering process in order of 120 nm/(ZrO2-Y2O3)-SiO2 7 nm/AgInSbTeGe 10 nm/ZnS—SiO2 25 nm/Si3N4 10 nm. An information recording region is provided in a range (radius 20 mm to 58 mm) from a diameter 40 mm of an inside perimeter to a diameter 118 mm of an outside perimeter. After that, an UV resin is spin-coated and hardened by illuminating a ultraviolet light. Then, a transparent protective film having a thickness 5 μm is formed. Moreover, a hard coat having a thickness 10 μm is conducted at a reverse side. The hub 2 having an external diameter 30 mm, an internal diameter 15 mm, and a thickness 0.3 mm is provided in the center of the optical disk 1. This optical disk 1 is warped slightly toward a side where the hard coat is conducted in a finished state.

The optical disk 1 is rotated at three levels of speed: 5 m/sec, 15 m/sec, and 30 m/sec, and the surface vibration of the optical disk 1 is evaluated by arranging a laser displacement measuring device at a location of the optical pickup 4. Since basically, a degree of the surface vibration is likely to become greater from the inside perimeter to the outside perimeter, an evaluation location of the surface vibration is defined to be at a radius 55 mm of the outside perimeter where the surface vibration reduction is difficult. In this case a pushing amount of the auxiliary stabilizing member 6 toward the disk surface is set to be 4 mm in that the disk reference surface is defined as a reference. In this case, the disk reference surface is the disk surface at a side of the main stabilizing member when it is assumed that the optical disk 1 is flat.

Based on an evaluation result of the surface vibration, the pushing amount (location adjustment amount in the disk rotational axis direction) toward the disk surface by the main stabilizing member 5 is obtained so that the surface vibration at the radius 55 mm becomes less than 10 μm. Since the pushing amount necessary to reduce the surface vibration is likely to become greater from the inside perimeter to the outside perimeter, the pushing amount needed at the outside perimeter is defined as a maximum adjustment amount in a case of actuating the main stabilizing member 5 to move in the disk radial direction. That is, the smaller is the maximum adjustment amount, the more the surface vibration can be reduced in a state in that the movement line to actuate the main stabilizing member 5 to move in the disk radial direction is closer to the disk reference surface. Based on this relationship, in the Example 2-1, the pushing amount of the main stabilizing member 5 needed at the outside perimeter of the optical disk 1 is evaluated in form the viewpoint how much closer the movement line of the main stabilizing member 5 in the disk radial direction can be to the disk reference surface.

EXAMPLE 2-2

In example 2-2, the configuration shown in FIG. 26 and FIG. 27 is applied. In the configuration of the example 2-1 as a basic configuration, the auxiliary stabilizing member 6 is arranged at locations so that the auxiliary stabilizing members 6 are positioned at the locations of approximately 60° and approximately 120° from the main stabilizing member 5 with respect to the downstream in the disk rotational direction and the center of the surface facing the optical disk 1 is positioned at a radius 45 mm of the optical disk 1. By these arrangements of the auxiliary stabilizing members 6, the action points D of the aerodynamic forces of the auxiliary stabilizing members 6 are arranged within the regions F and G. It is assumed that locations of the action points D are set so that the pushing amounts of all auxiliary stabilizing members 6 are determined to be 4 mm when the disk reference surface is defined as a reference.

Moreover, the hard coat for the optical disk 1 is omitted from the specification of the example 2-1. In this configuration, the optical disk 1 is warped slightly toward a side of the transparent protective film in the finished state.

The evaluation condition and evaluation items are the same as those in the example 2-1.

EXAMPLE 2-3

In example 2-3, the configuration shown in FIG. 28 and FIG. 29 is applied. The auxiliary stabilizing members 6 are a cylinder shape having a diameter 30 mm and a curvature radius 200 mm. And each surface of the auxiliary stabilizing members 6 faces the optical disk 1. The main stabilizing member 5 is a cylinder shape having a diameter 10 mm and a curvature radius 100 mm. And a surface of the main stabilizing member 5 faces the optical disk 1. The auxiliary stabilizing members 6 are arranged at locations so that the auxiliary stabilizing members 6 are positioned at locations of approximately 60° and approximately 120° from the main stabilizing member 5 with respect to the downstream in the disk rotational direction and the center of the surface facing the optical disk 1 is positioned at the radius 45 mm of the optical disk 1. By these arrangements of the auxiliary stabilizing members, the action points D of the aerodynamic forces of the auxiliary stabilizing members 6 are arranged within the regions B, C, F, and G.

The main stabilizing member 5 is provided with the moving mechanism in the disk radial direction and the location controlling mechanism in the disk rotational axis direction. It should be noted that the pushing amount of all the auxiliary stabilizing members 6 toward the disk surface is determined to be 3 mm when the disk reference surface is defined as a reference.

The optical disk 1 used in the example 2-1 is used in the example 2-3, and also, the evaluation condition and the evaluation items used in the example 2-1 are used in the example 2-3.

EXAMPLE 2-4

Figure 34:
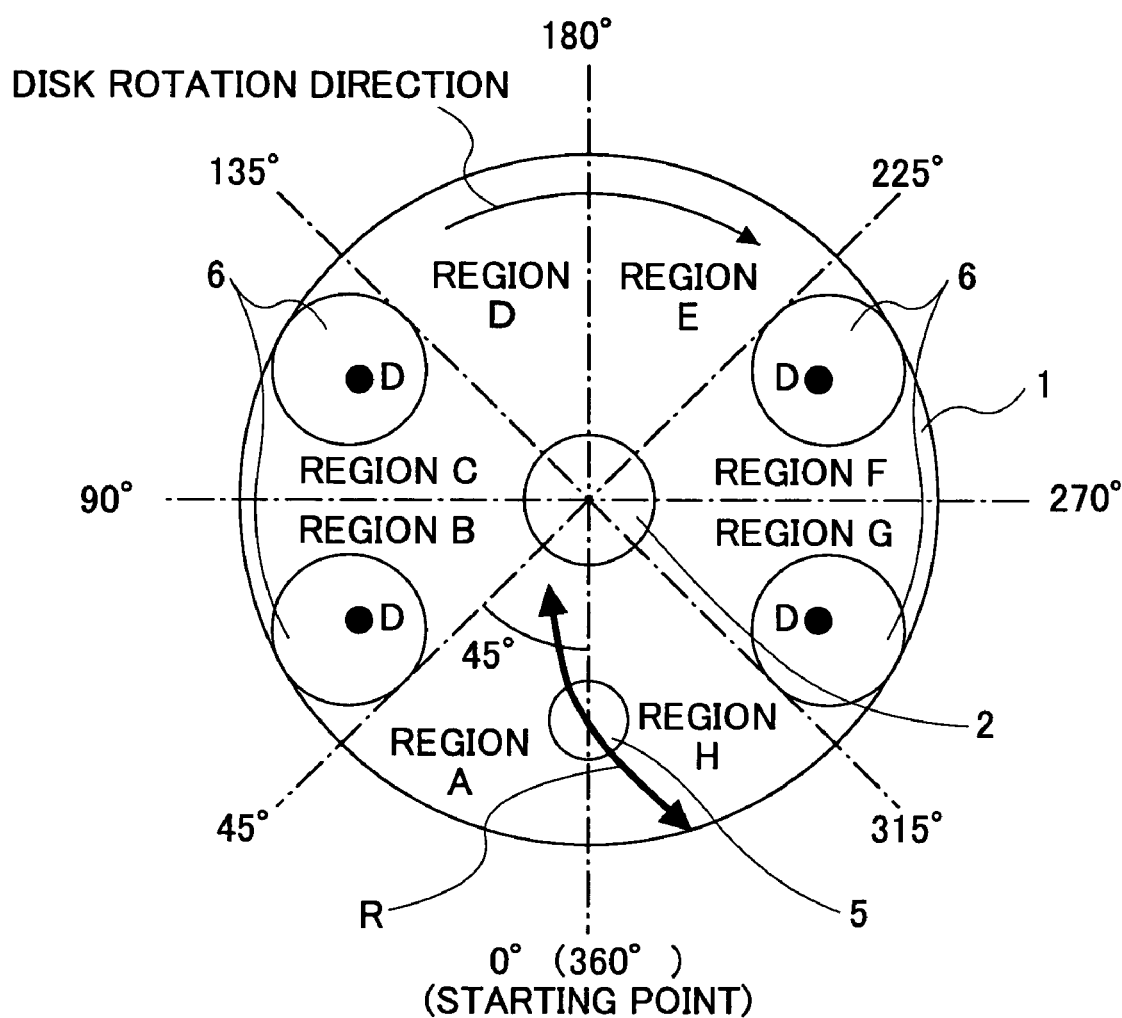
FIG. 34 is a plan view for explaining a main part of the recording/reproducing apparatus according to an eleventh embodiment of the present invention.

In example 2-4, the configuration shown in FIG. 34 is applied. The auxiliary stabilizing members 6 have the same shape and are arranged at the same location as the example 2-3. In the example 2-4, the optical pickup 4 is provided with a movable mechanism in a swing arm method. Similarly, the main stabilizing member 5 is provided with the moving mechanism in the disk radial direction and the location controlling mechanism in the disk rotational axis direction. The movement line in the radial direction of the main stabilizing member 5 is set on the approximate straight line A of a movement line of the optical pickup 4 passing through the disk center based on a calculation using a least squares method.

The optical disk 1 used in the example 2-1 is used in the example 2-4, and also, the evaluation condition and the evaluation items used in the example 2-1 are used in the example 2-4.

EXAMPLE 2-5

In example 2-5, a configuration is applied in which both arrangement configurations for the auxiliary stabilizing members 6 shown in FIG. 32 and FIG. 33 are applied into a basic configuration shown in FIG. 28. The auxiliary stabilizing members 6 are a cylinder shape having a diameter 30 mm and a curvature radius 200 mm. Each surface of the auxiliary stabilizing members 6 faces the optical disk 1. The main stabilizing member 5 is a cylinder shape having a diameter 10 mm and a curvature radius 100 mm.

As shown in FIG. 32 and FIG. 33, one auxiliary stabilizing member 6 is arranged at each location, so as to be located at approximately 120° with respect to the upstream and the downstream in the disk rotational direction and so that the center of a surface facing the optical disk 1 is located at a radius 45 mm of the optical disk 1. In addition, one auxiliary stabilizing member 6 is arranged at each location, so as to be located approximately 50° with respect to the upstream and the downstream in the disk rotational direction and so that the center of a surface facing the optical disk 1 is located at a radius 55 mm of the optical disk 1. By these arrangement of the auxiliary stabilizing members 6, the action points D of the aerodynamic forces of the auxiliary stabilizing members 6 are arranged within the regions B, C, F, and G. The action point D in the regions B is arranged in the vicinity of a boundary between the region A and the region B, and the action point D in the region G is arranged in the vicinity of a boundary between the region F and region G. It should be noted that the pushing amount of all the auxiliary stabilizing members 6 toward the disk surface is determined to be 3 mm when the disk reference surface is defined as a reference.

The optical disk 1 used in the example 2-1 is used in the example 2-5, and also, the evaluation condition and the evaluation items used in the example 2-1 are used in the example 2-5.

EXAMPLE 2-6

In example 2-6, the configuration shown in FIG. 30 and FIG. 31 is applied. The auxiliary stabilizing members 6 are a cylinder shape having a diameter 40 mm and a curvature radius 500 mm. Each surface of the auxiliary stabilizing members 6 faces the optical disk 1. The main stabilizing member 5 is a cylinder shape having a diameter 10 mm and a curvature radius 100 mm.

The auxiliary stabilizing members 6 are arranged at locations so that the auxiliary stabilizing members 6 are positioned at locations of approximately 60° and approximately 120° from the main stabilizing member 5 with respect to the downstream in the disk rotational direction and the center of the surface facing the optical disk 1 is positioned at the radius 40 mm of the optical disk 1. Each of the disk rotational axis locations of all auxiliary stabilizing members 6 is 0.5 mm distance from the disk reference surface. By these arrangements of the auxiliary stabilizing members 6, the action points D of the aerodynamic forces of the auxiliary stabilizing members 6 are arranged in within the ranges B, C, F, and G.

The main stabilizing member 5 is provided with the movement mechanism in the disk radial direction and the location controlling mechanism in the disk rotational axis direction.

The optical disk 1 used in the example 2-1 is used in the example 2-6, and also, the evaluation condition and the evaluation items used in the example 2-1 are used in the example 2-6.

COMPARATIVE EXAMPLE

Figure 40:
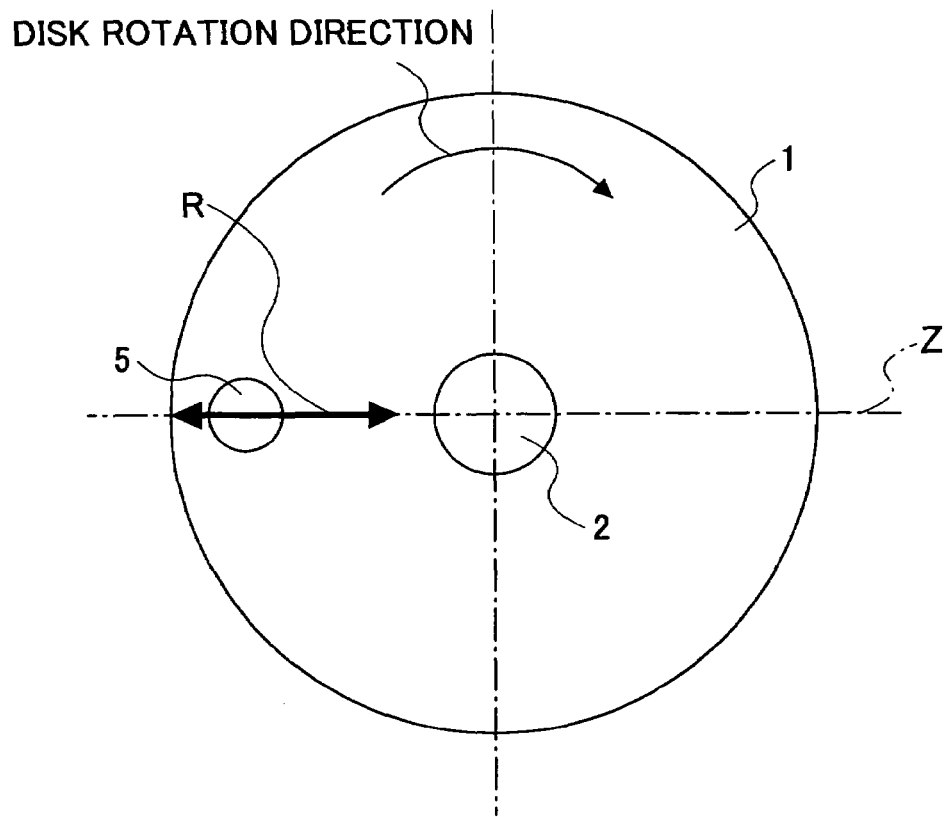
FIG. 40 is a plan view for explaining configurations according to the present invention and a comparative example.
Figure 41:
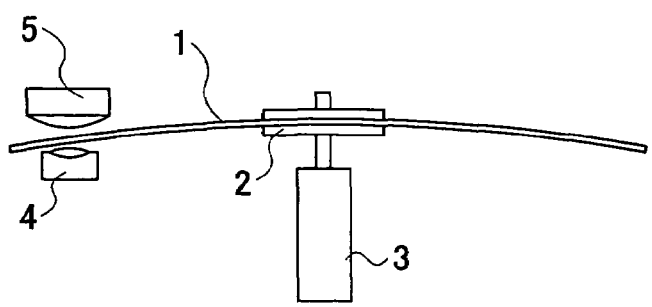
FIG. 41 is a front view of the comparative example shown in FIG. 40.

FIG. 40 is a plan view for explaining a main part of a recording/reproducing apparatus as a comparative example. FIG. 41 is a front view showing the recording/reproducing apparatus as the comparative example in FIG. 40. In the recording/reproducing apparatus 99 shown in FIG. 40 and FIG. 41, only the main stabilizing member 5 is arranged. The main stabilizing member 5 is a cylinder shape having a curvature radius 100 mm and a distance 10 mm and has a surface facing the optical disk 1. In FIG. 40 and FIG. 41, parts that are the same as those shown in the previously described figures are given the same reference numbers, and description thereof is omitted. The main stabilizing member 5 is provided with the movement mechanism in the disk radial direction and the location controlling mechanism in the disk rotational axis direction.

The optical disk 1 used in the example 2-1 is used in the recording/reproducing apparatus 99, and also, the evaluation condition and the evaluation items used in the example 2-1 is used in the recording/reproducing apparatus 99.

FIG. 42 is a diagram showing the pushing amount of the main stabilizing member as a result of comparing each example and the comparative example. In FIG. 42, by comparing each example and the comparative example, the result shows the pushing amount of the main stabilizing member 5 needed so that the surface vibration of the optical disk 1 having a radius 55 mm is set to be 10 µm. As seen in the result shown in FIG. 42, in each example, it is possible to significantly improve the pushing amount of the main stabilizing member 5 in order to reduce the surface vibration. The pushing amount 2.0 through 2.6 mm is required in the comparative example. On the other hand, the pushing amount 0.15 mm is required at most in each example. Accordingly, the present invention has a profound effect. In particular, in the examples 2-3 through 2-6, a preferable surface vibration being less than 10 µm can be obtained without pushing the main stabilizing member 5. Therefore, a more ideal state can be realized.

Moreover, in a case in which a linear velocity is changed, the pushing amount is increased in the comparative example. On the other hand, the pushing amount is just slightly changed in the examples 2-1 and 2-2, and especially, the pushing amount is not changed at all in the example 2-3 through 2-6. In the examples 2-3 through 2-6, although this slight change influences the surface vibration, a change amount of the surface vibration is a slight amount.

FIG. 43 is a diagram showing an evaluation result of the surface vibration. In each example and the comparative example, the main stabilizing member 5 is provided with a tilt controlling mechanism and the pushing amount and an optimum adjustment is conducted to a tilt angle of the main stabilizing member 5. In this state, the surface vibration is evaluated at a linear velocity 15 m/sec at a location of the radius 55 mm. The evaluation result shown in FIG. 43 shows that in each example, it is possible to reduce the surface vibration in a state in that the movement line for the main stabilizing member 5 to move the optical disk in the disk radial direction is approached toward the disk reference surface and it is further possible to increase the surface vibration reduction effect by the auxiliary stabilizing member 6.

In the optimum adjustment in the comparative example, the surface vibration reduction is limited to be 5 µm. However, in the optimum adjustment in the examples 2-1 through 2-6, it is possible to reduce the surface vibration less than 4 µm at least.

In the configuration according to the example 2-3 as a representative, a first sample changed from the disk specification described in the example 2-1 is prepared in that by changing a thickness of the hard coat film in a range from 0 µm to 20 µm, a warp state of the optical disk 1 is changed from a convex shape to a concave shape with respect to a side of the main stabilizing member 5. As defined the disk specification described in the example 2-1 as a reference, a second sample is prepared in that a thickness of a polycarbonate film to be a disk material is changed in a range from 50 µm to 120 µm. Regardless of these various changed disk specifications such as the first and second samples, by providing the auxiliary stabilizing members 6 and the main stabilizing member 5 according to the example 2-3, a similar evaluation result can be obtained in any disk specification. It should be noted that the range of the linear velocity for the evaluation and the radial location for the evaluation are the same as previously described.

Moreover, the location of the auxiliary stabilizing member 6 in the disk rotational axis is selectively adjusted corresponding to the warp state of each optical disk 1. A pertinent condition adjustment for the auxiliary stabilizing member 5 is different for each disk specification. As shown in FIG. 36 through FIG. 38, the auxiliary stabilizing member 6 is mounted on the inside wall of the disk cartridge 11, and an arrangement condition of the auxiliary stabilizing member 6 mounted on the inside wall of the disk cartridge 11 for accommodating the optical disk 1 is adjusted for each disk specification. Therefore, it is possible to reduce the surface vibration in a desired condition without awareness of the disk specification at a side of the recording/reproducing apparatus 100.

For example, regarding an adjustment of the arrangement condition, it is possible to easily adjust the arrangement condition by having a configuration capable of adjusting and arranging a location of the auxiliary stabilizing member 6 in the disk cartridge 11. Alternatively, by configuring a cartridge forming die to be capable of moving a portion for forming the auxiliary stabilizing member based on the disk specification, it is possible to fabricate the disk cartridge 11 corresponding to various disk specifications without increasing die cost, when the disk cartridge 11 is fabricated.

According to the present invention, by a simple control of stabilizing members 5 and 6 operating the aerodynamic effect toward the optical disk 1 being flexible, it is possible to provide the recording/reproducing apparatus 100 that can reduce the surface vibration at the recording/reproducing location on the optical disk 1, and that can easily conduct the location adjustment of the optical pickup 4 as a recording/reproducing head toward the recording/reproducing location.

The present invention can be applied to a recording/reproducing apparatus for conducting a recording or reproducing process with respect to a recordable disk being flexible and to a disk cartridge for accommodating the recordable disk. The recordable disk, to which the present invention can be applied, can be a recordable disk having a disk shape such as a phase change memory, a magnetic optical memory, or a hologram memory.

As described above, in the redoring/reproducing apparatus and the disk cartridge according to the present invention, the surface of the recordable disk is divided into eight regions A, B, C, D, E, F, G, and H at approximately 45° intervals, so as to be adjacent to the movement line for the recording/reproducing part to scan and so that the straight line Z passing through the vicinity of the center of the recordable disk is defined as a starting point. The main stabilizing member 5 is arranged at the location corresponding to the movement line Z. In addition, at least one action point D of the aerodynamic forces of the auxiliary stabilizing members 6 is arranged at portions, where flexibility of the optical disk 1 exists, in at least one of one side of the region B at approximately 45° through approximately 90° from the starting point and the region C at approximately 90° through approximately 135° from the starting point, and another side of the region F at approximately 225° through approximately 270° from the starting point and the region G at approximately 270° through approximately 315° from the starting point. By this arrangement, compared to a case in that only one main stabilizing member 5 is arranged, the surface vibration reduction effect can be sufficiently obtained at a location where the pushing amount of the main stabilizing member 5 is lower. Accordingly, it is possible to limit the movement line in the disk radial direction for the main stabilizing member 5 and the recording/reproducing part to be in a range closer to the disk reference surface. Therefore, it is possible to simplify the movement mechanism and provide the recording/reproducing apparatus using the recordable disk being flexible.

Thirteenth Embodiment

Figure 44:
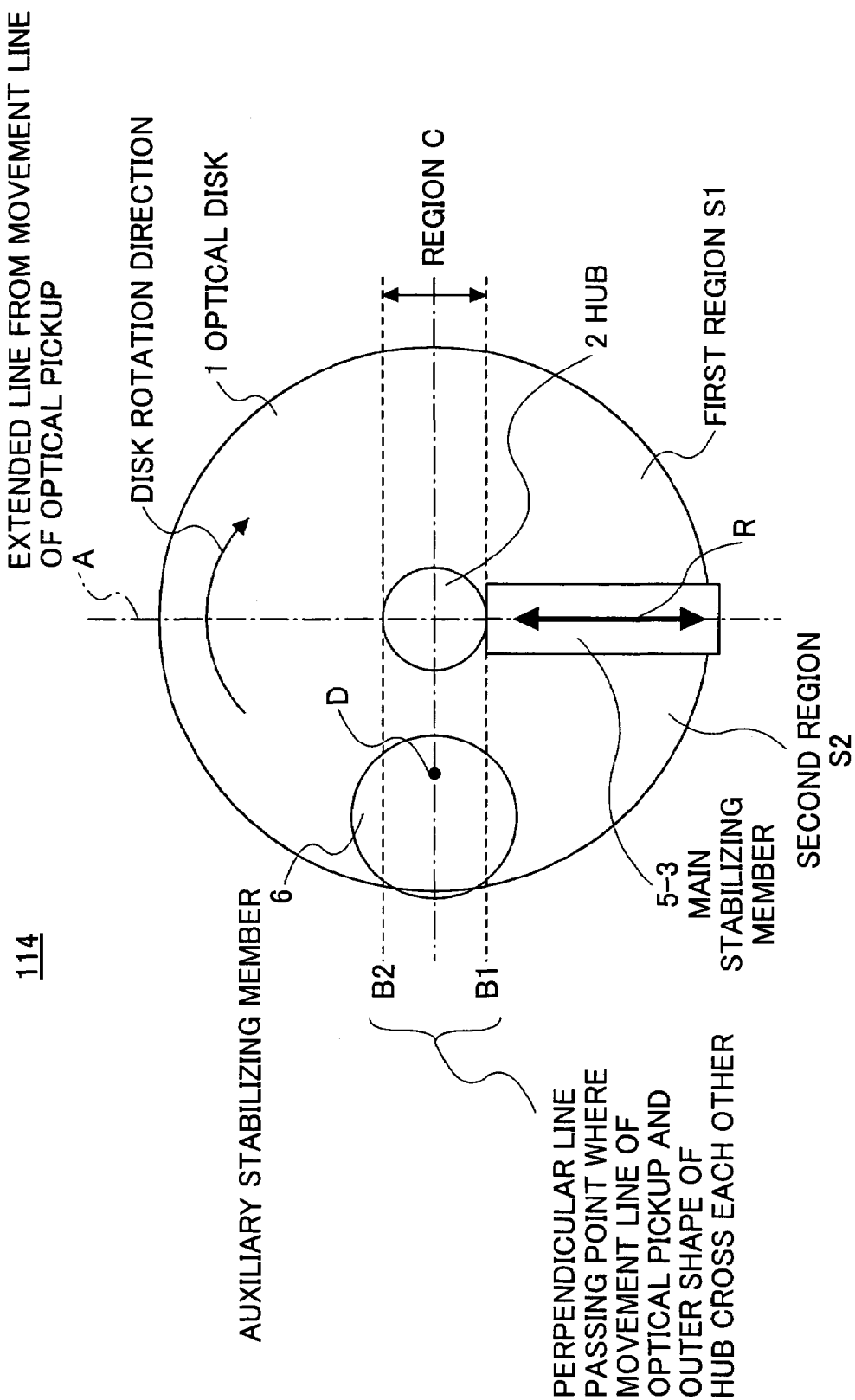
FIG. 44 is a plan view for explaining a main part of a recording/reproducing apparatus according to a thirteenth embodiment of the present invention.
Figure 45:
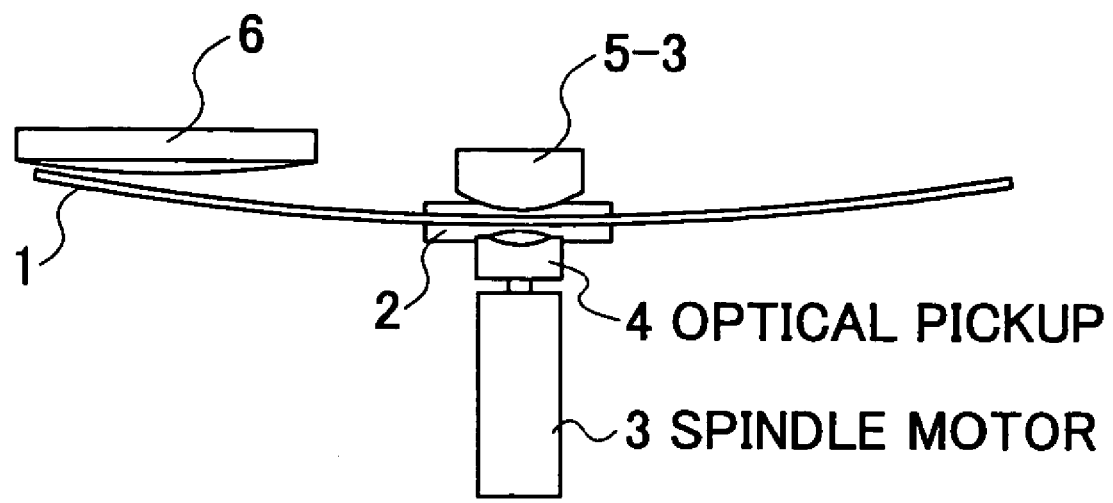
FIG. 45 is a front view showing a front of the recording/reproducing apparatus shown in FIG. 44 according to the thirteenth embodiment of the present invention.

FIG. 44 is a plan view for explaining a main part of a recording/reproducing apparatus according to a thirteenth embodiment of the present invention. FIG. 45 is a front view of the recording/reproducing apparatus shown in FIG. 44 according to the thirteenth embodiment of the present invention. In the recording/reproducing apparatus 114 according to the thirteenth embodiment of the present invention, reference number 1 denotes an optical disk (hereinafter, called optical disk 1) as a recordable disk being flexible, reference number 2 denotes a hub (hereinafter, called hub 2) being one holding member holding and rotating the optical disk 1 mounted at a rotation center part of the optical disk 1, reference number 3 denotes a spindle motor (hereinafter, called spindle motor 3) engaging a catching member as another holding member with the hub 2, and reference number 4 denotes an optical pickup (hereinafter, called optical pickup 4) as a recording/reproducing part for condensing a light beam with respect to the optical disk 1 by moving the optical disk 1 in a radial direction and for conducting an optical scan (toward a direction of an optical pickup movement line R) with respect to the optical disk 1 to conduct a recording/reproducing process for recording or reproducing information.

Moreover, reference number 5 denotes a main stabilizing member (hereinafter, called main stabilizing member 5-3) in that a circular shape is exposed at a side of the optical disk 1 as seen from a front view and that is a rectangle as seen from a plan view, and that extends in a longitudinal direction in a plane state while facing a scan movement line R in a disk radial direction on the optical pickup 4 as shown in FIG. 44. The main stabilizing member 5-3 utilizes an aerodynamic action force in accordance with Bernoulli's principle and suppresses at least surface vibration of the optical disk 1 in the vicinity of a recording/reproducing location by the optical pickup 4 on the optical disk 1.

Furthermore, reference number 6 denotes an auxiliary stabilizing member (hereinafter, called auxiliary stabilizing member 6) applying the aerodynamic action force with respect to the optical disk 1 with the main stabilizing member 5-3. The main stabilizing member 5-3 and the auxiliary stabilizing member 6 are arranged at a disk substrate side which is an opposite side to a recordable surface of the optical disk 1.

In the thirteenth embodiment, in two regions S1 and S2 that are adjacent to the optical pickup movement line R on which the optical pickup 4 moves to scan a surface of the optical disk 1 and are separated by a straight line A passing near the center of the optical disk 1 (straight line A is drawn on the optical pickup movement line R in FIG. 44 and can be a line being in the vicinity of the optical pickup movement line R), at least one auxiliary stabilizing member 6 is arranged separately from the main stabilizing member 5-3 in the region S2 located in the downstream side of a rotational direction of the optical disk 1 of the optical pickup 4 (in FIG. 45). In the thirteenth embodiment, for the sake of convenience, one auxiliary stabilizing member 6 is arranged.

Fourteenth Embodiment

Figure 46:
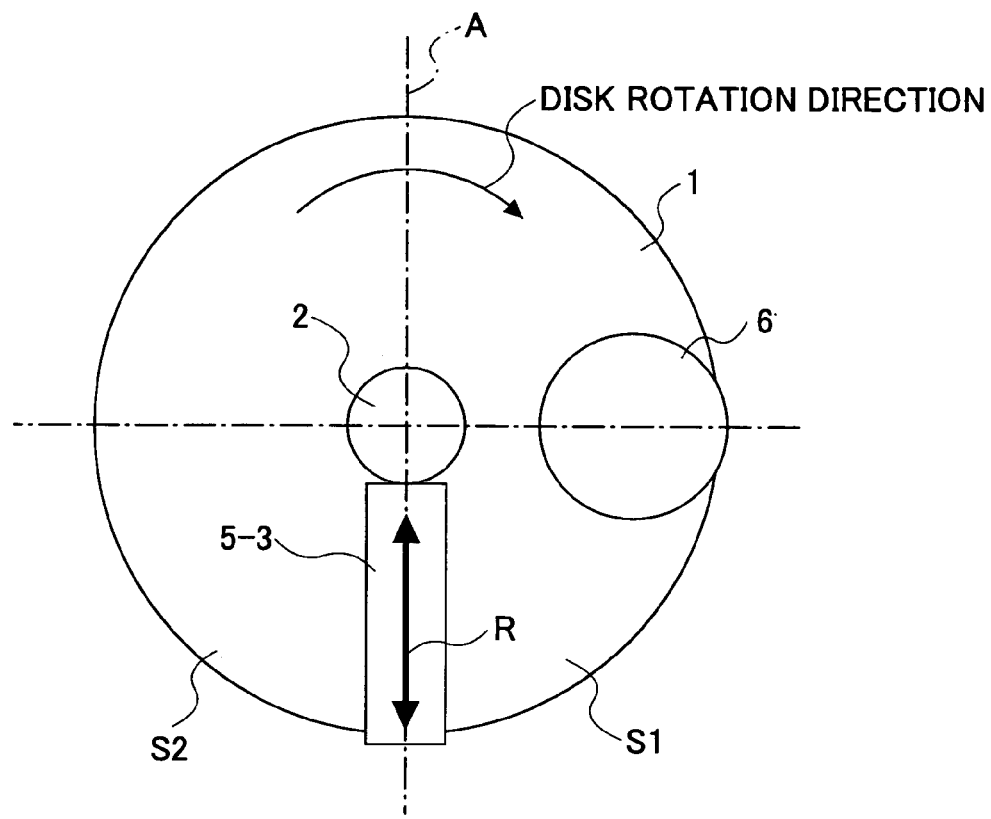
FIG. 46 is a plan view for explaining a main part of a recording/reproducing apparatus according to a fourteenth embodiment of the present invention.
Figure 47:
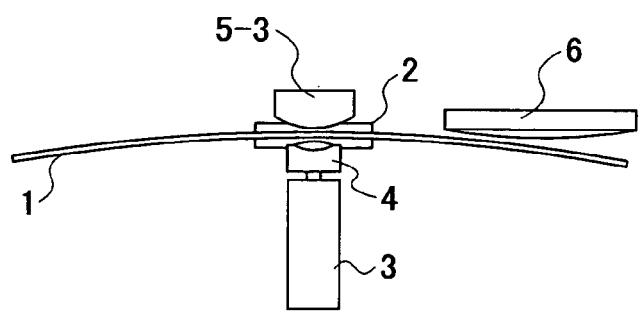
FIG. 47 is a front view showing a front of the recording/reproducing apparatus shown in FIG. 46 according to the fourteenth embodiment of the present invention.

FIG. 46 is a plan view for explaining a main part of the recording/reproducing apparatus according to a fourteenth embodiment of the present invention. FIG. 47 is a front view showing a front of the recording/reproducing apparatus shown in FIG. 46 according to the fourteenth embodiment of the present invention. In the recording/reproducing apparatus 115 in FIG. 46 and FIG. 47, parts that are the same as those shown in the previously described figures are given the same reference numbers, and description thereof is omitted.

Similar to the thirteenth embodiment, in the fourteenth embodiment, the two regions S1 and S2 are adjacent to the optical pickup movement line R on which the optical pickup 4 moves to scan a surface of the optical disk 1 and are separated by a straight line A passing near the center of the optical disk 1. Different from the thirteenth embodiment, in the fourteenth embodiment, at least one auxiliary stabilizing member 6 is arranged separately from the main stabilizing member 5-3 in the region S1 located in the downstream side of a rotational direction of the optical disk 1 of the optical pickup 4 (in FIG. 45). In the fourteenth embodiment, for the sake of convenience, one auxiliary stabilizing member 6 is arranged in the region S1.

Fifteenth Embodiment

Figure 48:
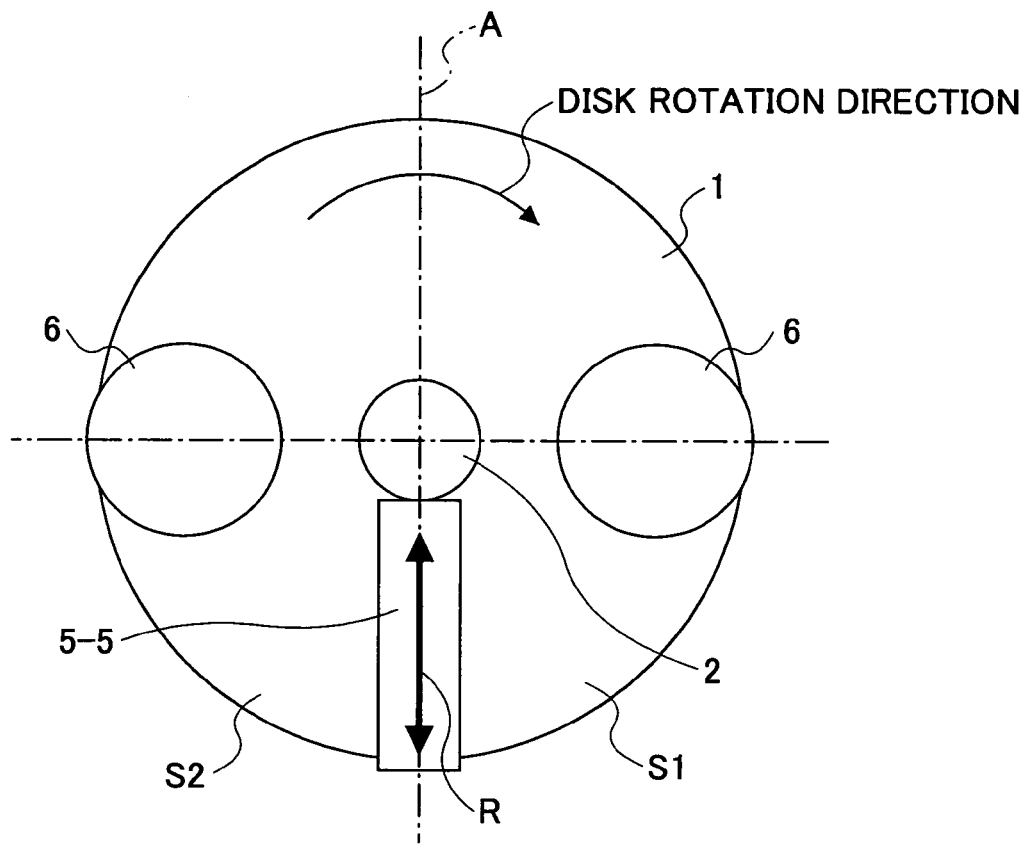
FIG. 48 is a plan view for explaining a main part of a recording/reproducing apparatus according to a fifteenth embodiment of the present invention.
Figure 49:
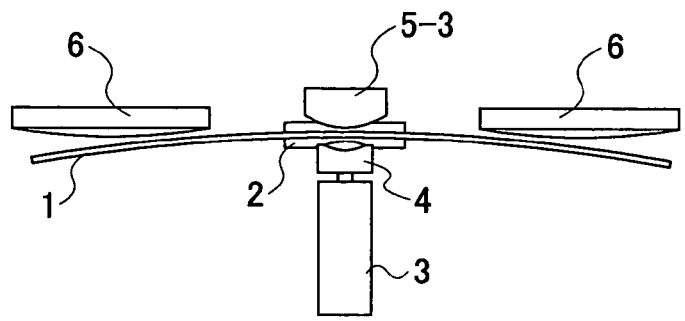
FIG. 49 is a front view showing a front of the recording/reproducing apparatus shown in FIG. 48 according to the fifteenth embodiment of the present invention.

FIG. 48 is a plan view for explaining a main part of the recording/reproducing apparatus according to a fifteenth embodiment of the present invention. FIG. 49 is a front view showing a front of the recording/reproducing apparatus shown in FIG. 48 according to the fifteenth embodiment of the present invention. Similar to the thirteenth and fourteenth embodiments, in the fifteenth embodiment, two regions S1 and S2 are formed. Different from the thirteenth and fourteenth embodiments, in the recording/reproducing apparatus 116 according to the fifteenth embodiment, at least one auxiliary stabilizing member 6 is arranged in each of two regions S1 and S2 separately from the main stabilizing member 5-3 so as to be positioned symmetrically. In the fifteenth embodiment, for the sake of convenience, one auxiliary stabilizing member 6 is arranged in each of the regions S1 and S2.

Sixteenth Embodiment

Figure 50:
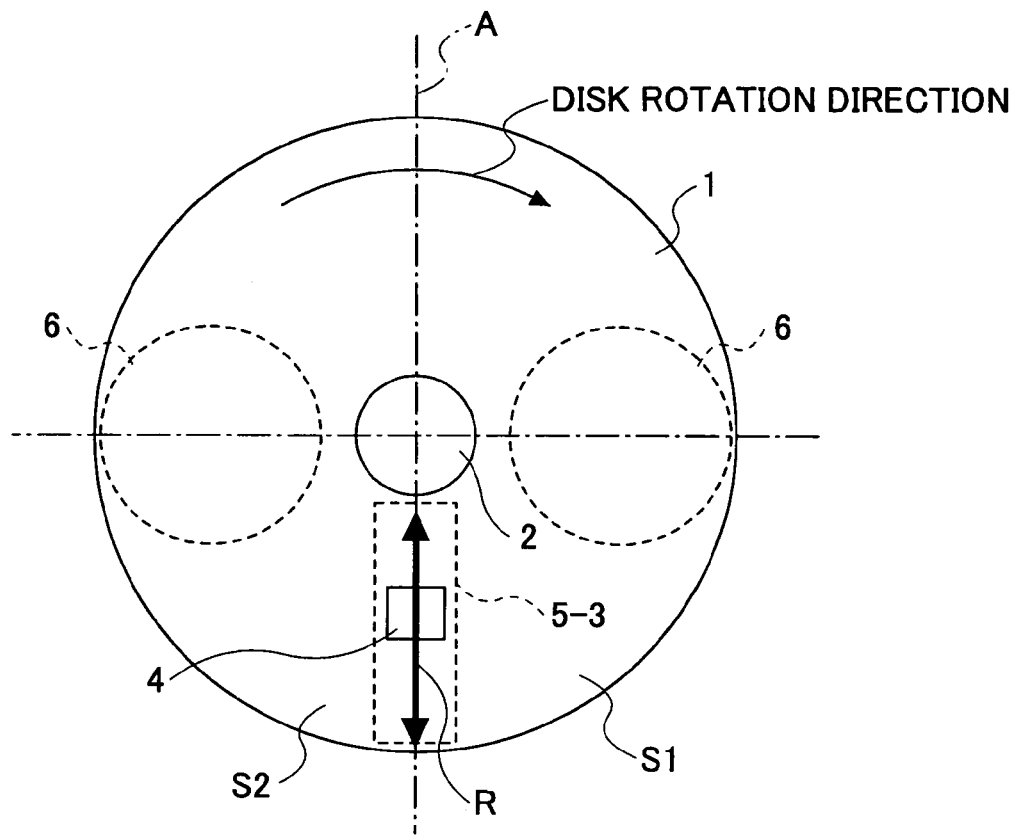
FIG. 50 is a plan view for explaining a main part of a recording/reproducing apparatus according to a sixteenth embodiment of the present invention.
Figure 51:
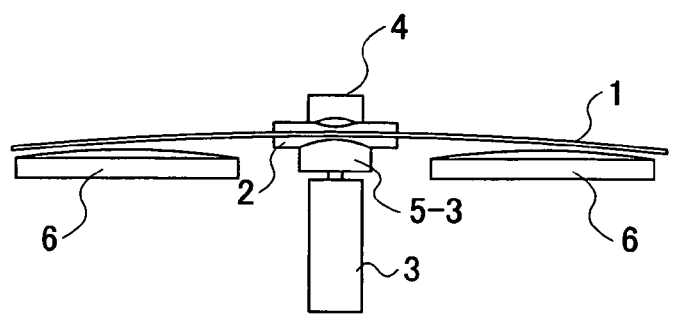
FIG. 51 is a front view showing a front of the recording/reproducing apparatus shown in FIG. 50 according to the sixteenth embodiment of the present invention.

FIG. 50 is a plan view for explaining a main part of the recording/reproducing apparatus according to a sixteenth embodiment of the present invention. FIG. 51 is a front view showing a front of the recording/reproducing apparatus according to the sixteenth embodiment of the present invention in FIG. 50. Different from the sixteenth embodiment, in the recording/reproducing apparatus 117 according to the sixteenth embodiment, the main stabilizing member 5-3 and the auxiliary stabilizing members 6 are arranged on a downside of the optical disk 1 and the optical pickup 4 is arranged on an upside of the optical disk 1. Similar to the thirteenth and fourteenth embodiments, in the sixteenth embodiment, two regions S1 and S2 are formed. At least one auxiliary stabilizing member 6 is arranged in each of the regions S1 and S2 at a symmetric locations. In the sixteenth embodiment, for the sake of convenience, one auxiliary stabilizing member 6 is arranged in each of the regions S1 and S2. Different from the sixteenth embodiment in that the auxiliary stabilizing members 6 are arranged to push the optical disk 1, in the sixteenth embodiment, the auxiliary stabilizing members 6 are arranged so as to pull the optical disk 1. Accordingly, a configuration in the sixteenth embodiment is different from a configuration in the sixteenth embodiment from the viewpoint of giving an action force.

An operation of each embodiment will be described.

It is important to consider a balance condition between stabilizing members 5-3 and the optical disk 1 in order to suppress the surface vibration of the optical disk 1 by occurring the aerodynamic force based on Bernoulli's principle between the stabilizing members 5-3 and the optical disk 1 being flexible in a basic configuration according to each embodiment. In particular, a reaction force toward the stabilizing members 5-3 of the optical disk 1 is an important parameter. This reaction force is determined based on rigidity of the optical disk 1 and a floating force occurring when the optical disk 1 is rotated and attempts to become planarized.

When the aerodynamic force was applied to a disk surface by using various arbitrary stabilizing members, the disk surface near approximate ±90° with respect to the disk rotational direction from the upstream side to the downstream side became closer to a disk reference surface in a case of the optical disk 1 having an ideal flat surface and showed improvement in the rigidity of the optical disk 1.

Accordingly, in each embodiment of the present invention, a phenomenon, in which the disk surface displaced at ±90° from the arbitrary stabilizing members becomes closer to the disk reference surface and the rigidity of the optical disk 1 is improved, is utilized as the reaction force, so that the balance condition between the stabilizing members 5-3 and the optical disk 1 can be adjusted. In detail, the action force of the auxiliary stabilizing member 6 is applied to the surface of the optical disk 1, and the main stabilizing member 5-3 displaced at approximately 90° from the auxiliary stabilizing member 5-3, so as to adjust the balance condition.

In addition, the disk shape in the vicinity of the main stabilizing member 5-3 becomes an approximate straight line in all over the radial direction by the action force of the auxiliary stabilizing member 6. Accordingly, it is possible to easily apply the main stabilizing member 5-3 having a shape extending in the disk radial direction. That is, an action surface on the optical disk 1 is made to be the approximate straight line beforehand by the action force of the auxiliary stabilizing member 6 before the action force of the main stabilizing member 5-3 is applied on the disk surface. Therefore, it is possible to sufficiently optimize a stabilizing effect on the main stabilizing member 5-3.

As described above, it is possible to reduce the surface vibration in all over the disk radial direction at once by effectively applying the action force of the main stabilizing member 5-3 that is extended in the disk radial direction. That is, by this stabilizing action, it is possible to form a linear region where the surface vibration is reduced on an arbitrary radius of the optical disk 1.

In the configuration according to the fifteenth embodiment shown in FIG. 48 and FIG. 49, a preferable surface vibration reduction effect can be obtained in all over the radial direction more than the configuration according to the thirteenth embodiment and the fourteenth embodiment.

In the configurations from the thirteenth embodiment to the fifteenth embodiment, it can be easily seen that the surface vibration at the recording/reproducing location can be optimized by additionally providing a tilt control system to the main stabilizing member 5-3 and conducting a fine adjustment having higher precision.

Moreover, by applying the auxiliary stabilizing member 6 according to the present invention, the surface vibration of the optical disk 1 could be certainly reduced at the recording/reproducing location, regardless of a static warped shape of the optical disk 1 in any specific recordable disk.

In the thirteenth embodiment through the fifteenth embodiment, as illustrated in FIG. 44, it is effective to arrange an action point D of the aerodynamic force to the optical disk 1 by the auxiliary stabilizing member 6 at a region C on a disk surface which ranges between a straight line B1 near the stabilizing member 5-3 and a straight line B2 far from the stabilizing member 5-3. Two straight lines B1 and B2 pass through two points where the straight line A crosses twice a region (circular region in FIG. 44) linking supporting point locations (periphery of the hub 2 in FIG. 44) where a warp begins on the optical disk 1 in a state in that the hub 2 of the optical disk 1 is fixed to the catching part of the spindle motor 3 and a side of each of the stabilizing members 5-3 and 6 is pushed and warped. In addition, the two straight lines are perpendicular to the straight line A.

In these configuration according to the thirteenth embodiment through the fifteenth embodiment, it is possible to effectively occur a force to a direction approaching the main stabilizing member 5-3 on the disk surface in the vicinity of the main stabilizing member 5-3 by the action force of the auxiliary stabilizing member 6 toward the optical disk 1. As a result, forces the main stabilizing member 5-3 and the optical disk 1 are balanced. Accordingly, it is possible to shift a condition in that the disk surface becomes stable toward the side of the disk reference surface.

In addition, it is considered to arrange a plurality of auxiliary stabilizing members other than the auxiliary stabilizing members 6 specified in each of the thirteenth embodiment through the fifteenth embodiment. In this case, a counterforce which the auxiliary stabilizing members 6 receives from the optical disk 1 in each of the thirteenth embodiment through the fifteenth embodiment is set to be a maximum in the auxiliary stabilizing members other than the main stabilizing member 5-3 arranged on the disk surface. Accordingly, a desired effect can be assured.

Figure 52:
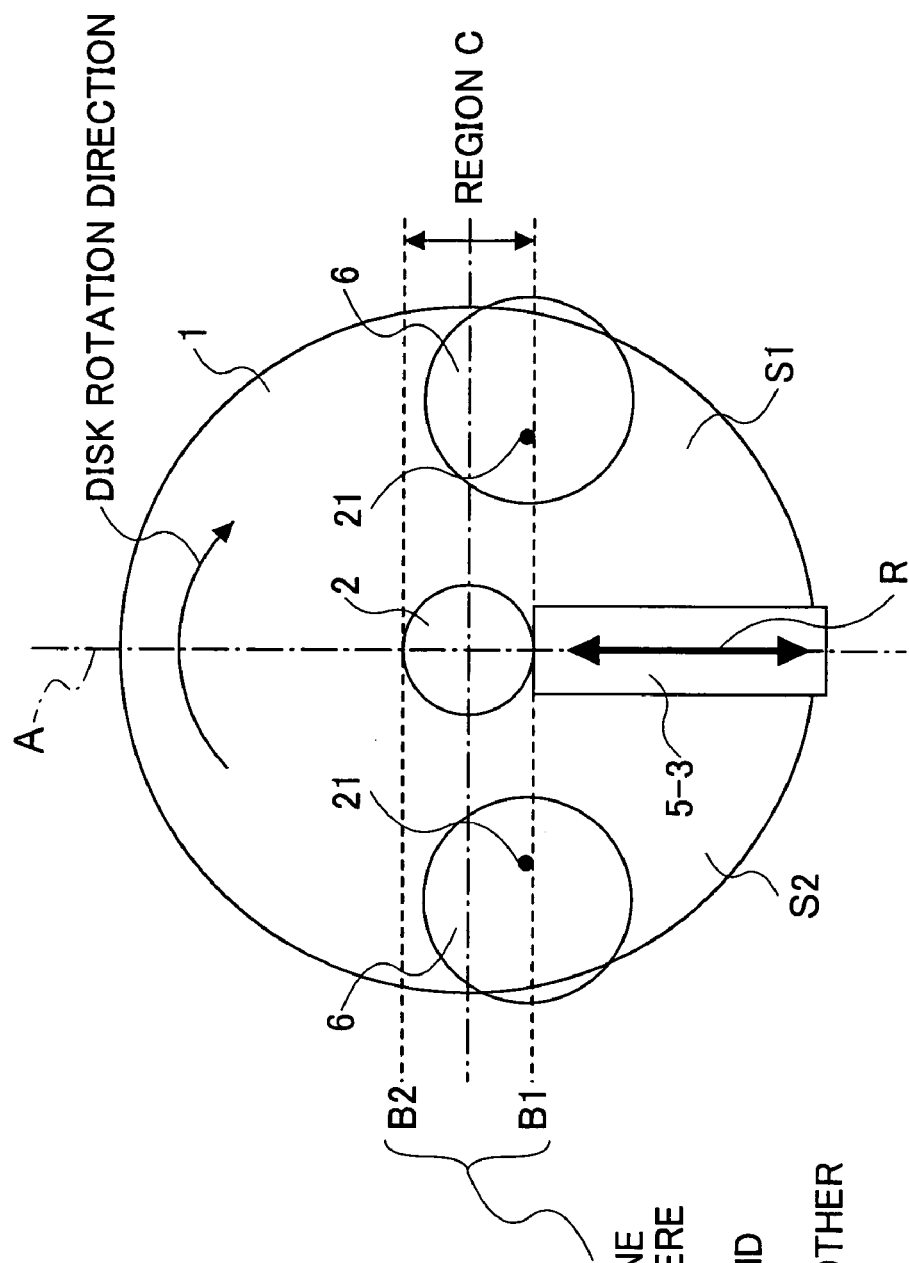
FIG. 52 is a plan view for explaining a main part of a variation of a recording/reproducing apparatus according to a fifteenth embodiment of the present invention.
Figure 53:
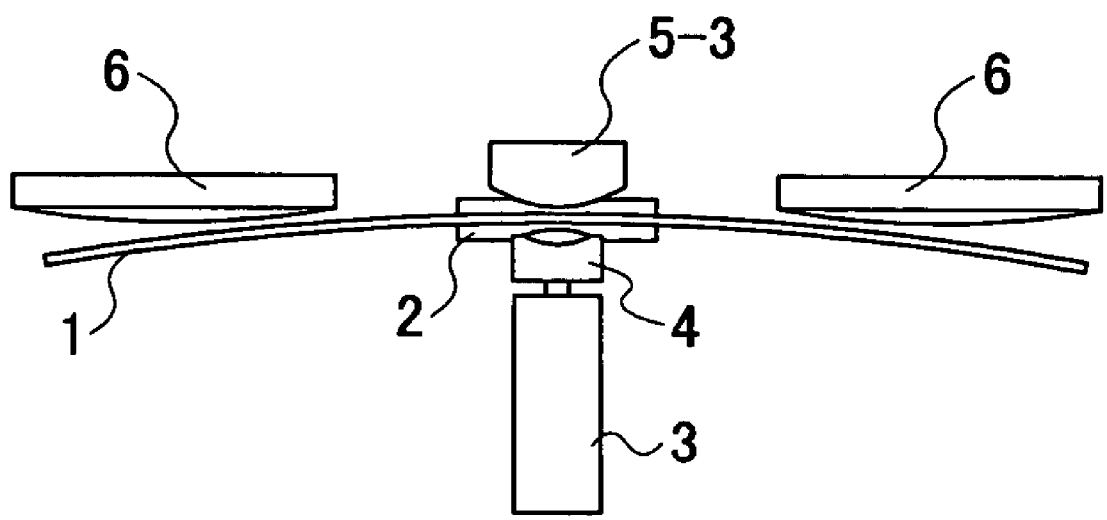
FIG. 53 is a front view showing a front of the variation of the recording/reproducing apparatus in FIG. 52 according to the fifteenth embodiment of the present invention.

In addition, in the configuration shown in FIG. 52 at least two auxiliary stabilizing members 6, which are arranged in the two regions S1 and S2, respectively, make a pair, and are located so that the action points 21 of the force of the auxiliary stabilizing members 6 toward the disk surface are arranged on a parallel straight line to the straight line B1 or B2. Therefore, it is possible to realize an approximate straight line at a location in a direction of the straight line A. Moreover, it is possible to ideally realize the surface vibration reduction at the recording/reproducing location by the action of a stabilizing force of the disk surface by the main stabilizing member 5-3.

Seventeenth Embodiment

Figure 54:
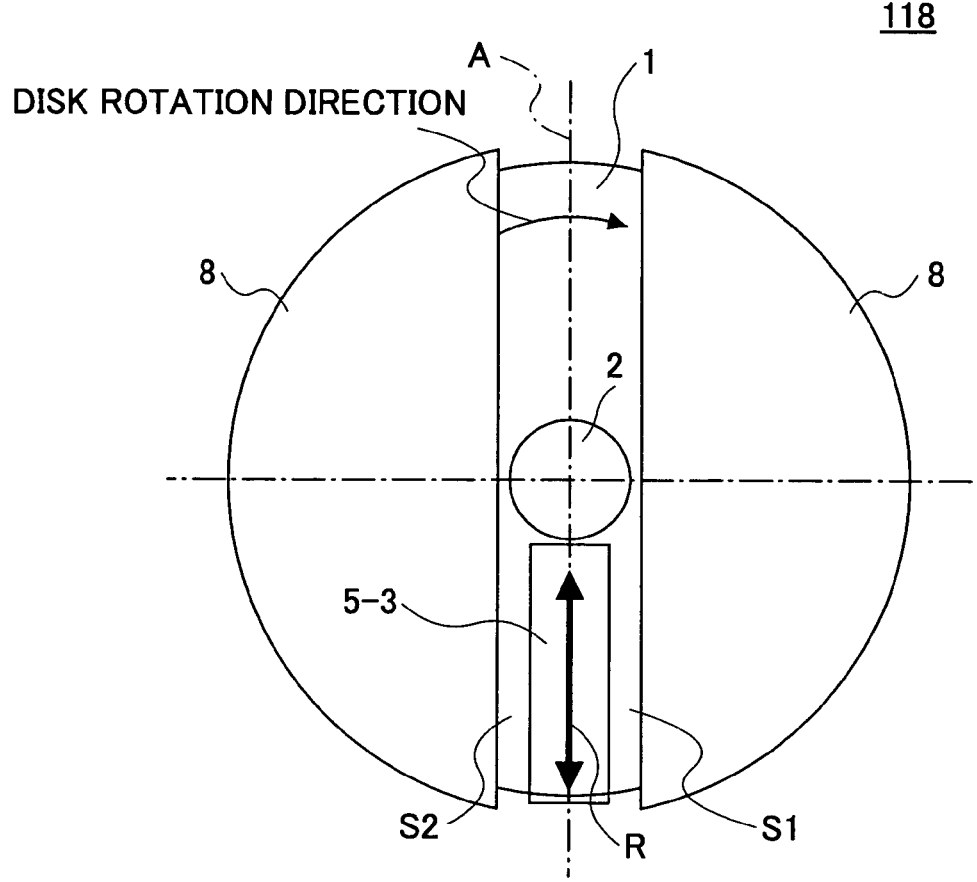
FIG. 54 a plan view for explaining a main part of a recording/reproducing apparatus according to a seventeenth embodiment of the present invention.
Figure 55:
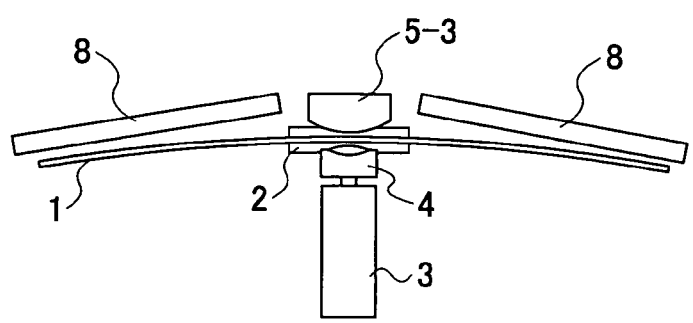
FIG. 55 is a front view showing a front of the recording/reproducing apparatus shown in FIG. 54 according to the seventeenth embodiment of the present invention.

Moreover, shapes of the auxiliary stabilizing members 6 are not limited to a cylinder shape in that a surface facing the optical disk 1 is formed to be a circular shape. For example, in a recording/reproducing apparatus 118 according to a seventeenth embodiment of the present invention as shown in FIG. 54 and FIG. 55, auxiliary stabilizing members 8 being semicircular flat boards are used. The auxiliary stabilizing members 8 are arranged so as to cover two regions S1 and S2 divided by the straight line A passing around the center of the optical disk 1 as described above, avoiding the vicinity of the movement line R along which the optical pickup 4 moves to scan a surface of the optical disk 1 (that is, avoiding the region H where the disk surface becomes stable as the disk reference surface). It should be noted that one stabilizing member 8 may be arranged in either one of the regions S1 and S2.

In the configuration as a basic configuration according to the thirteenth through sixteenth embodiments in that the stabilizing members are extended in the disk radial direction, when the stabilizing members 5-3 being rectangular are simply extended in the disk radial direction, a relative speed between the optical disk 1 and the stabilizing members 5-3 is changed at an inside perimeter and an outside perimeter of the optical disk 1. Since a condition of aerodynamic force is changed depending on the relative speed, a stabilizing condition of the surface vibration is changed in the disk radial direction.

Accordingly, a condition of the aerodynamic force for compensating the change of the condition of the aerodynamic force is considered. It is concluded that the change is associated with the curvature radius of the curved line having a disk circumferential shape on a surface of the stabilizing members 5-3 facing the optical disk 1 approximated to be circular and an effective region width in the disk circumferential direction of the stabilizing members 5-3.

Eighteenth Embodiment

Figure 56:
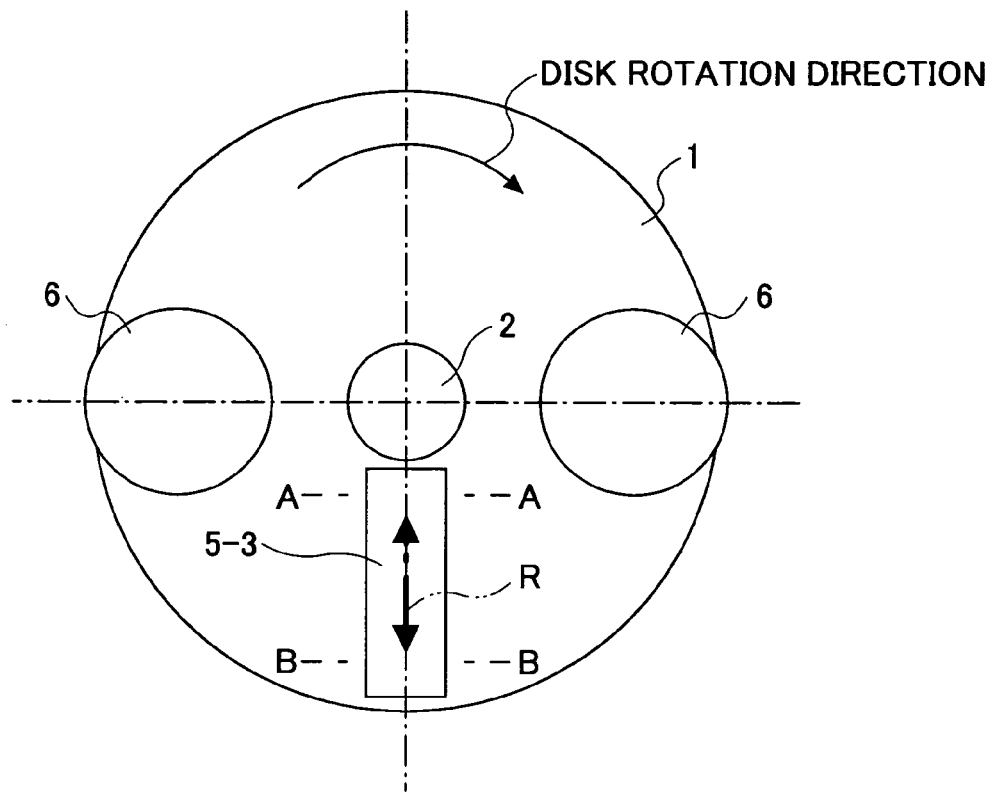
FIG. 56 a plan view for explaining a main part of a recording/reproducing apparatus according to an eighteenth embodiment of the present invention.
Figures 57A, 57B:
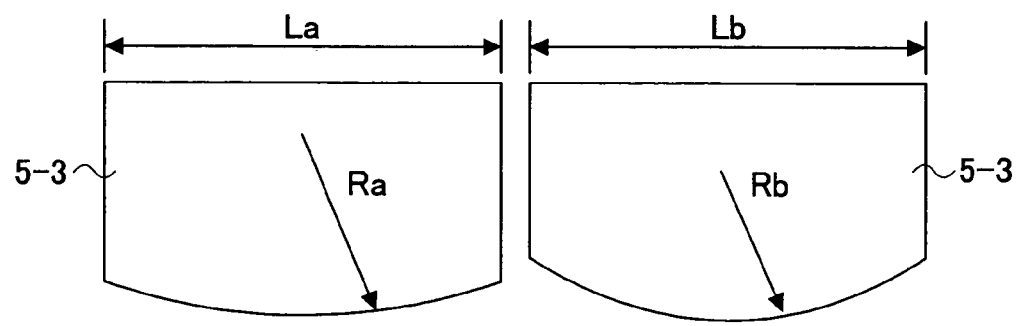
FIG. 57 is a front view showing a front of the recording/reproducing apparatus shown in FIG. 56 according to the eighteenth embodiment of the present invention.

FIG. 56 is a plan view for explaining a main part of a recording/reproducing apparatus according to an eighteenth embodiment of the present invention. FIG. 57A is a cross-sectional view taken on line A—A of the main stabilizing member in FIG. 56 and FIG. 57B is a cross-sectional view taken on line B—B of the main stabilizing member in FIG. 56. As shown in FIG. 57A and FIG. 57B, in a recording/reproducing apparatus 119 according to the eighteenth embodiment, a curvature radius Rb of a disk outside perimeter of the main stabilizing member 5-3 is set to be smaller than a curvature radius Ra of a disk inside perimeter thereof (Ra>Rb), and the effective region width of the disk inside perimeter of the main stabilizing member 5-3 is equal to that of the disk outside perimeter thereof in the disk circumferential direction, so that the main stabilizing member 5-3 is entirely even.

Nineteenth Embodiment

Figure 58:
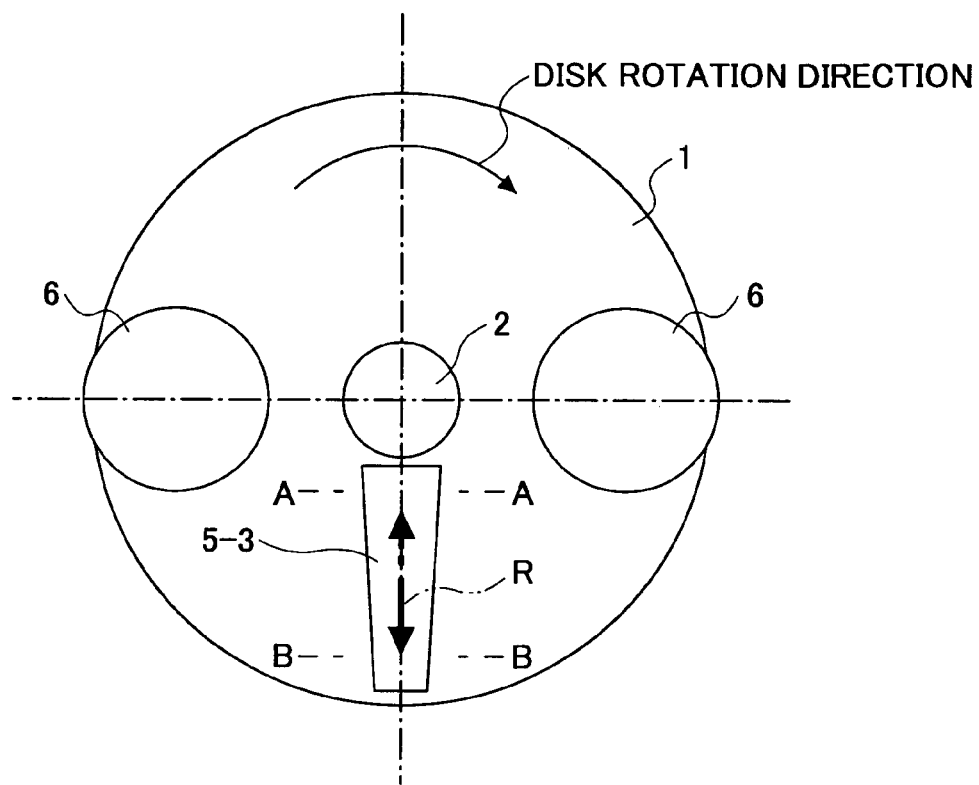
FIG. 58 is a plan view for explaining a main part of a recording/reproducing apparatus according to a nineteenth embodiment of the present invention.
Figures 59A, 59B:
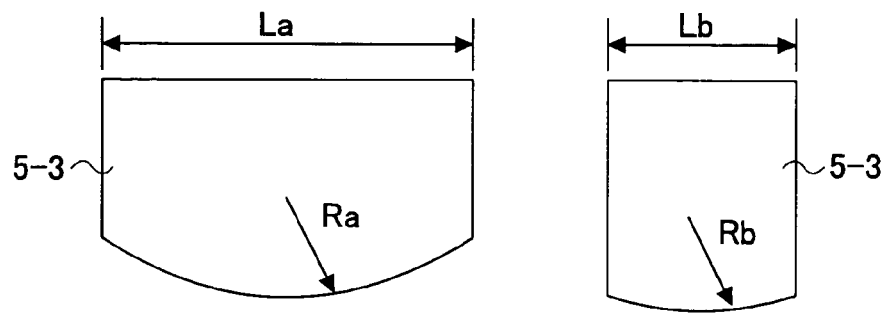
FIG. 59A and FIG. 59B are cross-sectional views showing a stabilizing member according to the nineteenth embodiment of the present invention.

Moreover, in a recording/reproducing apparatus 120 according to a nineteenth embodiment of the present invention in FIG. 58, FIG. 59A and FIG. 59B, an effective region width Lb at an outside perimeter side of the main stabilizing member 5-3 is set to be smaller than an effective region width La at an inside perimeter side thereof in the disk circumferential direction (La>Lb), and a curvature radius Ra of the inside perimeter is equal to a curvature radius Rb of the outside perimeter in the disk circumferential direction, so that the main stabilizing member 5-3 is entirely even.

Twentieth Embodiment

Figure 60:
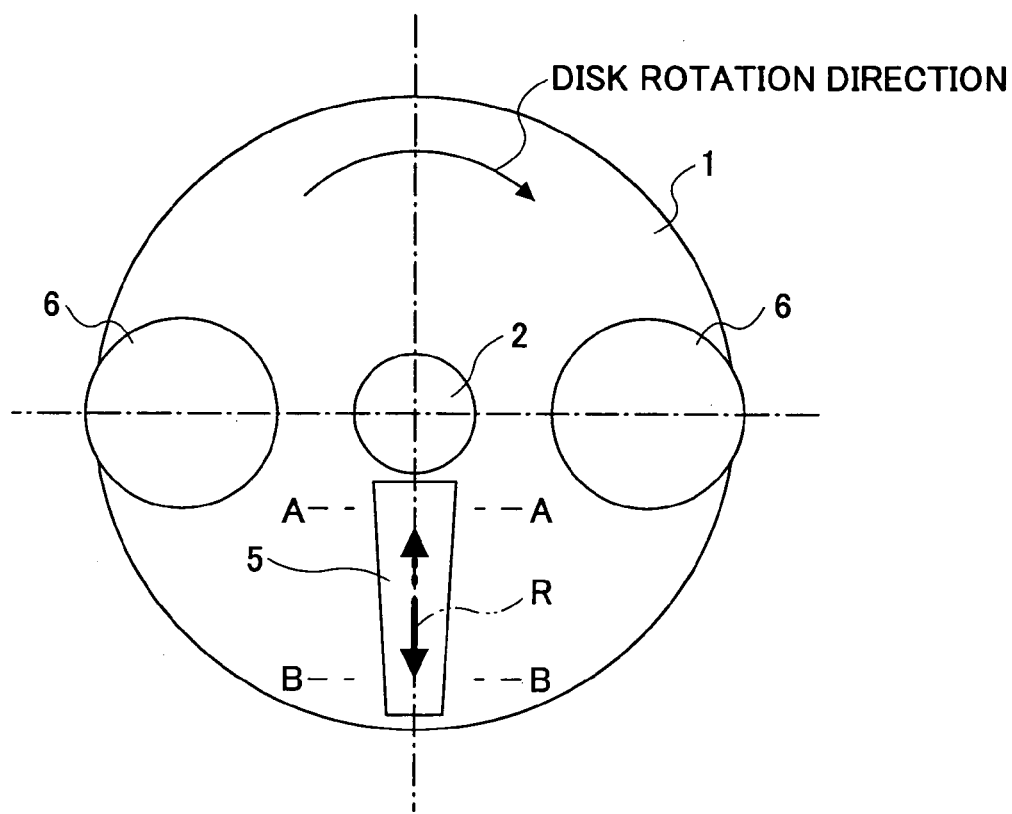
FIG. 60 is a plan view for explaining a main part of a recording/reproducing apparatus according to a twentieth embodiment of the present invention.
Figures 61A, 61B:
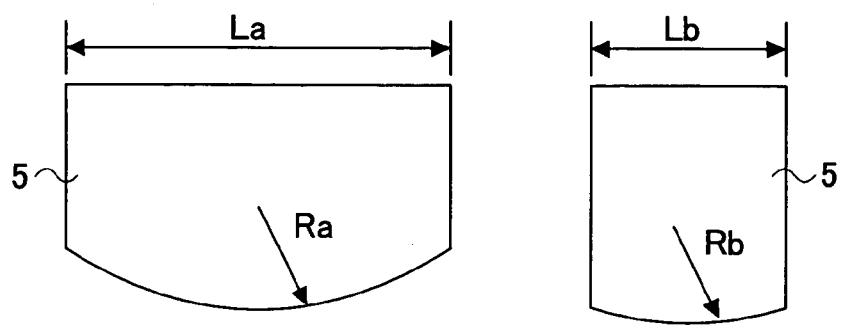
FIG. 61A and FIG. 61B are cross-sectional views showing a stabilizing member according to a twentieth embodiment of the present invention.

Moreover, in a recording/reproducing apparatus 121 according to a twentieth embodiment of the present invention shown in FIG. 60, FIG. 61A, and FIG. 61B, the effective region width Lb of the outside perimeter of the main stabilizing member 5-3 is set to be smaller than the effective region width La of the inside perimeter thereof in the disk circumferential (La>Lb), and the curvature radius Rb at the outside perimeter of the main stabilizing member 5-3 is set to be smaller than the curvature radius Ra at the inside perimeter at the inside perimeter thereof (Ra>Rb).

By applying the configuration according to the eighteenth through twentieth embodiments, it is possible to reduce a repulsive force at the outside perimeter. And by increasing the repulsive force at the inside perimeter, it is possible to make a change of the repulsive force occurring in the disk radial direction to be smaller, and it is possible to uniform the surface vibration effect in all over the disk radial direction.

Figure 62:
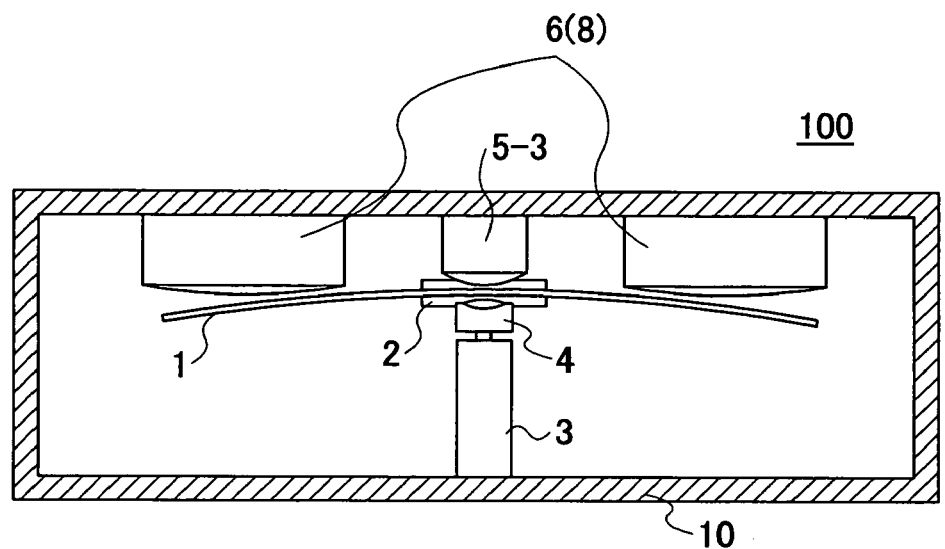
FIG. 62 is a cross-sectional view showing an arrangement of auxiliary stabilizing members in the recording/reproducing apparatus according to the thirteenth through twentieth embodiments of the present invention.

As illustrated in FIG. 62, the main stabilizing member 5-3 and the auxiliary stabilizing members 6 (or the auxiliary stabilizing member 8 shown in FIG. 54) according to the thirteenth embodiment through the twentieth embodiments are provided in the chassis 10 of the recording/reproducing apparatus 114, 115, 116, 117, 118, 119, 120, or 121 (hereinafter, generally called the recording/reproducing apparatus 100). This configuration can be implemented in the recording/reproducing apparatus 100 in that a disk cartridge accommodating the optical disk 1 is not used or that ejects the optical disk 1 from the disk cartridge and actuates the optical disk 1.

In this configuration, regardless of the scan of the optical pickup 4, it is possible to define locations of the action points of the main stabilizing member 5-3 and the auxiliary stabilizing members 6 with respect to the optical disk 1 by fixing relative positions among the main stabilizing member 5-3, the auxiliary stabilizing members 6, and the spindle motor 3.

Figure 63:
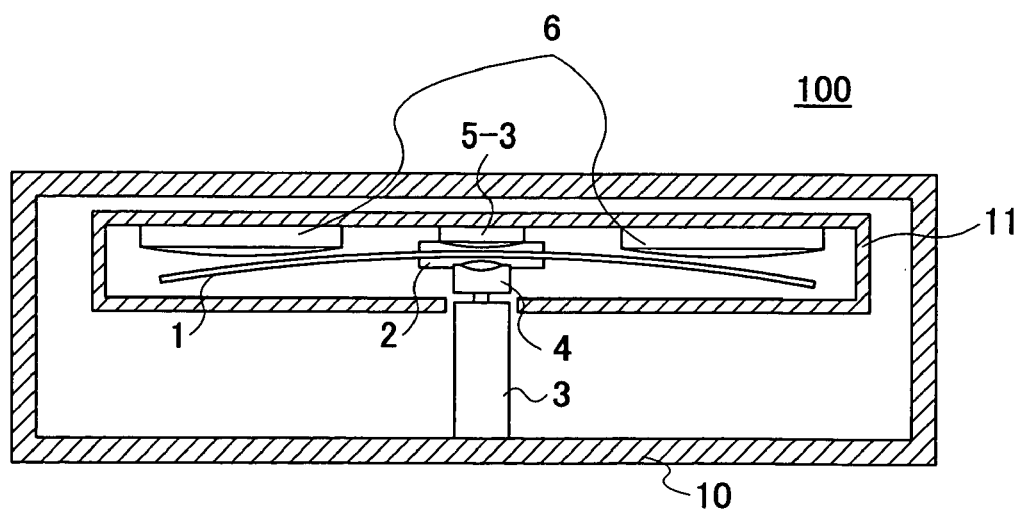
FIG. 63 is a cross-sectional view for explaining a disk cartridge in the recording/reproducing apparatus according to the thirteenth through twentieth embodiments of the present invention.

As shown in FIG. 63, the main stabilizing member 5-3 and the auxiliary stabilizing member 6 can be provided inside the disk cartridge 11. By this configuration, it is not required to provide the main stabilizing member 5-3 and the auxiliary stabilizing member 6 at a side of the recording/reproducing apparatus 100. Accordingly, it is possible to simplify the configuration at the side of the recording/reproducing apparatus. Moreover, in this configuration, since the main stabilizing member 5-3 and the auxiliary stabilizing member 6 can be separately mounted to the disk cartridge 11, it is possible to separately design the main stabilizing member 5-3 and the auxiliary stabilizing member 6 corresponding to each specification of various disks. Therefore, it is possible to correct a difference of the stabilizing condition among the specifications of the various disks.

In the disk cartridge 11 shown in FIG. 63, both the main stabilizing member 5-3 and the auxiliary stabilizing member 6 are provided at an inside wall of the disk cartridge 11. Alternatively, at least one of the main stabilizing member 5-3 and the auxiliary stabilizing member 6 may be mounted, and the auxiliary stabilizing member 8 shown in FIG. 54 may be mounted.

Figure 64:
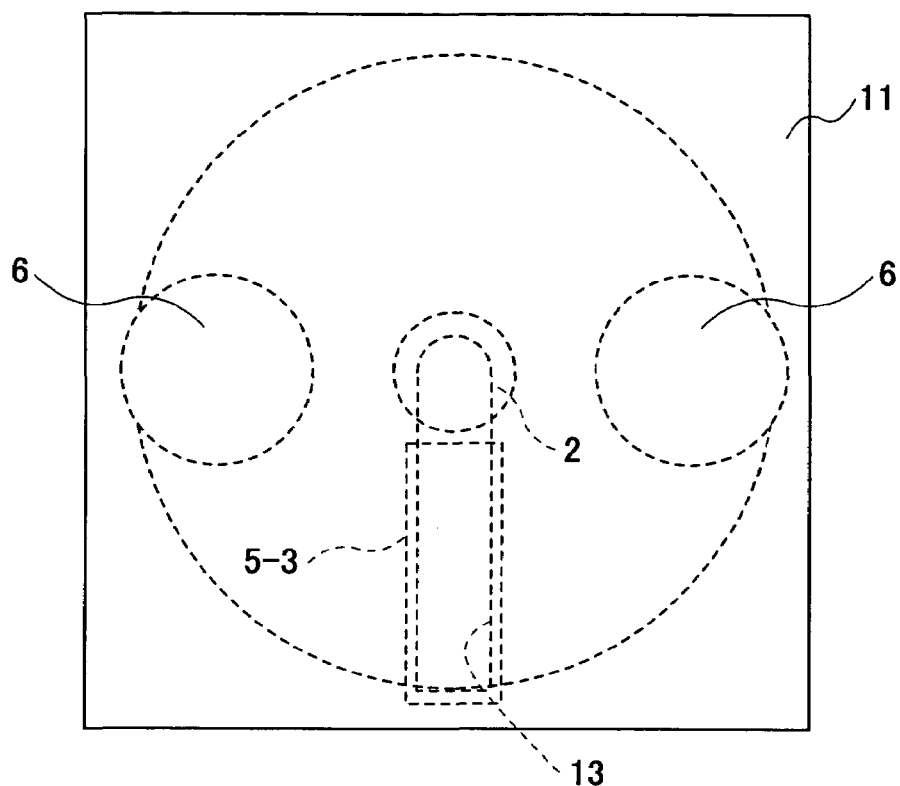
FIG. 64 is a plan view showing the disk cartridge according to the thirteenth through twentieth embodiments of the present invention.
Figure 65:
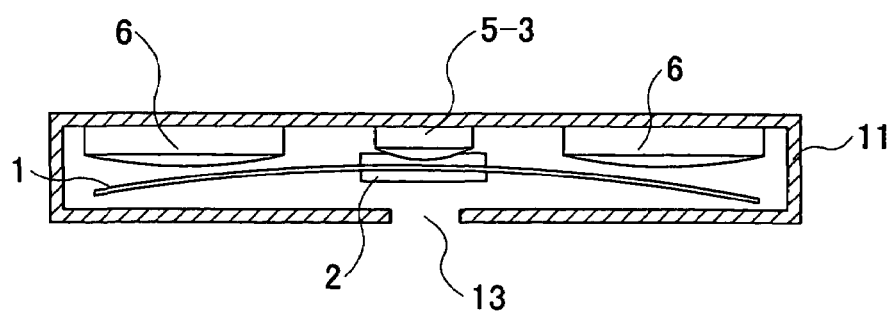
FIG. 65 is a transverse cross-sectional view showing the disk cartridge in FIG. 64 according to the thirteenth through twentieth amendments of the present invention.

As the disk cartridge 11, for example, a configuration is illustrated in FIG. 64 and FIG. 65. In FIG. 64 and FIG. 65, reference number 13 denotes an opening part (hereinafter, called opening 13) used to insert a part of the optical pickup 4 and spindle motor 4 and capable of moving the optical pickup 4 in the disk radial direction. In FIG. 64 and FIG. 65, a shutter for opening and closing the opening part 13, a mechanism for fixing the optical disk in the disk cartridge 11, and other mechanisms needed to mount the disk cartridge 11 to the spindle motor 3 are not shown.

In the previous embodiments, the configuration, in which the auxiliary stabilizing members 6 are arranged at the same side as the main stabilizing member 5-3. However, even if the auxiliary stabilizing members 6 are arranged at a reverse side so as to clamp the optical disk 1 with the main stabilizing member 5-3, the same surface vibration reduction effect can be obtained.

Methods for affecting the auxiliary stabilizing members 6 to the optical disk 1 are broadly classified into two methods: a method for affecting the auxiliary stabilizing members 6 in a direction pushing the optical disk surface as shown in the thirteenth embodiment through the fifteenth embodiment and a method for affecting the auxiliary stabilizing members 6 to pull the optical disk surface as shown in the sixteenth embodiment. In either one of two methods, it is possible to obtain the same effect.

In the following, the present invention will be described based on examples and comparative examples in detail.

EXAMPLE 3-1

In example 3-1, the configuration shown in FIG. 48 is applied. The auxiliary stabilizing member 6 is a cylindrical shape having a curvature radius 200 mm at an end face facing the optical disk 1 and a plan view diameter 40 mm. A pair of the auxiliary stabilizing members 6 are arranged at 90° with respect to the upstream and the downstream in the disk rotational direction from the main stabilizing member 5-3 so that the center of the surface facing the optical disk 1 is located at a radius 45 mm of the optical disk 1.

Moreover, the main stabilizing member 5-3 has a shape extending in the disk radial direction, the curvature radius of the surface facing the optical disk 1 is fixed to be a constant radius 50 mm in the disk radial direction, and the effective region width of the disk circumferential direction is fixed to be 15 mm in the disk radial direction. This main stabilizing member 5-3 is arranged so that an action surface of the main stabilizing member 5-3 faces the movement line R in the radial direction of the optical pickup 4. In addition, a length of the main stabilizing member 5-3 in the disk radial direction is set to be 40 mm to cover a range from approximately 20 mm to approximately 60 mm in the disk radial direction.

Moreover, in the example 3-1, a case of using a polycarbonate sheet having a diameter 120 mm and a thickness 75 μm as a disk substrate will be described. To prepare a disk, first, a group of stampers at a pitch 0.6 μm and a width 0.3 μm is transcribed by a thermal-transfer. After that, a sheet/Ag reflection layer is formed by a sputtering process in order of 120 nm/(ZrO2-Y2O3)-SiO2 7 nm/AgInSbTeGe 10 nm/ZnS—SiO2 25 nm/Si3N4 10 nm.

An information recording region is provided in a range (radius 20 mm to 58 mm) from a diameter 40 mm of an inside perimeter to a diameter 118 mm of an outside perimeter. After that, an UV resin is spin-coated and hardened by illuminating a ultraviolet light. Then, a transparent protective film having a thickness 5 μm is formed. Moreover, a hard coat having a thickness 10 μm is conducted at a reverse side. The hub 2 having an external diameter 30 mm, an internal diameter 15 mm, and a thickness 0.3 mm is provided in the center of the optical disk 1. This optical disk 1 is warped slightly toward a side where the hard coat is conducted in a finished state.

The optical disk 1 is rotated at 15 m/sec. After that, the auxiliary stabilizing members 6 are pushed by 3 mm where the disk reference surface is defined as a reference. It should be noted that the disk reference surface is the disk surface at a side of the auxiliary stabilizing members 6 when it is assumed that the optical disk 1 is ideally flat.

In addition, a reference point of a movement operation of the auxiliary stabilizing members 6 is defined to be the center of each action surface of thereof. After that, the main stabilizing member 5-3 is set to be closer to the vicinity of the disk reference surface.

In this state, a laser displacement measure is arranged at a location of the optical pickup 4. The surface vibration is measured at each location of radius 25 mm, 40 mm, and 55 mm, and it is evaluated whether or not the surface vibration reduction effect is obtained effectively and evenly over the disk radial direction.

EXAMPLE 3-2

In example 3-2, the configuration shown in FIG. 58 is applied. The auxiliary stabilizing member 6 is a cylindrical shape having a curvature radius 200 mm at an end face facing the optical disk 1 and a plan view diameter 40 mm. A pair of the auxiliary stabilizing members 6 are arranged at 90° with respect to the upstream and the downstream in the disk rotational direction from the main stabilizing member 5-3 so that the center of the surface facing the optical disk 1 is located at a radius 45 mm of the optical disk 1.

The main stabilizing member 5-3 has a shape extending in the disk radial direction. As shown in FIG. 59A and FIG. 59B, in a cross-sectional shape in the disk radial direction, the effective region width Lb at the outside perimeter is set to be smaller than the effective region width La at the inside perimeter in the disk circumferential direction. In addition, the curvature radius Ra of the inside perimeter is constant and is equal to the curvature radius Rb at the outside perimeter in the disk circumferential direction (Ra=Rb).

In the shape of the main stabilizing member 5-3 in detail, the effective region width is set to be 30 mm at a location of a disk radius 25 mm, and an effective catchment basin width is set to be 10 mm at a location of disk radius 55 mm. Between the radius 25 mm and the radius 55 mm, the effective region width is successively changed and the curvature radius of the disk circumferential direction is set to be constant 55 mm in all over the disk radial direction.

Moreover, the main stabilizing member 5-3 is arranged so that the action surface thereof faces the movement R in the radial direction in the optical pickup 4, and the length of the disk radial direction in the main stabilizing member 5-3 is set to be 40 mm to cover a region from approximately 20 mm to approximately 60 mm in the disk radial direction.

In the configuration according to the example 3-2, the same evaluation is conducted using the same optical disk 1 in the example 3-1.

EXAMPLE 3-3

In example 3-3, the configuration shown in FIG. 56 is applied. The auxiliary stabilizing member 6 is a cylindrical shape having a curvature radius 200 mm at an end face facing the optical disk 1 and a plan view diameter 40 mm. A pair of the auxiliary stabilizing members 6 are arranged at 90° with respect to the upstream and the downstream in the disk rotational direction from the main stabilizing member 5-3 so that the center of the surface facing the optical disk 1 is located at a radius 45 mm of the optical disk 1.

The main stabilizing member 5-3 is a shape extending in the disk radial direction. In the cross-sectional shape in the disk radial direction as shown in FIG. 57A and FIG. 57B, the curvature radius Rb at the outside perimeter is set to be smaller than the curvature radius Ra at the inside perimeter (Ra>Rb) and the effective region width at the inside perimeter La is set to be constant and equal to the effective region width Lb at the outside perimeter Lb (La=Lb).

In the shape of the main stabilizing member 5-3 in detail, the curvature radius is set to be 100 mm at a location of the disk radius 25 mm, and the curvature radius is set to be 50 mm at a location of the disk radius 55 mm. Between the disk radius 25 and the disk radius 55 mm, the curvature radius is successively changed, and the effective region width in the disk circumferential direction is set to be 15 mm constantly in all over the disk radial direction.

Moreover, the main stabilizing member 5-3 is arranged so that the action surface thereof faces the movement line R in the radial direction in the optical pickup 4. The length of the main stabilizing member 5-3 in the disk radial direction is 40 mm to cover a region from approximately 20 mm to approximately 60 mm in the disk radial direction.

In the configuration according to the example 3-3, the same evaluation is conducted using the same optical disk 1 in the example 3-1.

EXAMPLE 3-4

In example 3-4, the configuration shown in FIG. 54 is applied. The auxiliary stabilizing member 8 is a flat board being a semicircle covering the optical disk as shown in FIG. 54. A pair of the auxiliary stabilizing members 8 are arranged so that each location of 90° of the upstream side and the downstream side in the disk rotational direction from the main stabilizing member 5-3 is set as the center and so as to cover outside perimeter edge of the optical disk 1. In this case, the auxiliary stabilizing members 8 are inclined at 8° as shown in FIG. 55 and the action force is applied to the disk surface.

The main stabilizing member 5-3 has a shape extending in the disk radial direction. As shown in FIG. 57A and FIG. 57B, in the cross-sectional shape in the disk radial direction, the curvature radius Rb at the outside perimeter is set to be smaller than the curvature radius Ra at the inside perimeter (Ra>Rb) and the effective region width La at the inside perimeter is constant and equal to the effective region width Lb at the outside perimeter in the disk circumferential direction (La=Lb).

In the shape of the main stabilizing member 5-3 in detail, the curvature radius is set to be 100 mm at a location of the disk radius 25 mm, and the curvature radius is set to be 50 mm at a location of the disk radius 55 mm. Between the disk radius 25 and the disk radius 55 mm, the curvature radius is successively changed, and the effective region width in the disk circumferential direction is set to be 15 mm constantly in all over the disk radial direction.

Moreover, the main stabilizing member 5-3 is arranged so that the action surface thereof faces the movement line R in the radial direction in the optical pickup 4. The length of the main stabilizing member 5-3 in the disk radial direction is 40 mm to cover a region from approximately 20 mm to approximately 60 mm in the disk radial direction.

In the configuration according to the example 3-4, the same evaluation is conducted using the same optical disk 1 in the example 3-1.

EXAMPLE 3-5

In example 3-5, the configuration shown in FIG. 52 is applied. The auxiliary stabilizing member 6 is a cylindrical shape having a curvature radius 200 mm at an end face facing the optical disk 1 and a plan view diameter 40 mm. Each of the auxiliary stabilizing members 6 is arranged at the upstream and the downstream in the disk rotational direction of the main stabilizing member 5-3, within a range closer to the main stabilizing member 5-3 in a region C determined by a radius of the hub 2, and at a location being 2 mm inside from a boundary at a side of the main stabilizing member 5-3. The pushing amount of each of the auxiliary stabilizing members 6 is set to be 3 mm where the disk reference surface is defined as a reference.

Furthermore, both the auxiliary stabilizing members 6 are arranged to clamp the movement line R of the optical pickup 4 and be symmetrical, and a distance from the movement line of the optical pickup 4 is determined to be 45 mm. By this configuration, in a later evaluation, approaching points between the auxiliary stabilizing members 6 and the optical disk 1 in a case of pushing the auxiliary stabilizing members 6 to the disk surface by 3 mm is set to be in the vicinity of the boundary closer to the main stabilizing member 5-3 in the region C.

The main stabilizing member 5 is a shape extending in the disk radial direction. As shown in FIG. 59A and FIG. 59B, in the cross-sectional shape in the disk radial direction, the effective region width Lb at the outside perimeter is set to be smaller than the effective region width La at the inside perimeter in the disk circumferential direction (La>Lb). In addition, the curvature radius Ra at the inside perimeter and the curvature radius Rb at the outside perimeter are constantly equal each other in the disk circumferential direction.

In the shape of the main stabilizing member 5-3 in detail, the effective region width is set to be 30 mm at a location of a disk radius 25 mm, and an effective catchment basin width is set to be 10 mm at a location of disk radius 55 mm. Between the radius 25 mm and the radius 55 mm, the effective region width is successively changed and the curvature radius of the disk circumferential direction is set to be constant 55 mm in all over the disk radial direction.

Moreover, the main stabilizing member 5-3 is arranged so that the action surface thereof faces the movement R in the radial direction in the optical pickup 4, and the length of the disk radial direction in the main stabilizing member 5-3 is set to be 40 mm to cover a region from approximately 20 mm to approximately 60 mm in the disk radial direction.

In the configuration according to the example 3-5, the same evaluation is conducted using the same optical disk 1 in the example 3-1.

EXAMPLE 3-6

In example 3-6, the configuration shown in FIG. 50 and FIG. 51 is applied. Each of the auxiliary stabilizing member 6 is a cylindrical shape having a curvature radius 500 mm at an end face facing the optical disk 1 and a plan view diameter 40 mm. The main stabilizing member 5-3 is the same as that in the example 3-5. Each of the auxiliary stabilizing members 6 is arranged at a location of 90° of the upstream side and the downstream side in the disk rotational direction from the main stabilizing member 5-3 so as to locate the center of the surface facing the optical disk 1 at a location of radius 40 mm of the optical disk 1. In addition, each location of the auxiliary stabilizing members 6 in the disk rotational axis direction is set at a location distanced by 0.5 mm from the disk reference surface.

In the configuration according to the example 3-6, the same evaluation is conducted using the same optical disk 1 in the example 3-1.

COMPARATIVE EXAMPLE 3-1

Figure 66:
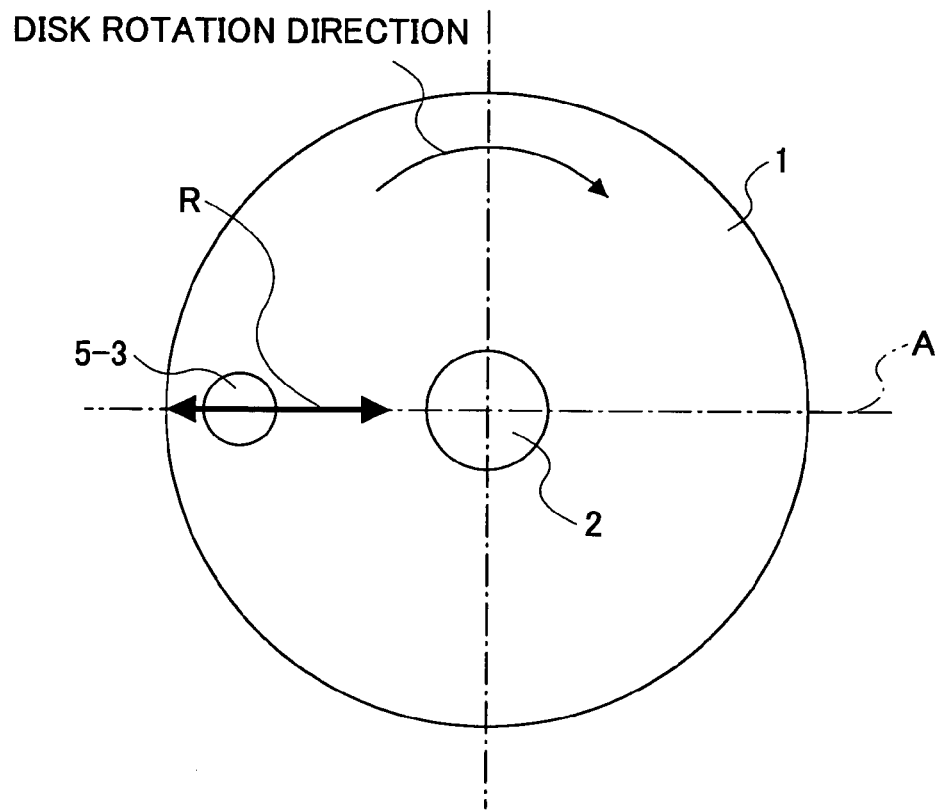
FIG. 66 is a plan view for explaining a configuration in comparative examples to be compared with the examples.
Figure 67:
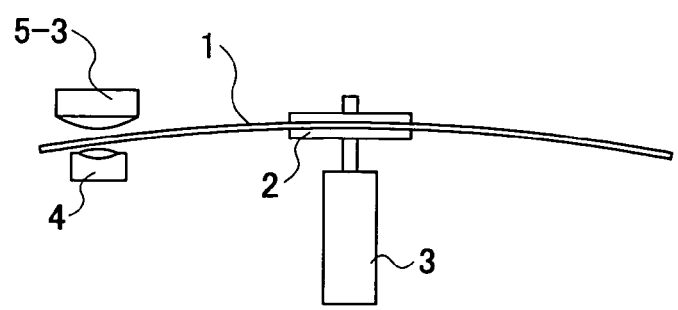

In a comparative example 3-1, the configuration shown in FIG. 66 and FIG. 67 is applied in that a single main stabilizing member 5-3 being cylindrical is used. The main stabilizing member 5-3 is a cylindrical shape having the end face facing the optical disk 1 having the curvature radius 100 mm and the plan view diameter 10 mm.

FIG. 66 and FIG. 67 show just the most essential configuration to explain the comparative example 3-1. Details of the mechanism control system are not shown. It should be noted that the main stabilizing member 5-3 is provided with the movement mechanism in the disk radial direction and the location controlling mechanism in the disk rotational axis direction.

In the comparative example 3-1, the same optical disk 1 in the example 3-1 is rotated at a disk rotation speed 15 m/sec. After that, the main stabilizing member 5-3 is arranged so that the action surface is positioned in the vicinity of the disk reference surface. The main stabilizing member 5-3 is moved in the disk radial direction and the surface vibration is measured by the laser displacement measure that is arranged at a location of the optical pickup 4 at each of disk radial locations 25 mm, 40 mm, and 55 mm.

In FIG. 66 and FIG. 67, the main stabilizing member 5-3 is pushed with respect to the disk reference surface. In the comparative example 3-1, a case of setting the pushing amount to be zero is illustrated.

COMPARATIVE EXAMPLE 3-2

In a configuration of a comparative example 3-2, similar to the comparative example 3-1, a single main stabilizing member 5-3 being cylindrical is used. The main stabilizing member 5-3 is a cylindrical shape having the curvature radius 100 mm at the end face facing the optical disk 1 and the plan view diameter 10 mm.

Similar to the comparative example 1, just the most essential configuration is shown to explain the comparative example 3-2. Details of the mechanism control system are not shown. It should be noted that the main stabilizing member 5-3 is provided with the movement mechanism in the disk radial direction and the location controlling mechanism in the disk rotational axis direction.

In a configuration of the comparative example 3-2, the same optical disk 1 in the example 3-1 is rotated at the disk rotation speed 15 m/sec. After that, the main stabilizing member 5-3 is pushed and the surface vibration at the location of optical pickup 4 is adjusted by the tilt control in the disk radial direction and circumferential direction so as to be minimized. This operation is conducted at each of the disk radial locations 25 mm, 40 mm, and 50 mm and the surface vibration is measured by the laser displacement measure that is arranged at the location of the optical pickup 4. A pushing adjustment amount of the main stabilizing member 5-3 is set to be 1 through 3 mm (where the disk reference surface is an original point) in order for the surface vibration in the above measurement range to be minimized. In a tilt adjustment amount, the radial direction is set to be 3 through 60 and the circumferential direction is set to be 1 through 20 (where the rotational axis direction is an original point).

In the examples 3-1 through 3-6 and the comparative examples 3-1 and 3-2, the surface vibration at each radial location is shown in FIG. 68 as a result. As shown in the result in FIG. 68, in the examples 3-1 through 3-6, a preferable surface vibration reduction effect can be obtained in all over the disk radial direction. That is, these effects in over the disk radial direction are obtained only by defining a location relationship between the optical disk 1 and the stabilizing members 5-3 and 6. Accordingly, without having any complicated mechanism for the main stabilizing member 5-3 and any complicated operation, a preferable stable state of the disk surface is obtained in over the disk radial direction.

For example, the comparative example 1 illustrates a case in that simplifying the operation mechanism of the main stabilizing member 5-3 is higher priority when the single main stabilizing member 5-3 being cylindrical. In this case, the main stabilizing member 5-3 hardly raise the surface vibration reduction effect. On the other hand, in the examples 3-1 through 3-6, even if the operation mechanisms of the stabilizing members 5-3 and 6 are simplified more than the comparative example 3-1, it is possible to significantly obtain the surface vibration reduction effect in over the disk radial direction.

The comparative example 3-2 illustrates a case in that the surface vibration is minimized at the location of the optical pickup 4 by taking advantage of a pushing amount control with respect to the disk surface of the main stabilizing member 5-3 and the tilt control in the radial and circumferential direction of the main stabilizing member 5-3. The surface vibration can be sufficiently reduced in the disk radial direction in the comparative example 3-2. However, an adjustment mechanism and a adjustment method are complicated in the comparative example 3-2. Compared to the comparative example 3-2, an immeasurable effect can be obtained in a simplified mechanism system in the examples 3-1 through 3-6.

Moreover, as compared the example 3-1 with the examples 3-2 through 3-6, the surface vibration reduction effect in the disk radial direction in the examples 3-2 through 3-6 is even more than the example 3-1, because of the shape of the action surface in the main stabilizing member 5-3 extending in the disk radial direction.

In particular, in the example 3-5, the most preferred surface vibration reduction effect can be obtained in other examples 3-1 through 3-4 and 3-6, because of arrangement locations of the auxiliary stabilizing members 6.

On the other hand, in the above-described disk specifications, a first sample where the disk specification is changed is prepared in that by selectively determining a thickness of the hard coat film in a range from 0 μm to 20 μm, a warp state of the optical disk 1 is changed from a convex shape to a concave shape with respect to a side of the main stabilizing member 5-3. As defined the disk specification described as a reference, a second sample is prepared in that a thickness of a polycarbonate film to be a disk material is selectively determined in a range from 50 μm to 120 μm.

Regardless of these various change of the disk specifications such as the first and second samples, by providing the auxiliary stabilizing members 6 and the main stabilizing member 5-3 according to the example 3-2, a similar evaluation result can be obtained in any disk specification. It should be noted that the location of the auxiliary stabilizing member 6 in the disk rotational axis is selectively adjusted corresponding to the warp state of each optical disk 1.

A pertinent condition adjustment for the auxiliary stabilizing member 5-3 is different for each disk specification. As shown in FIG. 63, the auxiliary stabilizing member 6 is mounted on the inside wall of the disk cartridge 11, and an arrangement condition of the auxiliary stabilizing member 6 mounted on the inside wall of the disk cartridge 11 for accommodating the optical disk 1 is adjusted for each disk specification. Therefore, it is possible to reduce the surface vibration in a desired condition without awareness of the disk specification at a side of the recording/reproducing apparatus 100.

In arbitrary disk specification, there are some differences in the surface vibration in the disk radial direction. However, by adjusting a surface shape or an arrangement location of the main stabilizing member 5-3 by corresponding to the disk specification, it is possible to uniform the surface vibration reduction effect. For example, it is possible to easily adjust the arrangement condition of the stabilizing members 5-3 and 6 when the disk cartridge 11 can be arranged by adjusting locations of the stabilizing members 5-3 and 6.

Alternatively, by configuring a cartridge forming die to be capable of moving a portion for forming the auxiliary stabilizing member based on the disk specification, it is possible to fabricate the disk cartridge 11 corresponding to various disk specifications without increasing die cost, when the disk cartridge 11 is fabricated.

According to the present invention, by a simple control of stabilizing members 5, 6, 7, and 8 operating the aerodynamic effect toward the optical disk 1 being flexible, it is possible to provide the recording/reproducing apparatus 100 that can reduce the surface vibration at the recording/reproducing location on the optical disk 1, and that can easily conduct the location adjustment of the optical pickup 4 as a recording/reproducing head toward the recording/reproducing location.

The present invention can be applied to a recording/reproducing apparatus for conducting a recording or reproducing process with respect to a recordable disk being flexible and to a disk cartridge for accommodating the recordable disk. The recordable disk, to which the present invention can be applied, can be a recordable disk having a disk shape such as a phase change memory, a magnetic optical memory, or a hologram memory.

As described above, according to the present invention, the main stabilizing member 5-3 for suppressing the surface vibration of the recordable disk being flexible by utilizing the aerodynamic effect at least in vicinity of the recording/reproducing location is extended while facing the movement line to scan in the disk radial direction of the recording/reproducing part. Furthermore, the disk surface of the recordable disk is divided into two regions by the straight line A being approximate to the movement line for the recording/reproducing part to scan and passing in the vicinity of the center of the recordable disk. In at least one of the regions, the auxiliary stabilizing member 6 for suppressing the surface vibration accompanying the main stabilizing member 5-3 is arranged and occurs the aerodynamic action force so that the aerodynamic action force of the main stabilizing member 5-3 is applied on the disk surface where the main stabilizing member 5-3 is located. Therefore, it is possible to obtain the preferable surface vibration reduction effect in the mechanisms and operations of the stabilizing members 5-3 and 6 being simplified.

Moreover, surface vibration reduction region is formed on a linear region on the disk radial direction at once. Accordingly, a basic operation of recording/reproducing is simply to scan the linear region by the recording/reproducing part. Therefore, the location adjustment of the recording/reproducing location of the recording/reproducing part can be extremely easy.

As described above, it is possible to stabilize the disk surface at the recording/reproducing location in the disk radial direction. Therefore, it is possible to realize a stable recording and reproduction with respect to the recordable disk being flexible.

The present invention is not limited to the specifically disclosed embodiments, and variations and modifications may be made without departing from the scope of the present invention.

The present application is based on the Japanese Priority Applications No.2003-019087 filed on Jan. 28, 2003, No.2003-159517 filed on Jun. 4, 2003, No.2003-170802 filed on June 16, No.2003-416580 filed on Dec. 15, 2003, No.2003-416586 filed on Dec. 15, 2003, and No.2003-416594 filed on Dec. 15, 2003, the entire contents of which are hereby incorporated by reference.

What is claimed is:

1. A recording/reproducing apparatus for recording and reproducing information, said recording/reproducing apparatus comprising:
   a first stabilizing member suppressing surface vibration of a recordable flexible disk being rotated in at least a vicinity of a recording/reproducing location by utilizing an aerodynamic effect; and
   a recording/reproducing part conducting a recording and/or reproducing process at a reverse side being opposite to an action surface of an aerodynamic effect, the action surface being a main surface of the recordable flexible disk,
   wherein a surface of the recordable flexible disk is divided into two regions by a first straight line being approached to a movement line for the recording/reproducing part to scan and passing a vicinity of a center of the recordable flexible disk, and a second stabilizing member is arranged in at least one of the two regions so that a counterforce of the surface of the recordable flexible disk is increased, in which the counterforce occurs when the first stabilizing member is influenced by occurring an aerodynamic action force on the surface of the recordable flexible disk at a location where the first stabilizing member is located.

2. The recording/reproducing apparatus as claimed in claim 1, wherein at least one second stabilizing member is arranged in a region located at a downstream side in a disk rotational direction with respect to the recording/reproducing part, said region being one of the two regions.

3. The recording/reproducing apparatus as claimed in claim 1, wherein at least one second stabilizing member is arranged in a region located at an upstream side in a disk rotational direction with respect to the recording/reproducing part, said region being one of the two regions.

4. The recording/reproducing apparatus as claimed in claim 1, wherein at least one second stabilizing member is arranged in each of the two regions, respectively.

5. The recording/reproducing apparatus as claimed in claim 1, wherein in a case in that a rotation center part of the recordable flexible disk is held by a holding member, a location of an action point of a force of the second stabilizing member against the recordable flexible disk is arranged in a region on a surface of the recordable flexible disk,
   wherein the region is sandwiched between a first perpendicular straight line at one side closer to the first stabilizing member and a second perpendicular straight line at another side farther from the first stabilizing member,
   wherein the first and second perpendicular straight lines pass through two points, respectively, where the first straight line passing in the vicinity of the center of the recordable flexible disk crosses a circumferential part connecting fulcrum locations where flexibility starts when the first stabilizing member is pressed and flexed to the recordable flexible disk, and the first and second perpendicular straight lines are perpendicular to the first straight line.

6. The recording/reproducing apparatus as claimed in claim 4, wherein in a case in that a rotation center part of the recordable flexible disk is held by a holding member, a location of an action point of a force of the second stabilizing member against the recordable flexible disk is arranged in a vicinity of the first perpendicular line in a region on a surface of the recordable flexible disk,
wherein the region is sandwiched between the first perpendicular straight line at one side closer to the first stabilizing member and the second perpendicular straight line at another side farther from the first stabilizing member,
wherein the first and second perpendicular straight lines passing two points, respectively, where the first straight line passing in the vicinity of the center of the recordable flexible disk crosses a circumferential part connecting fulcrum locations where flexibility starts when the first stabilizing member is pressed and flexed to the recordable flexible disk, and the first and second perpendicular straight lines are perpendicular to the first straight line.

7. The recording/reproducing apparatus as claimed in claim 4, wherein at least two second stabilizing members, in which at least one of the second stabilizing members is located in each of the two regions, make a pair and an action point of a force of each of the second stabilizing members against the recordable flexible disk is located on a parallel line being parallel to the first or second perpendicular straight line.

8. The recording/reproducing apparatus as claimed in claim 7, wherein the action points are set so as to locate symmetrically on the surface of the recordable flexible disk.

9. The recording/reproducing apparatus as claimed in claim 1, wherein each of the second stabilizing members is arranged to a chassis as a first body of the recording/reproducing apparatus.

10. The recording/reproducing apparatus as claimed in claim 9, wherein a relative position between the second stabilizing member and a holding member for holding a rotation center part of the recordable flexible disk is fixed.

11. A recording/reproducing apparatus for recording and reproducing information, said recording/reproducing apparatus comprising:
a first stabilizing member suppressing surface vibration of a recordable flexible disk being rotated at least in a vicinity of a recording/reproducing location by utilizing an aerodynamic effect; and
a recording/reproducing part conducting a recording and/or reproducing process at a reverse side being opposite to an action surface of an aerodynamic effect, the action surface being a first surface of the recordable flexible disk,
wherein a surface of the recordable flexible disk is divided into two regions by a first straight line being approached to a movement line for the recording/reproducing part to scan and passing a vicinity of a center of the recordable flexible disk, and a second stabilizing member is arranged in at least one of the two regions so that a counterforce of the surface of the recordable flexible disk is increased, in which the counterforce occurs when the first stabilizing member is influenced by occurring an aerodynamic action force on the surface of the recordable flexible disk at a location where the first stabilizing member is located,
wherein at least one second stabilizing member is arranged in the two regions, respectively, and a counterforce received by the second stabilizing member from the recordable flexible disk is greater than counterforces received by any other second stabilizing member arranged in regions on the recordable flexible disk other than the first stabilizing member.

12. A disk cartridge for accommodating the recordable flexible disk and provided with a mechanism for applying a first stabilizing member for suppressing surface vibration of the recordable flexible disk at least in a vicinity of a recording/reproducing location by utilizing an aerodynamic effect when the recordable flexible disk is rotated,
wherein a surface of the recordable flexible disk is divided into two regions by a first straight line being approached to a movement line for a recording/reproducing part provided in a recording/reproducing apparatus side to scan and passing a vicinity of a center of the recordable flexible disk, and a second stabilizing member is arranged in at least one of the two regions so that a counterforce of the surface of the recordable flexible disk is increased, in which the counterforce occurs when the first stabilizing member is influenced by occurring an aerodynamic action force on the surface of the recordable flexible disk at a location where the first stabilizing member is located.

13. The disk cartridge as claimed in claim 12, wherein the second stabilizing member is mounted on an inside wall.

14. The disk cartridge as claimed in claim 12, wherein a location of the second stabilizing member is adjustable.

15. A recording/reproducing apparatus for recording and/or reproducing information by rotating a recordable flexible disk, said recording/reproducing apparatus comprising:
a first stabilizing member for suppressing surface vibration of the recordable flexible disk at least in a vicinity of a recording/reproducing location by utilizing an aerodynamic effect; and
a recording/reproducing part for recording and/or reproducing information on a reverse side of an action surface of the aerodynamic effect by the first stabilizing member,
wherein:
a surface of the recordable flexible disk is divided into eight regions A, B, C, D, E, F, G, and H at approximately 45° intervals where a second straight line is defined as a starting point, the second straight line being approached to a movement line for the recording/reproducing part to scan and passing a vicinity of a center of the recordable flexible disk;
the first stabilizing member is arranged at a location corresponding to the second straight line; and
at least one action point of aerodynamic force is provided by the second stabilizing member at each of portions where the recordable flexible disk provides the flexibility in the region B from approximately 45° to approximately 90° and the region C from approximately 90° to approximately 135° with respect to the starting point.

16. The recording/reproducing apparatus as claimed in claim 15, wherein the action point of the aerodynamic force of the second stabilizing member that exists in the region B is arranged at a vicinity of a boundary between the region A from the starting point to approximately 45° and the region B.

17. The recording/reproducing apparatus as claimed in claim 15, wherein the action point of the aerodynamic force of the second stabilizing member that exists in the region B and the action point of the aerodynamic force of the second stabilizing member that exists in the region C are arranged so that a straight line connecting the action points in the regions B and C is set to be parallel to the second straight line.

18. The recording/reproducing apparatus as claimed in claim 15, wherein an approximate line of a movement line in the disk radial direction of the recording/reproducing apparatus in an actual recording/reproducing region on the surface of the recordable flexible disk is defined as the second straight line.

19. The recording/reproducing apparatus as claimed in claim 15, wherein the second stabilizing members are mounted in a chassis of a first body of the recording/reproducing apparatus.

20. The recording/reproducing apparatus as claimed in claim 19, wherein a relative location between the second stabilizing members and a holding member for holding a rotation center portion of the recordable flexible disk is fixed.

21. A recording/reproducing apparatus for recording and/or reproducing information by rotating a recordable flexible disk, said recording/reproducing apparatus comprising:

a first stabilizing member for suppressing surface vibration of the recordable flexible disk at least in a vicinity of a recording/reproducing location by utilizing an aerodynamic effect; and a recording/reproducing part for recording and/or reproducing information on a reverse side of an action surface of the aerodynamic effect by the first stabilizing member, wherein:

a surface of the recordable flexible disk is divided into eight regions A, B, C, D, E, F, G, and H at approximately 45° intervals where a second straight line is defined as a starting point, the second straight line being approached to a movement line for the recording/reproducing part to scan and passing a vicinity of a center of the recordable flexible disk;

the first stabilizing member is arranged at a location corresponding to the second straight line; and at least one action point of aerodynamic force is provided by the second stabilizing member at each of portions where the recordable flexible disk provides the flexibility in the region F from approximately 225° to approximately 270° and in the region G from approximately 270° to approximately 315° with respect to the starting point.

22. The recording/reproducing apparatus as claimed in claim 21, wherein the action point of the aerodynamic force of the second stabilizing member that exists in the region G is arranged at a vicinity of a boundary between the region H from the starting point to approximately 315° and the region G.

23. The recording/reproducing apparatus as claimed in claim 21, wherein the action point of the aerodynamic force of the second stabilizing member that exists in the region F and the action point of the aerodynamic force of the second stabilizing member that exists in the region G are arranged so that a straight line connecting the action points in the regions F and G is set to be parallel to the second straight line.

24. A recording/reproducing apparatus for recording and/or reproducing information by rotating a recordable flexible disk, said recording/reproducing apparatus comprising:

a first stabilizing member for suppressing surface vibration of the recordable flexible disk at least in a vicinity of a recording/reproducing location by utilizing an aerodynamic effect; and a recording/reproducing part for recording and/or reproducing information on a reverse side of an action surface of the aerodynamic effect by the first stabilizing member, wherein:

a surface of the recordable flexible disk is divided into eight regions A, B, C, D, E, F, G, and H at approximately 45° intervals where a second straight line is defined as a starting point, the second straight line being approached to a movement line for the recording/reproducing part to scan and passing a vicinity of a center of the recordable flexible disk;

the first stabilizing member is arranged at a location corresponding to the second straight line; and at least one action point of aerodynamic force is provided by the second stabilizing member at each of portions where the recordable flexible disk provides the flexibility in the region B from approximately 45° to approximately 90°, the region C from approximately 90 to approximately 135°, the region F from approximately 225° to approximately 270° with respect to the starting point, and the region G from approximately 270° to approximately 315° with respect to the starting point.

25. The recording/reproducing apparatus as claimed in claim 24, wherein the action point of the aerodynamic force of the second stabilizing member that exists in the region B is arranged in the region A from the starting point to approximately 45° and the region B, and the action point of the aerodynamic force of the second stabilizing member that exists in the region G is arranged at a vicinity of a boundary between the region H from the starting point to approximately 315° and the region G.

26. The recording/reproducing apparatus as claimed in claim 24, wherein the action point of the aerodynamic force of the second stabilizing member that exists in the region B and the action point of the aerodynamic force of the second stabilizing member that exists in the region G are symmetrically arranged so as to sandwich the second straight line.

27. The recording/reproducing apparatus as claimed in claim 24, wherein the action point of the aerodynamic force of the second stabilizing member that exists in the region C and the action point of the aerodynamic force of the second stabilizing member that exists in the region F are symmetrically arranged so as to sandwich the second straight line.

28. The recording/reproducing apparatus as claimed in claim 24, wherein the action point of the aerodynamic force of the second stabilizing member that exists in the region B and the action point of the aerodynamic force of the second stabilizing member that exists in the region C are arranged so that one straight line connecting the action points in the regions B and C is set to be parallel to the second straight line, and the action point of the aerodynamic force of the second stabilizing member that exists in the region F and the action point of the aerodynamic force of the second stabilizing member that exists in the region G are arranged so that another straight line connecting the action points in the regions F and G is set to be parallel to the second straight line.

29. The recording/reproducing apparatus as claimed in any one of claims 15, 21, and 24, wherein other second stabilizing members other than the second stabilizing members are arranged and counterforces received from the second stabilizing members are maximized in said other second stabilizing members arranged in any of the regions A, B, C, D, E, F, G, and H other than the first stabilizing member.

30. A disk cartridge for accommodating the recordable flexible disk and provided with a mechanism for applying a first stabilizing member for suppressing surface vibration of the recordable flexible disk at least in a vicinity of a recording/reproducing location by utilizing an aerodynamic effect when the recordable flexible disk is rotated,
wherein:
a surface of the recordable flexible disk is divided into eight regions A, B, C, D, E, F, G, and H at approximately 45° intervals where a second straight line is defined as a starting point, the second straight line being approached to a movement line for the recording/reproducing part to scan and passing a vicinity of a center of the recordable flexible disk;
the first stabilizing member is arranged at a location corresponding to the movement line; and
at least one action point of aerodynamic force is provided by the second stabilizing member at each of portions where the recordable flexible disk provides the flexibility in the region B from approximately 45° to approximately 90° and the region C from approximately 90° to approximately 135° with respect to the starting point.

31. The disk cartridge as claimed in claim 30, wherein the second stabilizing members are mounted on an inside wall of the disk cartridge.

32. The disk cartridge as claimed in claim 30, wherein locations of the second stabilizing members are adjustable.

33. A recording/reproducing apparatus for recording and/or reproducing information by rotating a recordable flexible disk, said recording/reproducing apparatus comprising:
a first stabilizing member for suppressing surface vibration of the recordable flexible disk at least in a vicinity of a recording/reproducing location by utilizing an aerodynamic effect; and
a recording/reproducing part for recording and/or reproducing information on a reverse side of an action surface of the aerodynamic effect by the first stabilizing member,
wherein the surface of the recordable flexible disk is divided into two regions by a first straight line being approached to a movement line for the recording/reproducing part to scan and passing a vicinity of a center of the recordable flexible disk, and a second stabilizing member is arranged in at least one of the two regions so that a counterforce of the surface of the recordable flexible disk is increased, in which the counterforce occurs when the first stabilizing member is influenced by occurring an aerodynamic action force on the surface of the recordable flexible disk at a location where the first stabilizing member is located, and further the first stabilizing member is extended by facing the movement line for the recording/reproducing part to scan in a disk radial direction.

34. The recording/reproducing apparatus as claimed in claim 33, wherein at least one second stabilizing member is arranged in a region located at a downstream side in a disk rotational direction with respect to the recording/reproducing part, said region being one of the two regions.

35. The recording/reproducing apparatus as claimed in claim 33, wherein at least one second stabilizing member is arranged in a region located at an upstream side in a disk rotational direction with respect to the recording/reproducing part, said region being one of the two regions.

36. The recording/reproducing apparatus as claimed in claim 33, wherein at least one second stabilizing member is arranged in each of the two regions, respectively.

37. The recording/reproducing apparatus as claimed in claim 33, wherein in a case in that a rotation center part of the recordable flexible disk is held by a holding member, a location of an action point of a force of the second stabilizing member against the recordable flexible disk is arranged in a region on a surface of the recordable flexible disk,
wherein the region is sandwiched between the first perpendicular straight line at one side closer to the first stabilizing member and the second perpendicular straight line at another side farther from the first stabilizing member,
wherein the first and second perpendicular straight lines passing two points, respectively, where the first straight line passing in the vicinity of the center of the recordable flexible disk crosses a circumferential part connecting fulcrum locations where flexibility starts when the first stabilizing member is pressed and flexed to the recordable flexible disk, and the first and second perpendicular straight lines are perpendicular to the first straight line.

38. The recording/reproducing apparatus as claimed in claim 36, wherein in a case in that a rotation center part of the recordable flexible disk is held by a holding member, a location of an action point of a force of the second stabilizing member against the recordable flexible disk is arranged in a vicinity of the first perpendicular line in a region on a surface of the recordable flexible disk,
wherein the region is sandwiched between the first perpendicular straight line at one side closer to the first stabilizing member and the second perpendicular straight line at another side farther from the first stabilizing member,
wherein the first and second perpendicular straight lines passing two points, respectively, where the first straight line passing in the vicinity of the center of the recordable flexible disk crosses a circumferential part connecting fulcrum locations where flexibility starts when the first stabilizing member is pressed and flexed to the recordable flexible disk, and the first and second perpendicular straight lines are perpendicular to the first straight line.

39. The recording/reproducing apparatus as claimed in claim 36, wherein at least two second stabilizing members, in which at least one of the second stabilizing members is located in each of the two regions, make a pair and an action point of a force of each of the second stabilizing members against the recordable flexible disk is located on a parallel line being parallel to the first or second perpendicular straight line.

40. The recording/reproducing apparatus as claimed in claim 33, wherein each of the second stabilizing members is arranged to a chassis as a first body of the recording/reproducing apparatus.

41. The recording/reproducing apparatus as claimed in claim 33, wherein a curvature radius, in which a shape in a disk circumferential direction on a surface of the first stabilizing member facing the recordable flexible disk is formed so as to be an approximate circular, is set to be smaller from a disk inside perimeter to a disk outside perimeter.

42. The recording/reproducing apparatus as claimed in claim 33, wherein an effective region width of the first stabilizing member in a disk circumferential direction is set to be smaller from a disk inside perimeter to a disk outside perimeter.

43. The recording/reproducing apparatus as claimed in claim 33, wherein a curvature radius, in which a shape in a disk circumferential direction on a surface of the first stabilizing member facing the recordable flexible disk is formed so as to be an approximate circular, is set to be smaller from a disk inside perimeter to a disk outside perimeter and an effective region width of the first stabilizing member in a disk circumferential direction is set to be smaller from a disk inside perimeter to a disk outside perimeter.

44. A disk cartridge for accommodating a recordable flexible disk, comprising:
 a first stabilizing member for suppressing surface vibration of the recordable flexible disk at least in a vicinity of a recording/reproducing location by utilizing an aerodynamic effect when the recordable flexible disk is rotated; and
 at least one second stabilizing member occurring an action force facing the first stabilizing member on the surface of the recordable flexible disk where the first stabilizing member is located by occurring an aerodynamic action force at least one of two regions into which the surface of the recordable flexible disk is divided by a first straight line being approached to a movement line for a recording/reproducing part provided in a recording/reproducing apparatus side to scan and passing a vicinity of a center of the recordable flexible disk,
 wherein the first stabilizing member is mounted on an inside wall of said disk cartridge so as to extend by facing the movement for the recording/reproducing part to scan in a disk radial direction.

45. The disk cartridge as claimed in claim 44, wherein location of the first stabilizing member and the second stabilizing member are adjustable.

46. A disk cartridge for accommodating a recordable flexible disk, comprising a first stabilizing member extending by facing a movement for the recording/reproducing part to scan in a disk radial direction and suppressing surface vibration of the recordable flexible disk at least in a vicinity of a recording/reproducing location by utilizing an aerodynamic effect when the recordable flexible disk is rotated,
 wherein a surface of the recordable flexible disk is divided into two regions by a first straight line being approached to a movement line for a recording/reproducing part provided in a recording/reproducing apparatus side to scan and passing a vicinity of a center of the recordable flexible disk, and an a second stabilizing member is mounted on an inside wall of said disk cartridge so that a counterforce of the surface of the recordable flexible disk is increased, in which the counterforce occurs when the first stabilizing member is influenced by occurring an aerodynamic action force toward at least one of the two regions on the surface of the recordable flexible disk at a location where the first stabilizing member is located.

47. A disk cartridge for accommodating a recordable flexible disk, comprising a first stabilizing member suppressing surface vibration of the recordable flexible disk at least in a vicinity of a recording/reproducing location by utilizing an aerodynamic effect when the recordable flexible disk is rotated,
 wherein the first stabilizing member is mounted on an inside wall of said disk cartridge so as to extend by facing a movement for the recording/reproducing part to scan in a disk radial direction, and
 a surface of the recordable flexible disk is divided into two regions by a first straight line being approached to a movement line for a recording/reproducing part provided in a recording/reproducing apparatus side to scan and passing a vicinity of a center of the recordable flexible disk, and a second stabilizing member is mounted on an inside wall of said disk cartridge so that a counterforce of the surface of the recordable flexible disk is increased, in which the counterforce occurs when the first stabilizing member is influenced by occurring an aerodynamic action force toward at least one of the two regions on the surface of the recordable flexible disk at a location where the first stabilizing member is located.

* * * * *